US012405773B1

(12) United States Patent
Nazari et al.

(10) Patent No.: US 12,405,773 B1
(45) Date of Patent: Sep. 2, 2025

(54) SYSTEMS AND METHODS FOR EXECUTING AN ANALYTICAL OPERATION ACROSS A PLURALITY OF COMPUTER PROCESSES

(71) Applicant: SAS Institute Inc., Cary, NC (US)

(72) Inventors: Mohammadreza Nazari, Wayne, PA (US); Xindian Long, Cary, NC (US); Steven Eric Krueger, Raleigh, NC (US); Joshua David Griffin, Harrisburg, NC (US); Lawrence Edmund Lewis, Durham, NC (US); Amirhassan Fallah Dizche, Cupertino, CA (US); Ralph Walter Abbey, Cary, NC (US); Jorge Manuel Gomes Da Silva, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/000,660

(22) Filed: Dec. 23, 2024

Related U.S. Application Data

(63) Continuation of application No. 19/000,641, filed on Dec. 23, 2024, now Pat. No. 12,307,291.

(Continued)

(51) Int. Cl.
*G06F 8/36* (2018.01)
*G06F 9/50* (2006.01)
*G06F 9/54* (2006.01)

(52) U.S. Cl.
CPC .............. *G06F 8/36* (2013.01); *G06F 9/5066* (2013.01); *G06F 9/546* (2013.01)

(58) Field of Classification Search
CPC .......... G06F 8/36; G06F 9/5066; G06F 9/546
See application file for complete search history.

(56) References Cited

U.S. PATENT DOCUMENTS

| 7,010,796 B1 * | 3/2006 | Strom | G06F 9/547 |
| | | | 719/330 |
| 7,493,602 B2 * | 2/2009 | Jaeger | G06F 8/51 |
| | | | 717/137 |

(Continued)

FOREIGN PATENT DOCUMENTS

| CN | 112612823 A * | 4/2021 | ............. G06F 16/27 |
| WO | WO-2010138042 A1 * | 12/2010 | ............. H04L 67/26 |

(Continued)

OTHER PUBLICATIONS

Rane et al., "Tools and frameworks for machine learning and deep learning: A review," Deep Science Publishing, Chapter 4, 2024, pp. 80-95.

(Continued)

*Primary Examiner* — Charles E Anya
(74) *Attorney, Agent, or Firm* — Padowithz Alce; Quintin Scheitlin; Alce PLLC

(57) ABSTRACT

A system, method, and computer-program product includes commencing a parent computer process based on receiving a request to perform an analytical operation on one or more datasets, commencing at least one child computer process that is launched by the parent computer process when the parent computer process initiates an execution of the analytical operation on the one or more datasets, transmitting, by the at least one child computer process, a request to the parent computer process to retrieve the one or more datasets, writing, by the parent computer process, the one or more datasets to a cross-process queue based on the parent computer process receiving the requests, reading, by the at least one child computer process, the one or more datasets from the cross-process queue, and executing, using an analytical application executing on the least one child computer pro- (Continued)

cess, the analytical operation based on the one or more datasets.

36 Claims, 38 Drawing Sheets

Related U.S. Application Data

(60) Provisional application No. 63/680,807, filed on Aug. 8, 2024, provisional application No. 63/660,761, filed on Jun. 17, 2024, provisional application No. 63/637,188, filed on Apr. 22, 2024.

(56) References Cited

U.S. PATENT DOCUMENTS

| | | | | |
|---|---|---|---|---|
| 9,990,187 | B1* | 6/2018 | Carroll | G06F 8/30 |
| 2007/0244650 | A1* | 10/2007 | Gauthier | G06Q 10/10 |
| | | | | 708/445 |
| 2011/0010690 | A1* | 1/2011 | Howard | G06F 8/456 |
| | | | | 717/128 |
| 2015/0172259 | A1* | 6/2015 | Consalus | G06F 21/602 |
| | | | | 713/150 |
| 2017/0315791 | A1* | 11/2017 | Mascaro | G06F 8/36 |
| 2019/0109714 | A1* | 4/2019 | Clark | H04L 9/3228 |
| 2019/0156241 | A1* | 5/2019 | Hughes | G06F 16/25 |
| 2020/0379821 | A1* | 12/2020 | Lee | G06F 9/46 |
| 2021/0049182 | A1* | 2/2021 | Liu | G06F 16/2379 |
| 2022/0188089 | A1* | 6/2022 | Lele | G06F 8/60 |
| 2023/0123860 | A1* | 4/2023 | Marquie | G06F 16/24575 |
| | | | | 719/328 |
| 2023/0319154 | A1* | 10/2023 | Guo | H04L 67/146 |
| | | | | 709/224 |

FOREIGN PATENT DOCUMENTS

| | | | | |
|---|---|---|---|---|
| WO | WO-2021164847 | A1 * | 8/2021 | H04L 41/14 |
| WO | WO-2023022874 | A1 * | 2/2023 | G06F 15/167 |

OTHER PUBLICATIONS

Rahrooh et al., "Towards a framework for interoperability and reproducibility of predictive models," Elsevier, 2023, Journal of Biomedical Informatics, pp. 1-9.
Skopt, "Skopt's Top Level Minimization Functions," 2017, pp. 1.
Lee et al., "Towards Ensuring Software Interoperability Between Deep Learning Frameworks," Sciendo, vol. 13, No. 4., 2023, pp. 215-228.
Abukwaik et al.,. "How practical is it? Machine Learning for Identifying Conceptual Interoperability Constraints in API Documents," arXiv:1812.02096v1 [cs.SE] , Dec. 5, 2018, pp. 1-20.
Nilsson et al., "Interoperability and machine-to-machine translation model with mappings to machine learning tasks," Mar. 26, 2019, pp. 1-7.
Martin et al., "BPMN4sML: A BPMN Extension for Serverless Machine Learning; Technology Independent and Interoperable Modeling of Machine Learning Workflows and their Serverless Deployment Orchestration," arXiv:2208.02030v1 [cs.SE], Aug. 2, 2022, pp. 1-113.
Grimmer et al., "Cross-Language Interoperability in a Multi-Language Runtime," ACM Transactions on Programming Languages and Systems, vol. 40, No. 2, May 2018.
Makhachashvilli et al., "Digital Interoperability of Foreign Languages Education," DHW, Dec. 2021, pp. 1-8.
Boukhers et al., "Enhancing Data Space Semantic Interoperability through Machine Learning: a Visionary Perspective," ACM, May 2023, pp. 1-6.
AWS, "AMS Advanced User Guide," Jun. 2024, pp. 1-864.
Azure Databricks, "Best Practices for Interoperability and Usability," Nov. 2024, pp. 1-5.
Bridging Divides: Language Interoperability | Voltron Data, 2023, pp. 1-19.
Altair, "Altair SLC™ With Fully Integrated SAS Language Compiler," Technical Document, May 2023, pp. 1-4.
Jacob Nilsson, "Machine Learning Concepts for Service Data Interoperability," Cyber-Physical Systems, pp. 1-174.
Skopt, "Getting Started," Scikit-Optimize Contributors, 2017, pp. 1.
Melodie Rush, "Getting Started with Python Integration to SAS Viya for Predictive Modeling-Fitting a Random Forest," SAS, Jun. 2024, pp. 1-11.
"Getting Started with Ray Tune" Ray 2.24.0, 2024, pp. 1-4.
Github, "Hyperopt-Sklearn," 2024, pp. 1-7.
Github, "Optuna/Optuna: A Hyerperameter Optimization Framework," 2024, pp. 1-6.
Github, "Sassoftware/Python-Swat: The SAS Scripting Wrapper for Analytics Transfer (SWAT)," 2024, pp. 1-4.
Hyperopt, "The Alternative Hyperparameter Optimization Technique You Need to Know," Feb. 2024, pp. 1-15.
Hyperopt, "Distributed Asynchronous Hyperparameter Optimization," Jun. 2023, pp. 1-3.
Databricks, "Model Selection Using Scikit-Learn, Hyperopt, and MLflow," 2024, pp. 1-7.
Databricks, "Hyperparameter Tuning," 2024, pp. 1-3.
Ava Klissouras, "integrating SAS and Python: An Intern's Journey of Growth," The SAS Data Science Blog, Jul. 2024, pp. 1-8.
Interop et al., "How do Multiple Languages Interact in One Project?" May 2009, pp. 1-5.
Azure Databricks, "Interoperability and Usability for the Data Lakehouse," Jun. 2024, pp. 1-2.
Wikipedia, Language Interoperabiltiy, 2024, pp. 1-2.
Zeid et al., "Interoperability in Smart Manufacturing: Research Challenges," MDPI, 2019, pp. 1-17.
Anh Nguyen, "Programming Language interoperability in cross-platform software development," School of Science, 2022, pp. 1-64.
Zacharewicz et al., "Model Driven Interoperability for System Engineering," Modelling, Aug. 2020, pp. 1-28.
"Optimize Your Optimization," 2017, pp. 1-7.
"Optuna: A Hyperparameter Optimization Framework", 2024, pp. 1-5.
"Ray Tune: Hyperparameter Tuning" 2024, pp. 1-3.
Scikit-Optimize, "Sequential Model-Based Optimization Toolbox," Jun. 2024, pp. 1-8.
SCIKIT-OPTIMIZE 0.10.2, "Sequential Model-Based Optimization in Python," 2024, pp. 1-2.
Nilsson et al., "AI Concepts for System of Systems Dynamic Interoperability," MDPI, 2024, pp. 1-19.
Azure, "What is Azure Machine Learing?" Microsoft Learn, 2024, pp. 1-9.

* cited by examiner

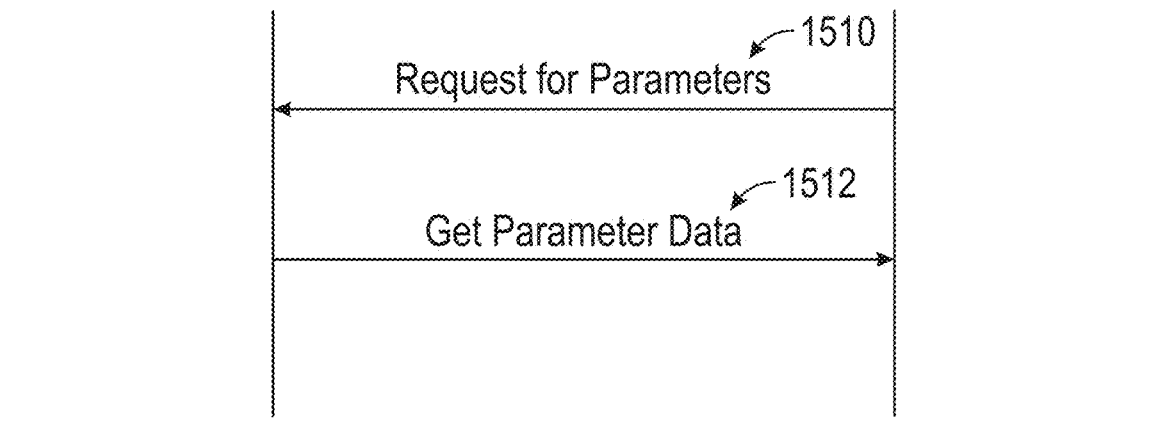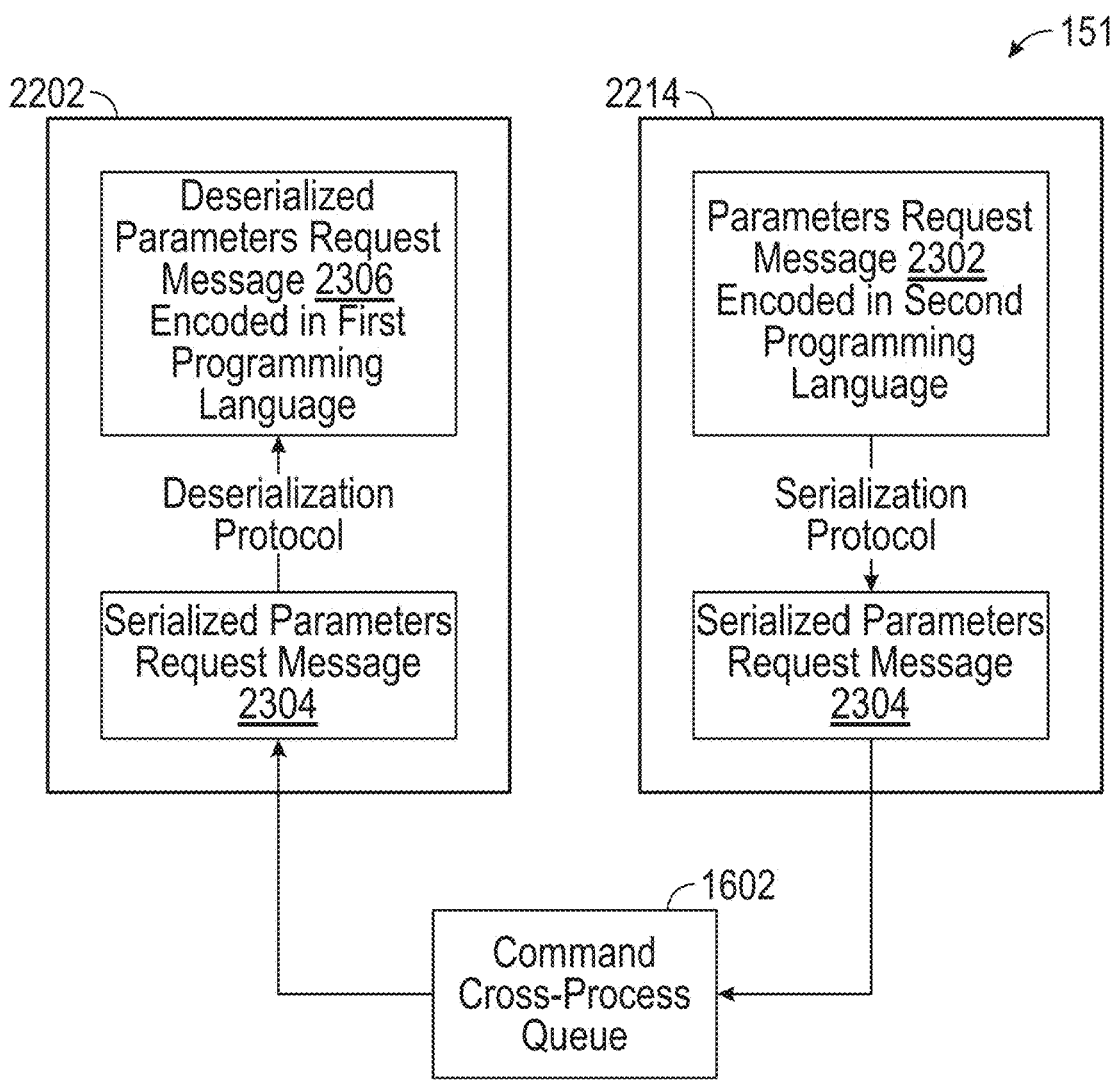
FIG. 23

3000

3110

Transferring, using an application programming interface, a plurality of data blocks written in a first programming language from a first computer process to a second computer process that is configured to execute an algorithm written in a second programming language, wherein transferring a respective data block of the plurality of data blocks includes:

3110A

Serializing, using the application programming interface, the respective data block into a serialized data block based on a serialization protocol executed by the application programming interface, wherein the serialized data block is encoded in a programming language-agnostic data format

3110B

Writing, by the first computer process, the serialized data block to a cross-process queue in response to serializing the respective data block

3110C

Reading, by the second computer process, the serialized data block from the cross-process queue

3110D

Deserializing, using the application programming interface, the serialized data block retrieved from the cross-process queue into a deserialized data block that is encoded in a data structure of the second programming language based on a deserialization protocol executed by the application programming interface

3120

Executing, by the second computer process, the algorithm written in the second programming language based on providing at least a portion of the deserialized data block to the algorithm for data processing

FIG. 30

SYSTEMS AND METHODS FOR EXECUTING AN ANALYTICAL OPERATION ACROSS A PLURALITY OF COMPUTER PROCESSES

CROSS-REFERENCE TO RELATED APPLICATIONS

This is a continuation of U.S. Nonprovisional application Ser. No. 19/000,641, filed 23 Dec. 2024, which claims the benefit of U.S. Provisional Application No. 63/680,807, filed 8 Aug. 2024, U.S. Provisional Application No. 63/660,761, filed 17 Jun. 2024, and U.S. Provisional Application No. 63/637,188, filed 22 Apr. 2024, which are incorporated in their entireties by this reference.

TECHNICAL FIELD

This invention relates generally to the data computation field, and more specifically, to new and useful systems and methods for executing computer functions, computer procedures, and computer operations across multiple computer processes and multiple programming languages.

BACKGROUND

In traditional compute environments, computational tasks are typically executed by a single computer process, where all computer operations are constrained to a single programming language and runtime environment. This restricts developers to a singular technology stack, preventing them from leveraging specialized tools and libraries best suited for different parts of an analytical operation. Such monolithic architectures limit flexibility, hinder the integration of open-source software libraries, and create inefficiencies when handling modern, data-intensive computational workloads.

Therefore, there is a need in the art for systems and methods that enable distributed computation across multiple computer processes, allowing different components of a computational workflow to leverage the strengths of various programming languages and runtimes environments. The embodiments of the present application provide technical solutions that address, at least, the needs described above, as well as the deficiencies of the state of the art.

BRIEF SUMMARY OF THE EMBODIMENT(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one embodiment, a computer-program product comprising a non-transitory machine-readable storage medium storing computer instructions that, when executed by one or more processors, perform operations that includes: commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, the request to perform the analytical operation on the one or more datasets is initiated by a user, the request to perform the analytical operation on the one or more datasets includes: the one or more datasets, an analytical function to perform on the one or more datasets, and a set of user-defined parameters required for executing the analytical function, and the configuration data includes the analytical function and the set of user-defined parameters.

In one embodiment, the parent computer process is configured to interpret the request from the user, wherein interpreting the request from the user includes: identifying, from the request, the one or more datasets to be used during the analytical operation, extracting, from the request, the analytical function to be performed on the one or more datasets, and extracting, from the request, the set of user-defined parameters required for executing the analytical function.

In one embodiment, the parent computer process is designed to process the request from the user, wherein processing the request from the user includes: parsing, from the request, the one or more datasets to be used during the analytical operation, parsing, from the request, the analytical function to be performed on the one or more datasets, and parsing, from the request, the set of user-defined parameters required for executing the analytical function.

In one embodiment, executing, using the analytical application, the analytical operation based on the one or more datasets and the configuration data includes: computing, using the analytical application, an analytical output based on the one or more datasets and the configuration data; and transmitting, by the at least one child computer process, the analytical output to the parent computer process.

In one embodiment, the at least one child computer process does not have permissions to write the analytical output to a computer database, the parent computer process has the permissions to write the analytical output to the computer database, the computer-program product further comprises computer instructions for performing operations including: in response to the parent computer process receiving the analytical output: writing, by the parent computer process, the analytical output to the computer database.

In one embodiment, the computer-program product further includes: generating, during the execution of the analytical operation, one or more logs that includes information associated with a status of the execution of the analytical operation; transmitting, by the at least one child computer process, the one or more logs to the parent computer process; and surfacing, by the parent computer process, the one or more logs to a user associated with the request during the execution of the analytical operation.

In one embodiment, the at least one child computer process includes a plurality of child computer processes, each child computer process of the plurality of child computer processes are launched by the parent computer process when the parent computer process initiates the execution of the analytical operation on the one or more datasets, and each child computer process is configured to run a distinct analytical application written in the second programming language to perform a distinct task of the analytical operation.

In one embodiment, the parent computer process and the at least one child computer process communicate using an application programming interface, the at least one child computer process transmits the one or more requests to the parent computer process using the application programming interface, the parent computer process writes the one or more datasets and the configuration data to the cross-process queue based on a serialization protocol defined by the application programming interface, and the at least one child computer process reads the one or more datasets and the configuration data from the cross-process queue based on a deserialization protocol defined by the application programming interface.

In one embodiment, writing, by the parent computer process, the one or more datasets and the configuration data to the cross-process queue includes: serializing the one or more datasets into one or more serialized datasets, wherein each serialized dataset of the one or more serialized datasets is in a language-agnostic format, and serializing the configuration data into serialized configuration data, wherein the serialized configuration data is in the language-agnostic format.

In one embodiment, reading, by the at least one child computer process, the one or more datasets and the configuration data from the cross-process queue includes: deserializing the one or more serialized datasets into one or more deserialized datasets that is compatible with the second programming language, and deserializing the serialized configuration data into deserialized configuration data that is compatible with the second programming language.

In one embodiment, executing, using the analytical application, the analytical operation based on the one or more datasets and the configuration data includes: computing, using the analytical application, an analytical output based on the one or more deserialized datasets and the deserialized configuration data.

In one embodiment, the cross-process queue is located in-memory of a single computer that is accessible by the parent computer process and the at least one child computer process.

In one embodiment, the parent computer process and the at least one child computer process operate within an operating system of a computer, the computer includes random access memory, the parent computer process and the at least one child computer process have access to the random access memory of the computer, and the cross-process queue is located within the random access memory of the computer.

In one embodiment, the parent computer process and the at least one child computer process operate within an operating system of a computer, the computer includes shared memory that is accessible by the parent computer process and the at least one child computer process, and the cross-process queue is located within the shared memory of the computer.

In one embodiment, the cross-process queue is configured using shared memory of a single computer, and the cross-process queue is an in-memory queuing mechanism that enables the parent computer process and the at least one child computer process to transfer data or information between the parent computer process and the at least one child computer process by reading and writing the data or the information to the cross-process queue.

In one embodiment, a computer-implemented method includes commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, the request to perform the analytical operation on the one or more datasets is initiated by a user, the request to perform the analytical operation on the one or more datasets includes: the one or more datasets, an analytical function to perform on the one or more datasets, and a set of user-defined parameters required for executing the analytical function, and the configuration data includes the analytical function and the set of user-defined parameters.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, a computer-program product comprising a non-transitory machine-readable storage medium storing computer instructions that, when executed by one or more processors, perform operations including: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-program product further includes during the launch of the second computer process: sending, by the first computer process, a process identifier of the first computer process to the second computer process, and pairing the second computer process with the first computer process based on the process identifier of the first computer process.

In one embodiment, the computer-program product further includes in response to pairing the second computer process with the first computer process: writing, to a first cross-process queue, one or more requests for the one or more analytical function parameters and the one or more datasets in response to invoking, by the second computer process, the one or more API functions of the second set of API functions, writing, to a second cross-process queue different from the first cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the second cross-process queue.

In one embodiment, invoking, by the second computer process, the one or more API functions of the second set of API functions includes invoking a parameters-request API function, and the computer-program product further comprises computer instructions for performing operations including: in response to the second computer process invoking the parameters-request API function: creating, by the parameters-request API function, a request message encoded in the second programming language that includes a request to obtain parameter data associated with the analytical function from the first computer process; serializing, using a serialization protocol of the parameters-request API function, the request message encoded in the second programming language into a serialized request message encoded in a binary data format; and writing, by a data writer of the parameters-request API function, the serialized request message to a first cross-process queue.

In one embodiment, the computer-program product further includes detecting, by the first computer process, the serialized request message within the first cross-process queue; invoking, by the first computer process, a parameters-response API function of the first set of API functions in response to detecting the serialized request message within the first cross-process queue; in response to invoking the parameters-response API function: reading, by the first computer process, the serialized request message from the first cross-process queue using a data reader of the parameters-response API function; and deserializing, by the first computer process, the serialized request message into a deserialized request message encoded in the first programming language based on a deserialization protocol of the parameters-response API function.

In one embodiment, the computer-program product further includes retrieving, using the parameters-response API function, the one or more analytical function parameters specified within the request to perform the analytical function in response to deserializing the serialized request message; creating, by the first computer process, a response message to the request for parameter data that includes the one or more analytical function parameters encoded in the first programming language using the parameters-response API function; serializing, by the first computer process, the response message into a serialized response message that includes the one or more analytical function parameters encoded in the binary data format based on a serialization protocol of the parameters-response API function; and writing, by the first computer process, the serialized response message to a second cross-process queue using a data writer of the parameters-response API function.

In one embodiment, the computer-program product further includes detecting, by the second computer process, the serialized response message within the second cross-process queue; invoking, by the second computer process, a parameters response handler API function of the second set of API functions in response to detecting the serialized response message within the second cross-process queue; in response to invoking the parameters response handler API function: reading, by the second computer process, the serialized response message from the second cross-process queue using a data reader of the parameters response handler API function; deserializing, by the second computer process, the serialized response message into a deserialized response message that includes the one or more analytical function parameters encoded in the second programming language based on a deserialization protocol of the parameters response handler API function; and extracting, by the second computer process, the one or more analytical function parameters encoded in the second programming language from the deserialized response message.

In one embodiment, invoking, by the second computer process, the one or more API functions of the second set of API functions includes invoking a tabular data-request API function, and the computer-program product further comprises computer instructions for performing operations including: in response to the second computer process invoking the tabular data-request API function: creating, by the tabular data-request API function, a request message encoded in the second programming language that includes a request to obtain tabular data associated with the analytical function from the first computer process; serializing, using a serialization protocol of the tabular data-request API function, the request message encoded in the second programming language into a serialized request message encoded in a binary data format; and writing, by a data writer of the tabular data-request API function, the serialized request message to a first cross-process queue.

In one embodiment, the computer-program product further includes detecting, by the first computer process, the serialized request message within the first cross-process queue; invoking, by the first computer process, a tabular data-response API function of the first set of API functions in response to detecting the serialized request message within the first cross-process queue; in response to invoking the tabular data-response API function: reading, by the first computer process, the serialized request message from the first cross-process queue using a data reader of the tabular data-response API function; and deserializing, by the first computer process, the serialized request message into a deserialized request message encoded in the first programming language based on a deserialization protocol of the tabular data-response API function.

In one embodiment, the computer-program product further includes retrieving, using the tabular data-response API function, the one or more datasets specified within the request to perform the analytical function in response to deserializing the serialized request message; creating, by the first computer process, a response message to the request for tabular data that includes the one or more datasets encoded in the first programming language using the tabular data-response API function; serializing, by the first computer process, the response message into a serialized response message that includes the one or more datasets encoded in the binary data format based on a serialization protocol of the tabular data-response API function; and writing, by the first computer process, the serialized response message to a second cross-process queue using a data writer of the tabular data-response API function.

In one embodiment, the computer-program product further includes detecting, by the second computer process, the serialized response message within the second cross-process queue; invoking, by the second computer process, a tabular data response handler API function of the second set of API functions in response to detecting the serialized response message within the second cross-process queue; in response to invoking the tabular data response handler API function: reading, by the second computer process, the serialized response message from the second cross-process queue using a data reader of the tabular data response handler API function; deserializing, by the second computer process, the serialized response message into a deserialized response message that includes the one or more datasets encoded in the second programming language based on a deserialization protocol of the tabular data response handler API function; and extracting, by the second computer process, the one or more datasets encoded in the second programming language from the deserialized response message.

In one embodiment, invoking, by the second computer process, the one or more API functions of the second set of API functions includes invoking a tabular data-request API function, and the computer-program product further comprises computer instructions for performing operations including: in response to the second computer process invoking the tabular data-request API function: transmitting, via a first cross-process queue, a serialized request message to the first computer process, wherein the serialized request message includes a request for the one or more datasets; writing, using a tabular data-response API function invoked by the first computer process, a serialized response message that includes the one or more datasets encoded in a binary data format to a second cross-process queue different from the first cross-process queue; and reading, using a tabular data response handler API function invoked by the second computer process, the serialized response message from the second cross-process queue, wherein reading the serialized response message from the cross-process queue includes: reading, using a data reader of the tabular data response handler API function, the one or more datasets encoded in the binary data format from the second cross-process queue, and converting, using the data reader of the tabular data response handler API function, the one or more datasets encoded in the binary data format to one or more representations of the one or more datasets in the second programming language.

In one embodiment, the second programming language corresponds to a python-based programming language, converting, using the data reader of the tabular data response handler API function, the one or more datasets encoded in the binary data format to the one or more representations of the one or more datasets in the second programming language includes: converting each dataset of the one or more datasets to a corresponding pandas dataframe object.

In one embodiment, the computer-program product further includes invoking, by the second computer process, a log writer API function to transfer one or more log messages generated during the execution of the algorithm, and writing, using a data writer of the log writer API function, a serialized message that includes the one or more log messages encoded in a binary data format to a cross-process queue.

In one embodiment, the computer-program product further includes detecting, by the first computer process, the serialized message within the cross-process queue; invoking, by the first computer process, a log reader API function in response to detecting the serialized message within the cross-process queue; in response to invoking the log reader API function: reading, by the first computer process, the serialized message from the cross-process queue using the log reader API function, wherein reading the serialized message from the cross-process queue includes: reading, using a data reader of the log reader API function, the one or more log messages encoded in the binary data format from the cross-process queue, and deserializing, using the data reader of the log reader API function, the one or more log messages encoded in the binary data format into one or more deserialized log messages encoded in the first programming language.

In one embodiment, the computer-program product further includes surfacing, by the first computer process, a set of log messages that includes one or more error events or one or more informational events that occurred in the first computer process and the second computer process, wherein the set of log messages includes: a first subset of log messages generated by the first computer process, and a second subset of log messages generated by the second computer process, wherein the second subset of log messages includes the one or more deserialized log messages.

In one embodiment, the analytical result includes one or more data tables outputted by the algorithm, and the computer-program product further comprises computer instructions for performing operations including: invoking, by the second computer process, an output data writer API function, in response to the second computer process invoking the output data writer API function: writing, by the second computer process, a serialized message that includes the one or more data tables in a binary data format to a cross-process queue using a data writer of the output data writer API function; and reading, using an output data reader API function invoked by the first computer process, the serialized message from the cross-process queue, wherein reading the serialized message from the cross-process queue includes: reading, using a data reader of the output data reader API function, the one or more data tables in the binary data format from the cross-process queue, and deserializing, using the data reader of the output data reader API function, the one or more data tables in the binary data format into one or more deserialized data tables encoded in the first programming language; and writing, by the first computer process, the one or more deserialized data tables encoded in the first programming language to a computer database of the analytics service.

In one embodiment, the computer-program product further includes obtaining, by the second computer process, metadata related to the execution of the algorithm; invoking, by the second computer process, an algorithm metadata writer API function; and in response to the second computer process invoking the algorithm metadata writer API function: writing, to a cross-process queue, a serialized message that includes the metadata in a binary data format using a data writer of the algorithm metadata writer API function; and reading, by the first computer process, the serialized message from the cross-process queue in response to the first computer process invoking an algorithm metadata reader API function, wherein reading the serialized message from the cross-process queue includes: reading, using a data reader of the algorithm metadata reader API function, the metadata in the binary data format from the cross-process queue, and deserializing, using the data reader of the algorithm metadata reader API function, the metadata in the binary data format into deserialized metadata encoded in the first programming language; and surfacing, by the first computer process, a metadata summary artifact that includes the deserialized metadata.

In one embodiment, the computer-program product further includes augmenting the plurality of predefined analytical functions executable by the analytics service to include a third-party analytical function created by a user of the analytics service, wherein: the third-party analytical function is configured to perform a target analytical computation using a user-created algorithm written in the second programming language, and the analytical function of the plurality of predefined analytical functions corresponds to the third-party analytical function.

In one embodiment, invoking, by the second computer process, the one or more API functions of the second set of API functions includes invoking, by the second computer process, a first API function to request the one or more analytical function parameters from the first computer process, and after the second computer process receives the one or more analytical function parameters, invoking, by the second computer process, a second API function to request the one or more datasets.

In one embodiment, invoking, by the second computer process, the one or more API functions of the second set of API functions includes sequentially invoking a plurality of API functions.

In one embodiment, invoking, by the second computer process, the one or more API functions of the second set of API functions includes simultaneously invoking a plurality of API functions.

In one embodiment, the computer-program product further includes: writing, to a single-producer single-consumer cross-process queue, one or more requests for the one or more analytical function parameters and the one or more datasets in response to invoking, by the second computer process, the one or more API functions of the second set of API functions, writing, to multiple-producer multiple-consumer cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the multiple-producer multiple-consumer cross-process queue.

In one embodiment, a computer-implemented method includes: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-implemented method further includes: during the launch of the second computer process: sending, by the first computer process, a process identifier of the first computer process to the second computer process, and pairing the second computer process with the first computer process based on the process identifier of the first computer process.

In one embodiment, the computer-implemented method further includes: in response to pairing the second computer process with the first computer process: writing, to a first cross-process queue, one or more requests for the one or more analytical function parameters and the one or more datasets in response to invoking, by the second computer process, the one or more API functions of the second set of API functions, writing, to a second cross-process queue different from the first cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the second cross-process queue.

In one embodiment, the computer-implemented method further includes in response to pairing the second computer process with the first computer process: writing, to a command cross-process queue, one or more requests for the one or more analytical function parameters and the one or more datasets in response to invoking, by the second computer process, the one or more API functions of the second set of API functions, writing, to a data transfer cross-process queue different from the command cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the data transfer cross-process queue.

In one embodiment, the command cross-process queue is a single-producer, single-consumer cross-process queue, and the data transfer cross-process queue is a multiple-producer, multiple-consumer cross-process queue.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-implemented system further includes during the launch of the second computer process: sending, by the first computer process, a process identifier of the first computer process to the second computer process, and pairing the second computer process with the first computer process based on the process identifier of the first computer process.

In one embodiment, a computer-program product comprising a non-transitory machine-readable storage medium storing computer instructions that, when executed by one or more processors, perform operations including: transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-program further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes translating the respective data block written in the first programming language into a binary-based data format that includes: a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-program product further includes: transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-program product further includes implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, the plurality of data blocks are simultaneously transferred from the first computer process to the second computer process using the cross-process queue, simultaneously transferring the plurality of data blocks from the first computer process to the second computer process includes: concurrently executing, via a plurality of producer processes, a plurality of write operations that writes the plurality of data blocks to the cross-process queue, and concurrently executing, by a plurality of consumer processes, a plurality of read operations that reads the plurality of data blocks written to the cross-process queue.

In one embodiment, the respective data block is in a data format that corresponds to a predefined data model of a plurality of distinct predefined data models, the serialization protocol includes a predefined set of instructions for translating the respective data block associated with the predefined data model to the programming language-agnostic data format.

In one embodiment, the deserialization protocol includes a set of predefined instructions for decoding the serialized data block from the programming language-agnostic data format into the data structure of the second programming language based on a corresponding representation of the predefined data model in the second programming language.

In one embodiment, the respective data block is represented as a message, the message is serialized into the programming language-agnostic data format using a predefined message schema of a plurality of predefined message schemas, the serialized message is written to the cross-process queue by the first computer process, the second computer process reads the serialized message from the cross-process queue, and the application programming interface deserializes the serialized message read from the cross-process queue using the predefined message schema to translate the serialized message to one or more representations of the second programming language.

In one embodiment, the application programming interface provides a first set of application programming interface functions that is accessible by the first computer process and a second set of application programming interface functions that is accessible by the second computer process, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, the first computer process implements a first set of application programming interface functions of the application programming interface, the second computer process implements a second set of application programming interface functions of the application programming interface, the first set of application programming interface functions are different than the second set of application programming interface functions, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, a computer-implemented method includes transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-implemented method further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes: instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes translating the respective data block written in the first programming language into a binary-based data format that includes a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-implemented method further includes: transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-implemented method further includes: implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, the plurality of data blocks are simultaneously transferred from the first computer process to the second computer process using the cross-process queue, simultaneously transferring the plurality of data blocks from the first computer process to the second computer process includes: concurrently executing, via a plurality of producer processes, a plurality of write operations that writes the plurality of data blocks to the cross-process queue, and concurrently executing, by a plurality of consumer processes, a plurality of read operations that reads the plurality of data blocks written to the cross-process queue.

In one embodiment, the respective data block is in a data format that corresponds to a predefined data model of a plurality of distinct predefined data models, the serialization protocol includes a predefined set of instructions for translating the respective data block associated with the predefined data model to the programming language-agnostic data format.

In one embodiment, the deserialization protocol includes a set of predefined instructions for decoding the serialized data block from the programming language-agnostic data format into the data structure of the second programming language based on a corresponding representation of the predefined data model in the second programming language.

In one embodiment, the respective data block is represented as a message, the message is serialized into the programming language-agnostic data format using a predefined message schema of a plurality of predefined message schemas, the serialized message is written to the cross-process queue by the first computer process, the second computer process reads the serialized message from the cross-process queue, and the application programming interface deserializes the serialized message read from the cross-process queue using the predefined message schema to translate the serialized message to one or more representations of the second programming language.

In one embodiment, the application programming interface provides a first set of application programming interface functions that is accessible by the first computer process and a second set of application programming interface functions that is accessible by the second computer process, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, the first computer process implements a first set of application programming interface functions of the application programming interface, the second computer process implements a second set of application programming interface functions of the application programming interface, the first set of application programming interface functions are different than the second set of application programming interface functions, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-implemented system further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes: instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes: translating the respective data block written in the first programming language into a binary-based data format that includes: a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-implemented system further includes transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-implemented system further includes implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, a computer-program product comprising a non-transitory machine-readable storage medium storing computer instructions that, when executed by one or more processors, perform operations including: initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-program product further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, the set of runtime components for the target programming language includes a code interpreter of the target programming language, the mounted shared storage volume includes the code interpreter of the target programming language, and the second computer process executes the at least one algorithm written in the target programming language using the code interpreter of the target programming language.

In one embodiment, writing the set of runtime components for the target programming language to the shared storage volume of the compute environment includes: writing a plurality of software libraries used by the predetermined set of algorithms to the shared storage volume of the compute environment, and writing a code interpreter of the target programming language to the shared storage volume of the compute environment.

In one embodiment, the computer-program product further includes: in response to the resource transfer task writing the set of runtime components for the target programming language and the predetermined set of algorithms written in the target programming language to the shared storage volume of the compute environment: transitioning the first container from an active state to an inactive state, and deallocating compute resources previously allocated to the first container.

In one embodiment, the first container is initialized based on a container image that includes the set of runtime components for the target programming language and the predetermined set of algorithms written in the target programming language, and the computer-program product further comprises computer instructions for performing operations including: periodically scanning the container image for security vulnerabilities, wherein periodically scanning the container image includes: assessing a security risk of one or more open-source software libraries included in the container image, and assessing a security threat of each algorithm of the predetermined set of algorithms included in the container image.

In one embodiment, the container image is configured with a set of container permissions that restricts an end user from modifying the container image.

In one embodiment, the first container and the second container are different containers within the compute environment, the first container is configured to operate independently of the second container, and the computer-program product further comprises computer instructions for performing operations including: detecting a security threat in the first container, wherein: the security threat is localized to the first container based on the first container operating independently of the second container, and the security threat does not compromise the second container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database.

In one embodiment, initializing, within the compute environment, the second container that provides the runtime environment for executing the analytics backend service includes: loading one or more software libraries used by the analytics backend service, wherein the one or more software libraries are written in the first programming language, and creating the runtime environment, wherein the runtime environment is configured to execute computer instructions of the analytics backend service.

In one embodiment, the first container is initialized within the compute environment before the first computer process invokes the analytics function.

In one embodiment, the computer-program product further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and based on deploying the pod within the compute environment: initializing, within the pod, the first container that commences the execution of the resource transfer task that writes the set of runtime components for the target programming language and the predetermined set of algorithms written in the target programming language to the shared storage volume of the pod, and initializing, within the pod, the second container based on the container image of the analytics backend service.

In one embodiment, the first container is initialized within the compute environment before the second container is initialized within the compute environment.

In one embodiment, the set of runtime components for the target programming language includes a code interpreter of the target programming language, the mounted shared storage volume includes the code interpreter of the target programming language, the second computer process is launched in response to the first computer process invoking the analytics function provided by the analytics backend service, and in response to launching the second computer process: accessing, by the second computer process, the code interpreter of the target programming language and the at least one algorithm used by the analytics function from the mounted shared storage volume; initializing, within memory of the second computer process, the code interpreter of the target programming language and the at least one algorithm used by the analytics function in response to accessing the code interpreter and the at least one algorithm used by the analytics function from the mounted shared storage volume; and executing, by the second computer process, the at least one algorithm written in the target programming language using the code interpreter of the target programming language.

In one embodiment, transferring the analytical output computed by the at least one algorithm that performed the computational task from the second computer process to the first computer process includes using a cross-process queue, the cross-process queue is implemented within shared memory of a computer, the cross-process queue includes a plurality of cells for storing data blocks or messages during data transfer operations, and the shared memory of the computer includes: a write operation index tracking index values of one or more cells within the cross-process queue that are available to write, and a read operation index tracking index values of one or more cells within the cross-process queue that are available to read.

In one embodiment, transferring the analytical output computed by the at least one algorithm that performed the computational task from the second computer process to the first computer process includes using a cross-process queue, the cross-process queue is located within shared memory of the second container, and the cross-process queue is not accessible by the first container.

In one embodiment, transferring the analytical output computed by the at least one algorithm that performed the computational task from the second computer process to the first computer process includes using a socket, the socket provides a communication channel between the second computer process and the first computer process, the socket provides a bidirectional communication for exchanging data between the second computer process and the first computer process.

In one embodiment, transferring the analytical output computed by the at least one algorithm that performed the computational task from the second computer process to the first computer process includes using shared memory of a computer that is executing the second computer process and the first computer process.

In one embodiment, a first pod initializes the first container, a second pod initializes the second container, the first pod is different than the second pod, and the first container and the second container use a socket for transferring data between the first pod and the second pod.

In one embodiment, a computer-implemented method includes initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-implemented method further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, the set of runtime components for the target programming language includes a code interpreter of the target programming language, the mounted shared storage volume includes the code interpreter of the target programming language, and the second computer process executes the at least one algorithm written in the target programming language using the code interpreter of the target programming language.

In one embodiment, writing the set of runtime components for the target programming language to the shared storage volume of the compute environment includes: writing a plurality of software libraries used by the predetermined set of algorithms to the shared storage volume of the compute environment, and writing a code interpreter of the target programming language to the shared storage volume of the compute environment.

In one embodiment, the computer-implemented method further includes: in response to the resource transfer task writing the set of runtime components for the target programming language and the predetermined set of algorithms written in the target programming language to the shared storage volume of the compute environment: transitioning the first container from an active state to an inactive state, and deallocating compute resources previously allocated to the first container.

In one embodiment, the first container is initialized based on a container image that includes the set of runtime components for the target programming language and the predetermined set of algorithms written in the target programming language, and the computer-program product further comprises computer instructions for performing operations including: periodically scanning the container image for security vulnerabilities, wherein periodically scanning the container image includes: assessing a security risk of one or more open-source software libraries included in the container image, and assessing a security threat of each algorithm of the predetermined set of algorithms included in the container image.

In one embodiment, the container image is configured with a set of container permissions that restricts an end user from modifying the container image.

In one embodiment, the first container and the second container are different containers within the compute environment, the first container is configured to operate independently of the second container, and the computer-program product further comprises computer instructions for performing operations including: detecting a security threat in the first container, wherein: the security threat is localized to the first container based on the first container operating independently of the second container, and the security threat does not compromise the second container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-implemented system further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, a computer-program product comprising a non-transitory machine-readable storage medium storing computer instructions that, when executed by one or more processors, perform operations includes: initializing, within a compute environment, a first container that provides a first runtime environment for executing computer instructions of an analytics backend service written in a first programming language; invoking, by a first computer process operating within the first container, an analytics function provided by the analytics backend service, wherein the analytics function is configured to use at least one algorithm written in a second programming language to perform a computational task; initializing, within the compute environment, a second container that provides a second runtime environment for executing the at least one algorithm used by the analytics function; commencing, by the second container, a second computer process that executes the at least one algorithm to perform the computational task specified by the analytics function; and transferring, using a cross-process queue, an analytical output computed by the at least one algorithm for the computational task from the second computer process to the first computer process.

In one embodiment, the computer-program product further includes: deploying, by a container orchestration service, one or more pods within the compute environment based on one or more pod configuration files, wherein the one or more pod configuration files includes: a container image of the analytics backend service written in the first programming language, and a container image of an auxiliary compute service that includes the at least one algorithm written in the second programming language; and in response to deploying the one or more pods within the compute environment: initializing, within the one or more pods, the first container based on the container image of the analytics backend service, and initializing, within the one or more pods, the second container based on the container image of the auxiliary compute service.

In one embodiment, initializing, within the compute environment, the second container that provides the second runtime environment for executing the at least one algorithm used by the analytics function includes: loading one or more software libraries used by the at least one algorithm to perform the computational task specified by the analytics function, wherein the one or more software libraries are written in the second programming language, and creating the second runtime environment, wherein the second runtime environment is operably configured to execute the at least one algorithm written in the second programming language.

In one embodiment, initializing, within the compute environment, the second container that provides the second runtime environment for executing the at least one algorithm used by the analytics function includes: creating the second runtime environment that is configured to execute the at least one algorithm written in the second programming language, wherein creating the second runtime environment includes: installing, into a filesystem of the second container, one or more software libraries required by the at least one algorithm to perform the computational task specified by the analytics function, and storing, within the filesystem of the second container, source code associated with the at least one algorithm.

In one embodiment, executing the at least one algorithm to perform the computational task specified by the analytics function includes: loading, into a memory space allocated to the second container, the one or more software libraries required by the at least one algorithm to perform the computational task specified by the analytics function, loading, into the memory space allocated to the second container, the source code associated with the at least one algorithm, and executing, using a code interpreter of the second programming language, the source code associated with the at least one algorithm that uses the one or more software libraries to perform the computational task.

In one embodiment, the second container is initialized based on a container image of an auxiliary compute service, the auxiliary compute service includes the at least one algorithm, and the computer-program product further comprises computer instructions for performing operations including: periodically scanning the container image of the auxiliary compute service for security vulnerabilities, wherein scanning the container image of the auxiliary compute service includes: assessing a security risk of one or more open-source software libraries used by the auxiliary compute service, and assessing a security threat of the at least one algorithm.

In one embodiment, the container image of the auxiliary compute service defines a set of container permissions that restricts an end user from modifying the container image of the auxiliary compute service.

In one embodiment, the first container and the second container are different containers within the compute environment, the first container is configured to operate independently of the second container, and the computer-program product further comprises computer instructions for performing operations including: detecting a security threat in the second container, wherein: the security threat is localized to the second container based on the second container operating independently of the first container, and the security threat does not compromise the first container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database based on determining the first computer process has the permissions to write the analytical output to the computer database of the analytics backend service.

In one embodiment, initializing, within the compute environment, the first container that provides the first runtime environment for executing the computer instructions of the analytics backend service includes: loading one or more software libraries used by the analytics backend service, wherein the one or more software libraries are written in the first programming language, and creating the first runtime environment, wherein the first runtime environment is configured to execute the computer instructions of the analytics backend service.

In one embodiment, the second container is initialized within the compute environment after the first computer process invokes the analytics function.

In one embodiment, the computer-program product further includes: selecting a container image of a plurality of container images based on the analytics function invoked by the first computer process, wherein the selected container image is pre-configured with one or more runtime components that provide the second runtime environment, wherein: the second container that provides the second runtime environment for executing the at least one algorithm associated with the analytics function is initialized using the selected container image.

In one embodiment, the first container and the second container are initialized contemporaneously within the compute environment when a pod starts within the compute environment.

In one embodiment, a computer-implemented method includes: initializing, within a compute environment, a first container that provides a first runtime environment for executing computer instructions of an analytics backend service written in a first programming language; invoking, by a first computer process operating within the first container, an analytics function provided by the analytics backend service, wherein the analytics function is configured to use at least one algorithm written in a second programming language to perform a computational task; initializing, within the compute environment, a second container that provides a second runtime environment for executing the at least one algorithm used by the analytics function; commencing, by the second container, a second computer process that executes the at least one algorithm to perform the computational task specified by the analytics function; and transferring, using a cross-process queue, an analytical output computed by the at least one algorithm for the computational task from the second computer process to the first computer process.

In one embodiment, the computer-implemented method further includes: deploying, by a container orchestration service, one or more pods within the compute environment based on one or more pod configuration files, wherein the one or more pod configuration files includes: a container image of the analytics backend service written in the first programming language, and a container image of an auxiliary compute service that includes the at least one algorithm written in the second programming language; and in response to deploying the one or more pods within the compute environment: initializing, within the one or more pods, the first container based on the container image of the analytics backend service, and initializing, within the one or more pods, the second container based on the container image of the auxiliary compute service.

In one embodiment, initializing, within the compute environment, the second container that provides the second runtime environment for executing the at least one algorithm used by the analytics function includes: loading one or more software libraries used by the at least one algorithm to perform the computational task specified by the analytics function, wherein the one or more software libraries are written in the second programming language, and creating the second runtime environment, wherein the second runtime environment is operably configured to execute the at least one algorithm written in the second programming language.

In one embodiment, initializing, within the compute environment, the second container that provides the second runtime environment for executing the at least one algorithm used by the analytics function includes: creating the second runtime environment that is configured to execute the at least one algorithm written in the second programming language, wherein creating the second runtime environment includes: installing, into a filesystem of the second container, one or more software libraries required by the at least one algorithm to perform the computational task specified by the analytics function, and storing, within the filesystem of the second container, source code associated with the at least one algorithm.

In one embodiment, executing the at least one algorithm to perform the computational task specified by the analytics function includes: loading, into a memory space allocated to the second container, the one or more software libraries required by the at least one algorithm to perform the computational task specified by the analytics function, loading, into the memory space allocated to the second container, the source code associated with the at least one algorithm, and executing, using a code interpreter of the second programming language, the source code associated with the at least one algorithm that uses the one or more software libraries to perform the computational task.

In one embodiment, the second container is initialized based on a container image of an auxiliary compute service, the auxiliary compute service includes the at least one algorithm, and the computer-program product further comprises computer instructions for performing operations including: periodically scanning the container image of the auxiliary compute service for security vulnerabilities, wherein scanning the container image of the auxiliary compute service includes: assessing a security risk of one or more open-source software libraries used by the auxiliary compute service, and assessing a security threat of the at least one algorithm.

In one embodiment, the container image of the auxiliary compute service defines a set of container permissions that restricts an end user from modifying the container image of the auxiliary compute service.

In one embodiment, the first container and the second container are different containers within the compute environment, the first container is configured to operate independently of the second container, and the computer-implemented method further comprises computer instructions for performing operations including: detecting a security threat in the second container, wherein: the security threat is localized to the second container based on the second container operating independently of the first container, and the security threat does not compromise the first container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-implemented method further comprises computer instructions for performing operations including: in response to the first computer process obtaining the analytical output: writing, by the first computer process, the analytical output to the computer database based on determining the first computer process has the permissions to write the analytical output to the computer database of the analytics backend service.

In one embodiment, initializing, within the compute environment, the first container that provides the first runtime environment for executing the computer instructions of the analytics backend service includes: loading one or more software libraries used by the analytics backend service, wherein the one or more software libraries are written in the first programming language, and creating the first runtime environment, wherein the first runtime environment is configured to execute the computer instructions of the analytics backend service.

In one embodiment, the second container is initialized within the compute environment after the first computer process invokes the analytics function.

In one embodiment, the computer-implemented method further includes: selecting a container image of a plurality of container images based on the analytics function invoked by the first computer process, wherein the selected container image is pre-configured with one or more runtime components that provide the second runtime environment, wherein: the second container that provides the second runtime environment for executing the at least one algorithm associated with the analytics function is initialized using the selected container image.

In one embodiment, the first container and the second container are initialized contemporaneously within the compute environment when a pod starts within the compute environment.

BRIEF DESCRIPTION OF THE FIGURES

FIG. 23 illustrates an example schematic of transferring a request for parameters from a second computer process to a first computer process, according to some embodiments of the present technology;

FIG. 30 illustrates a flow chart showing an example process of transferring a data block from a first computer process to a second computer process, according to some embodiments of the present technology;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
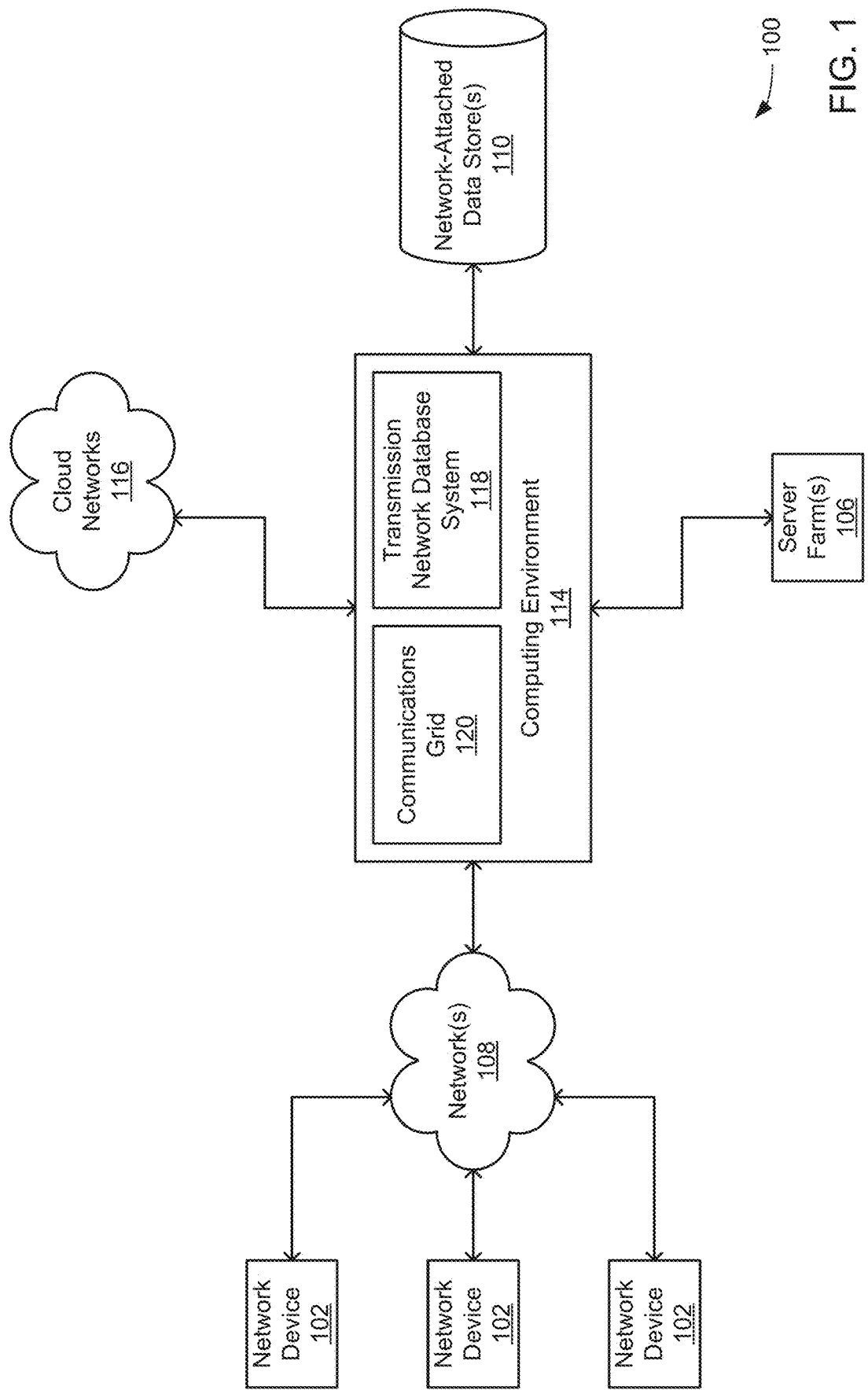
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
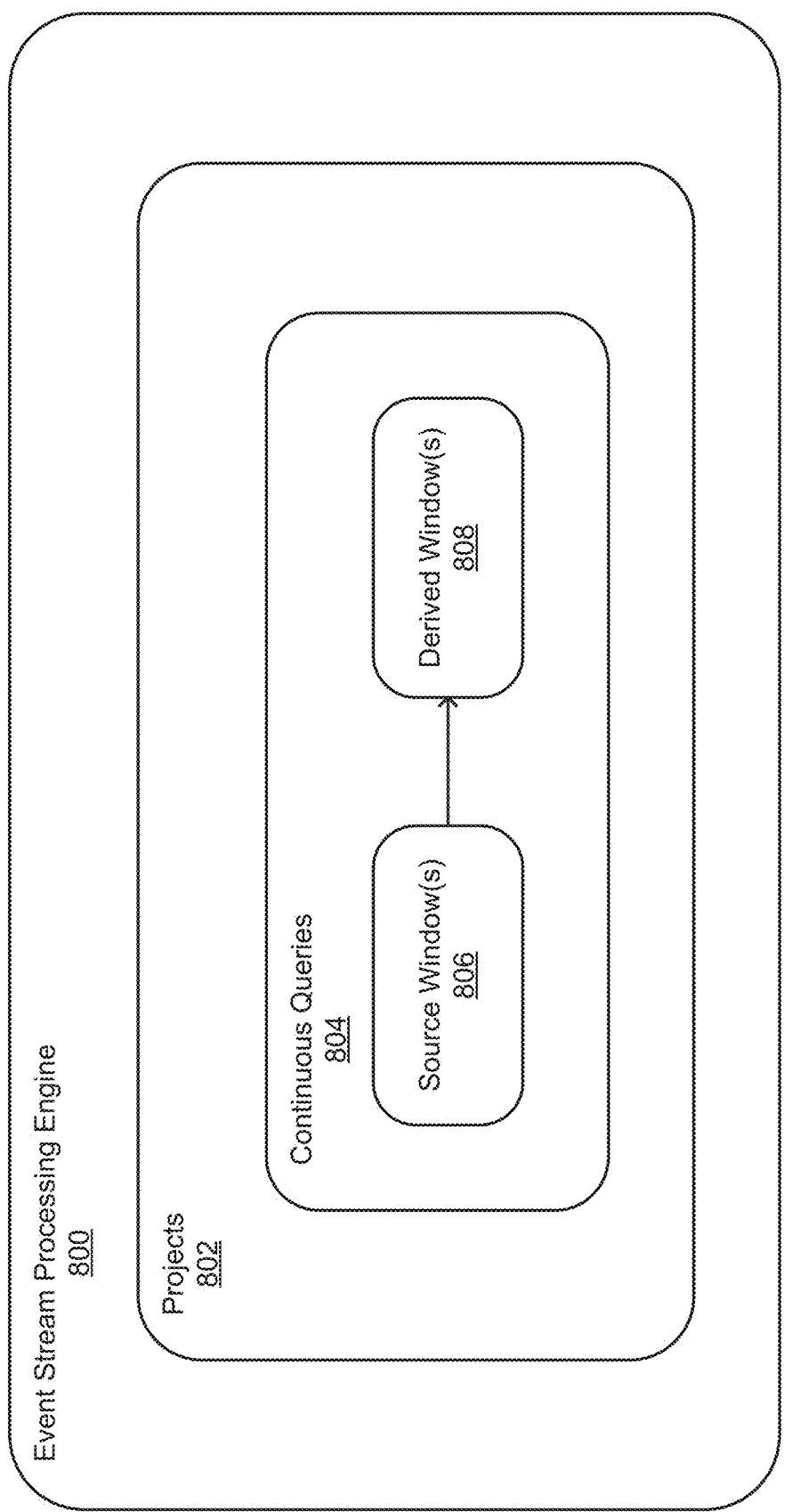
FIG. 8 illustrates a block diagram including components of an Event Stream Processing Engine (ESPE), according to embodiments of the present technology.
Figure 9:
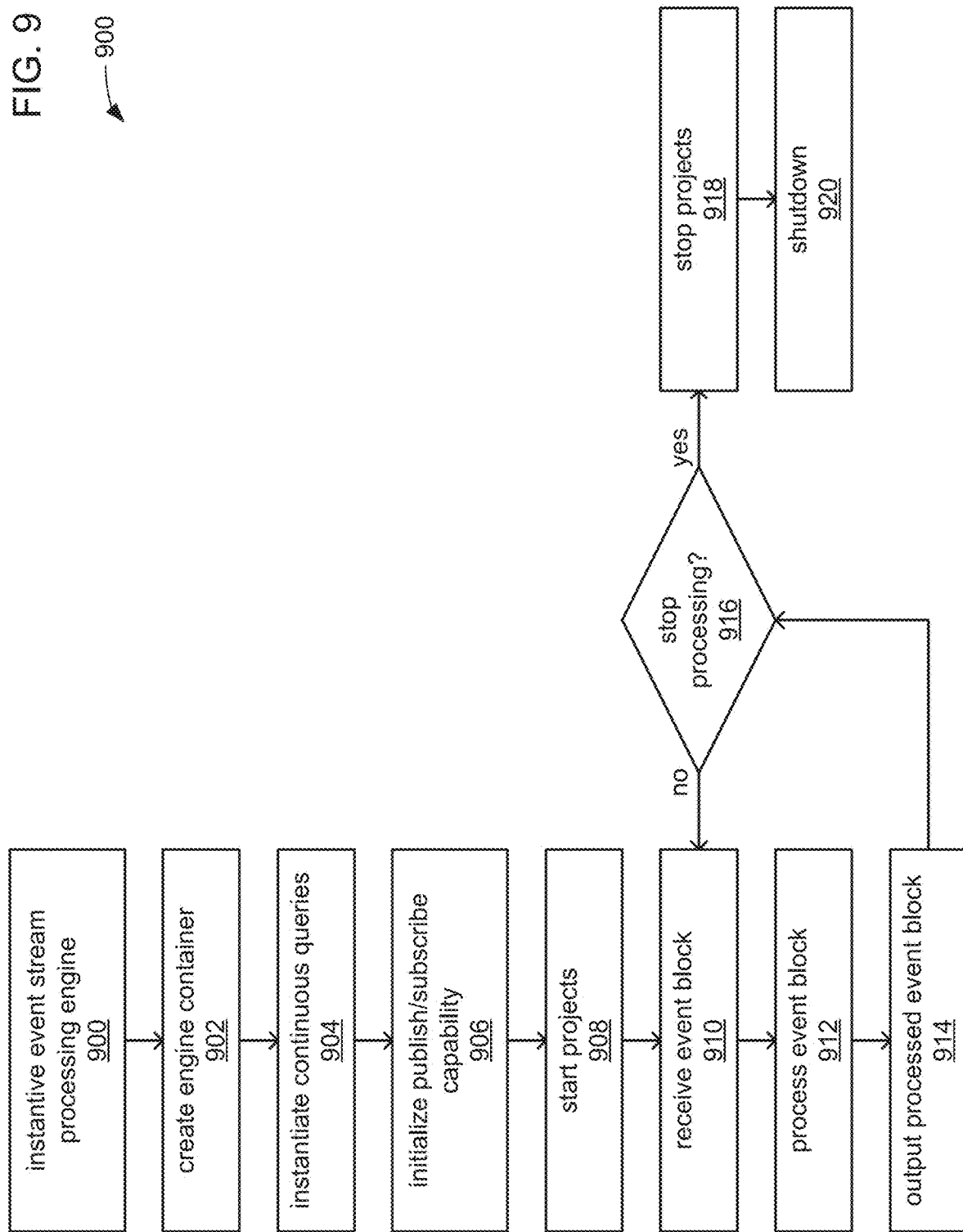
FIG. 9 illustrates a flow chart showing an example process including operations performed by an event stream processing engine, according to some embodiments of the present technology.
Figure 10:
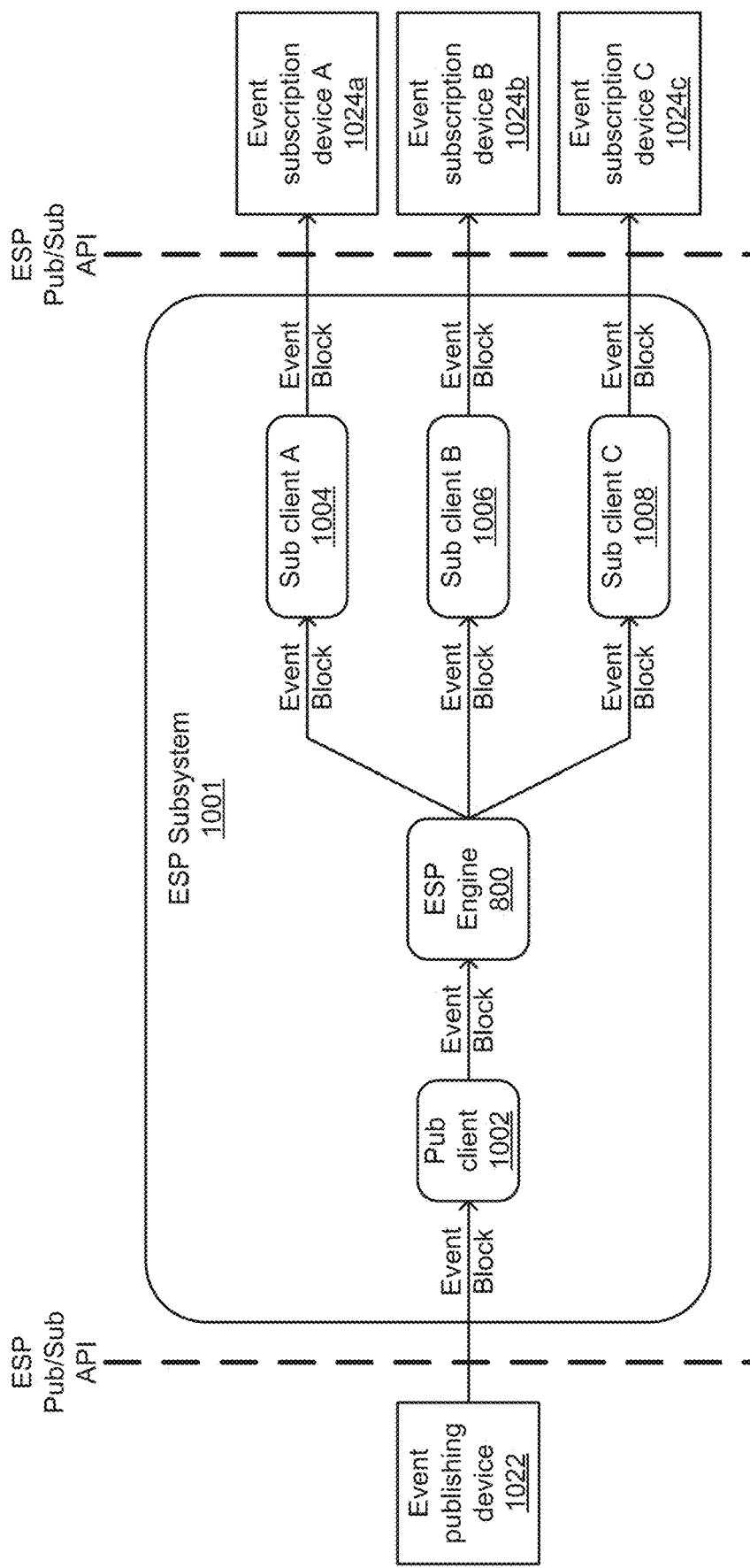
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
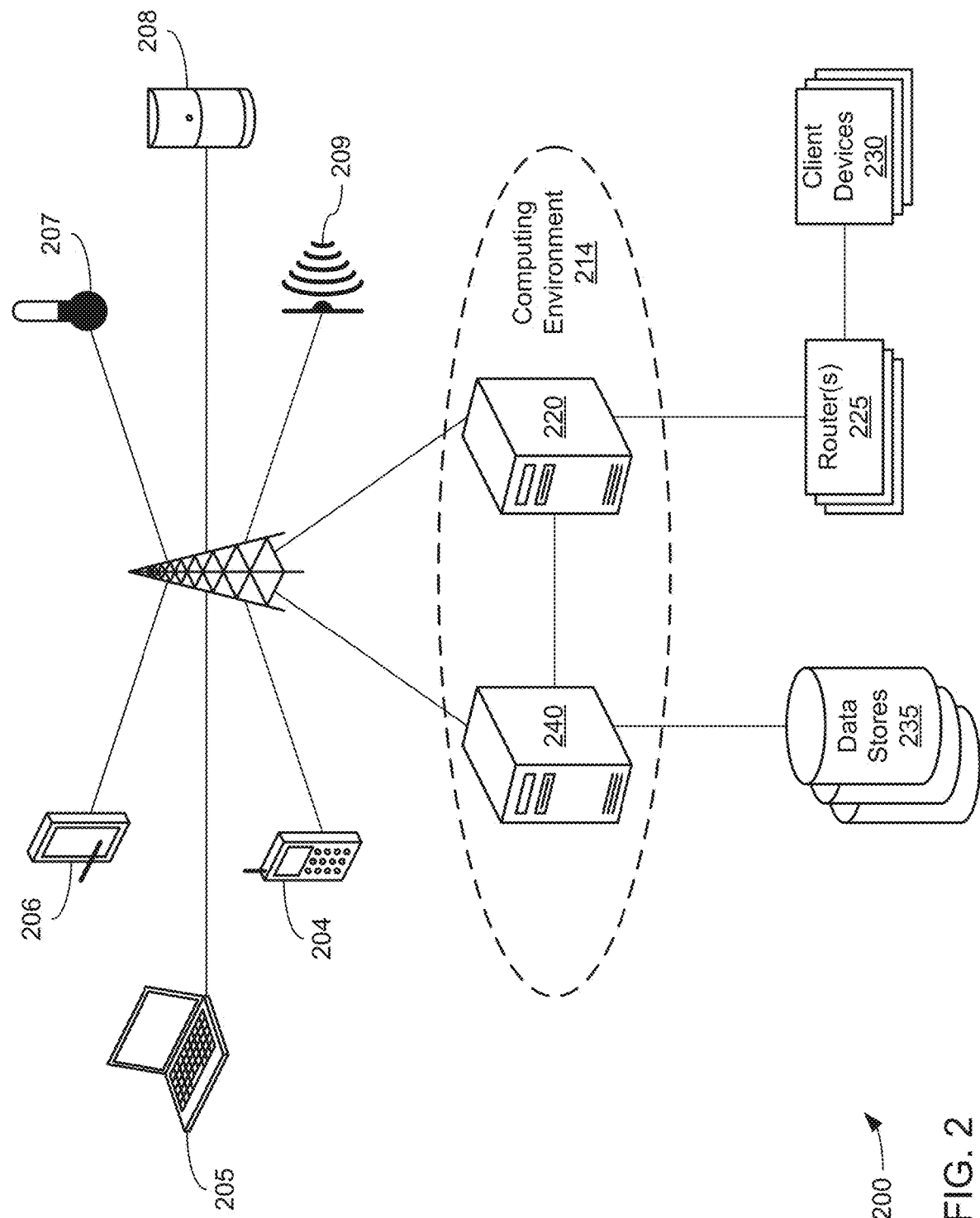
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
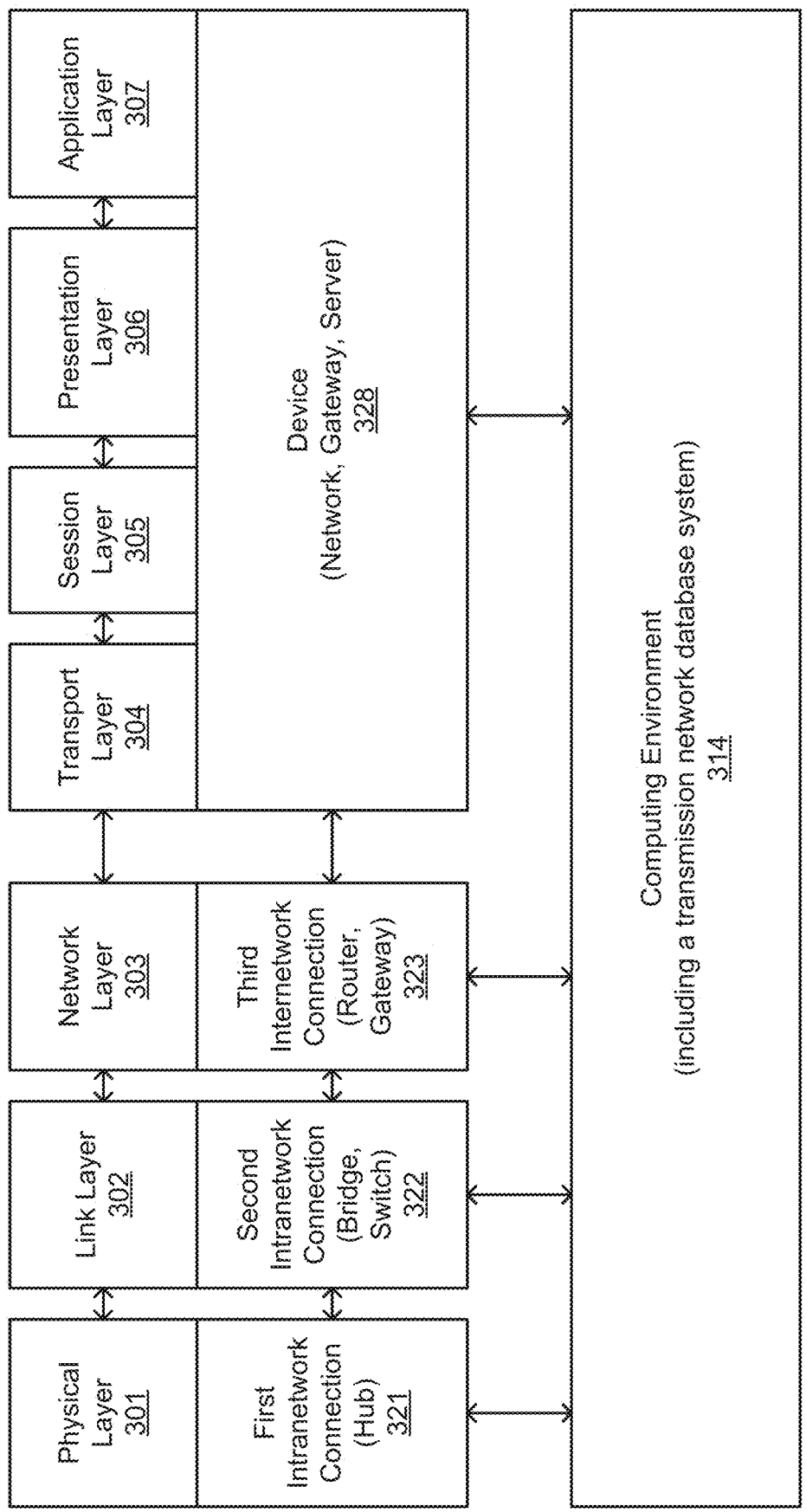
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory.

Each node may be assigned a particular task such as a portion of a processing project, or to organize or control other nodes within the grid.

Figure 4:
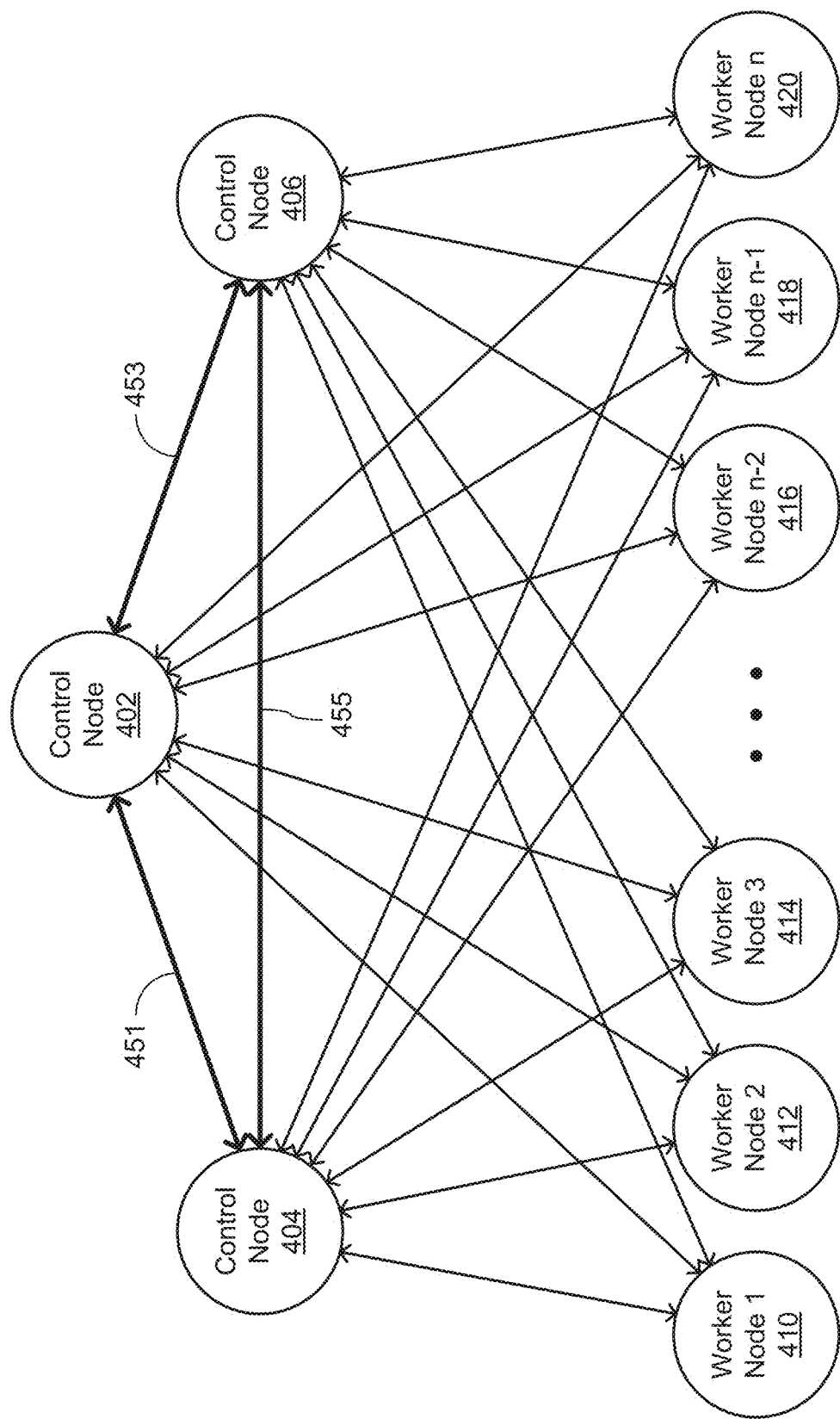
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
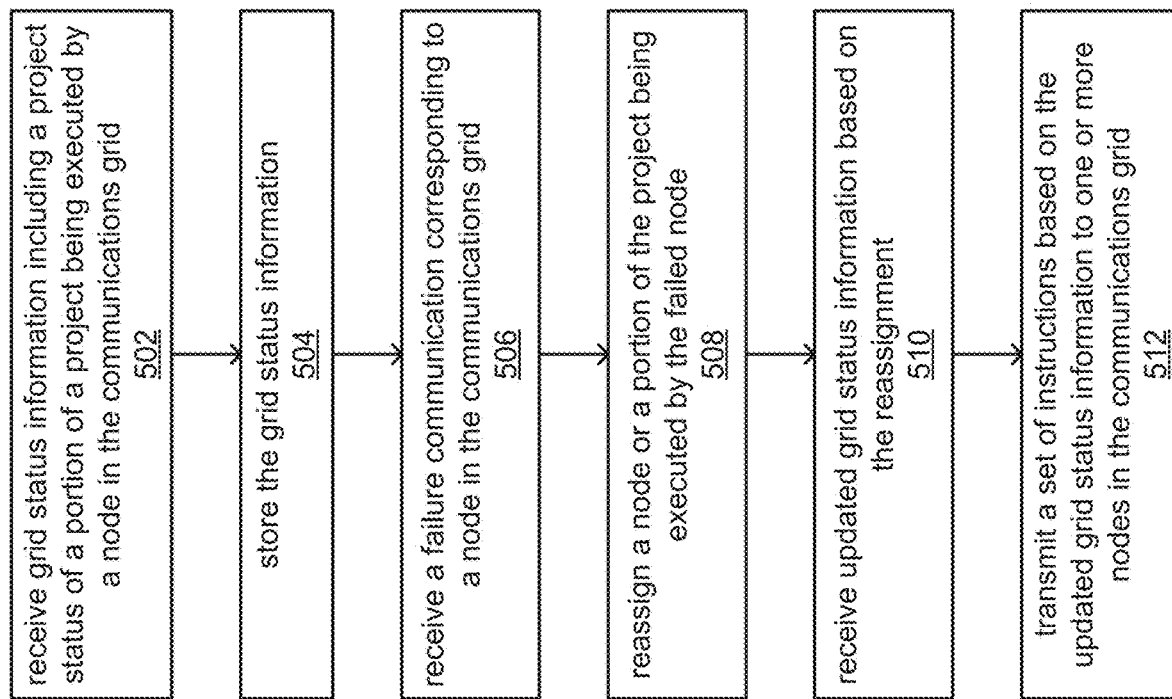
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
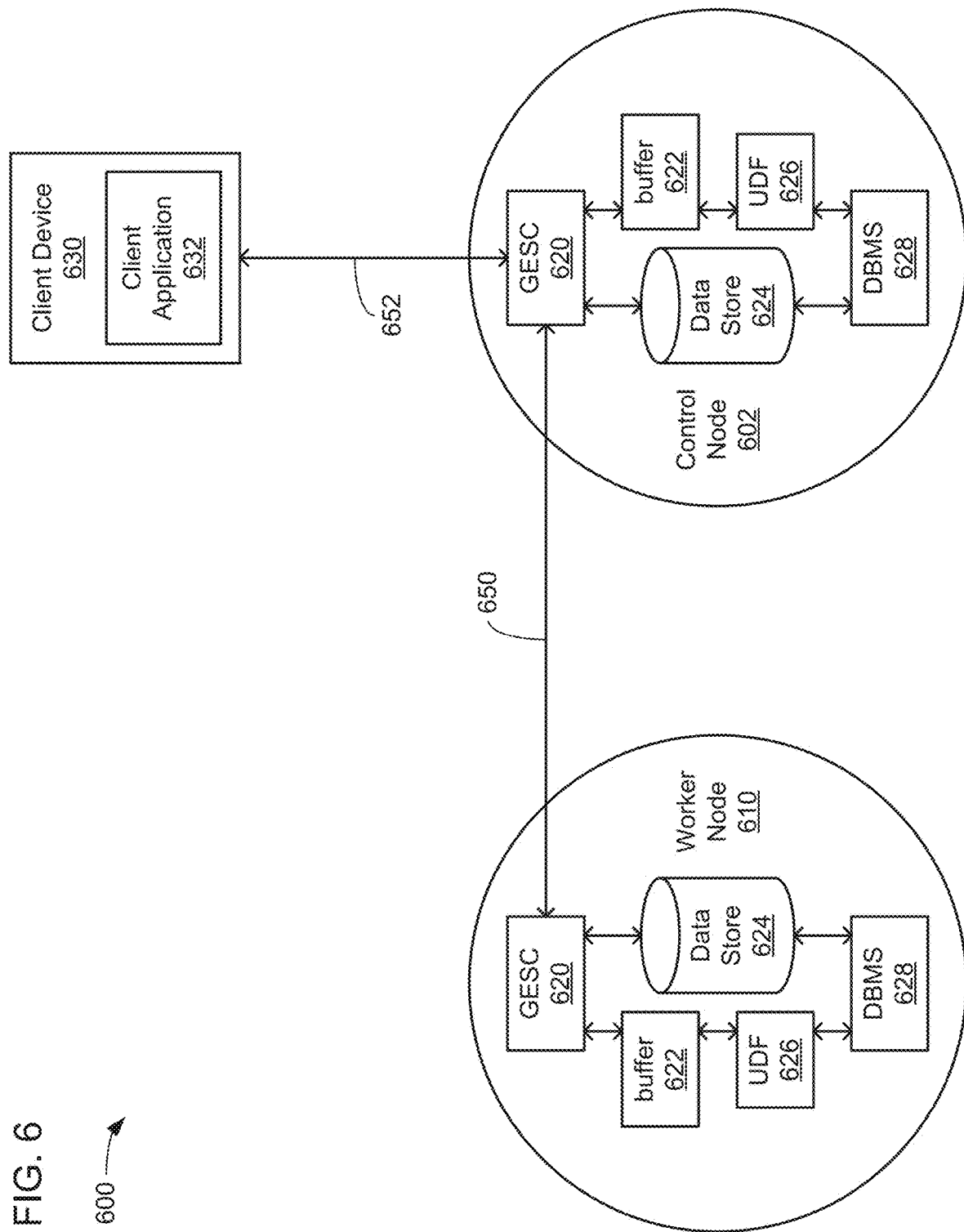
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
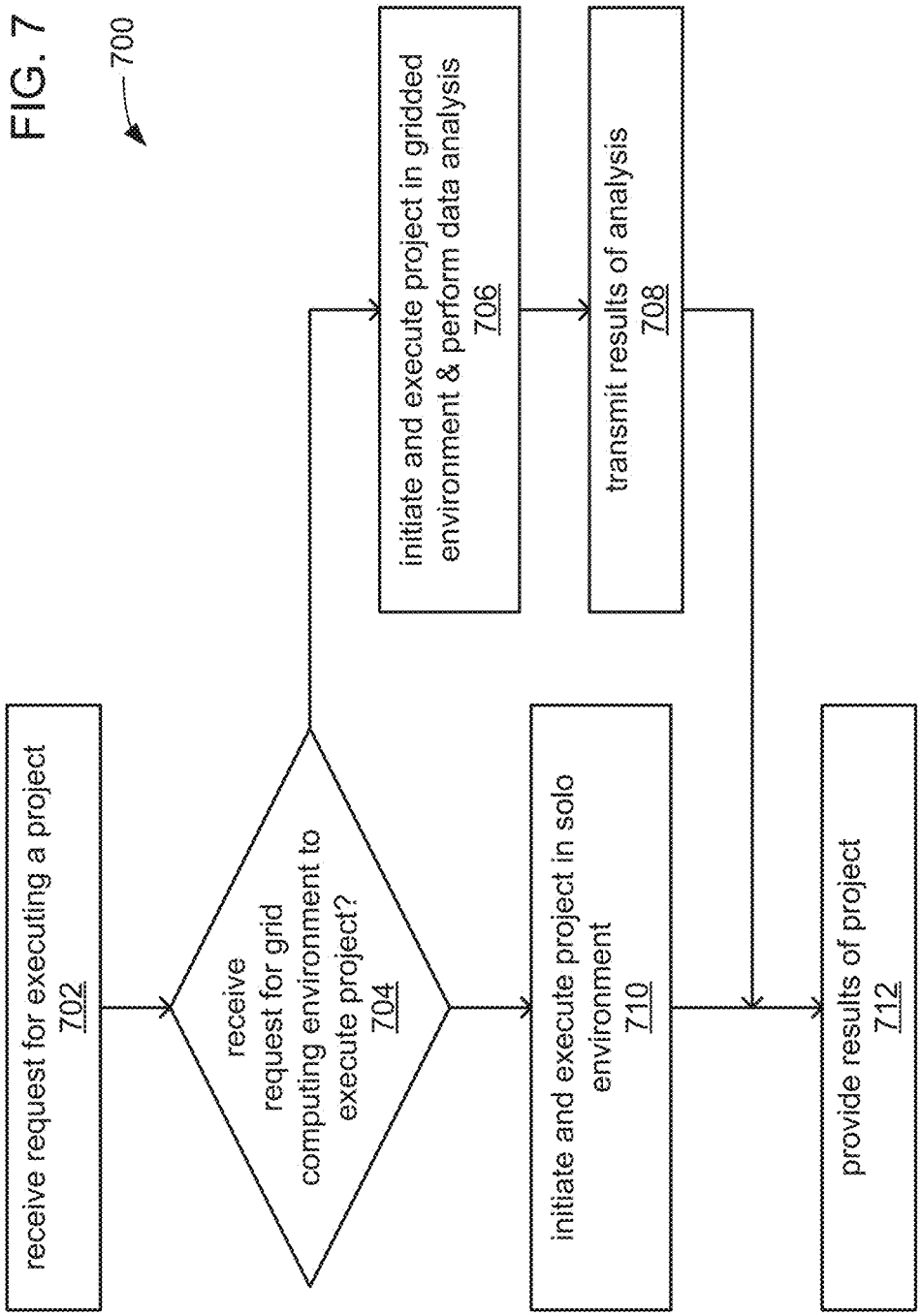
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
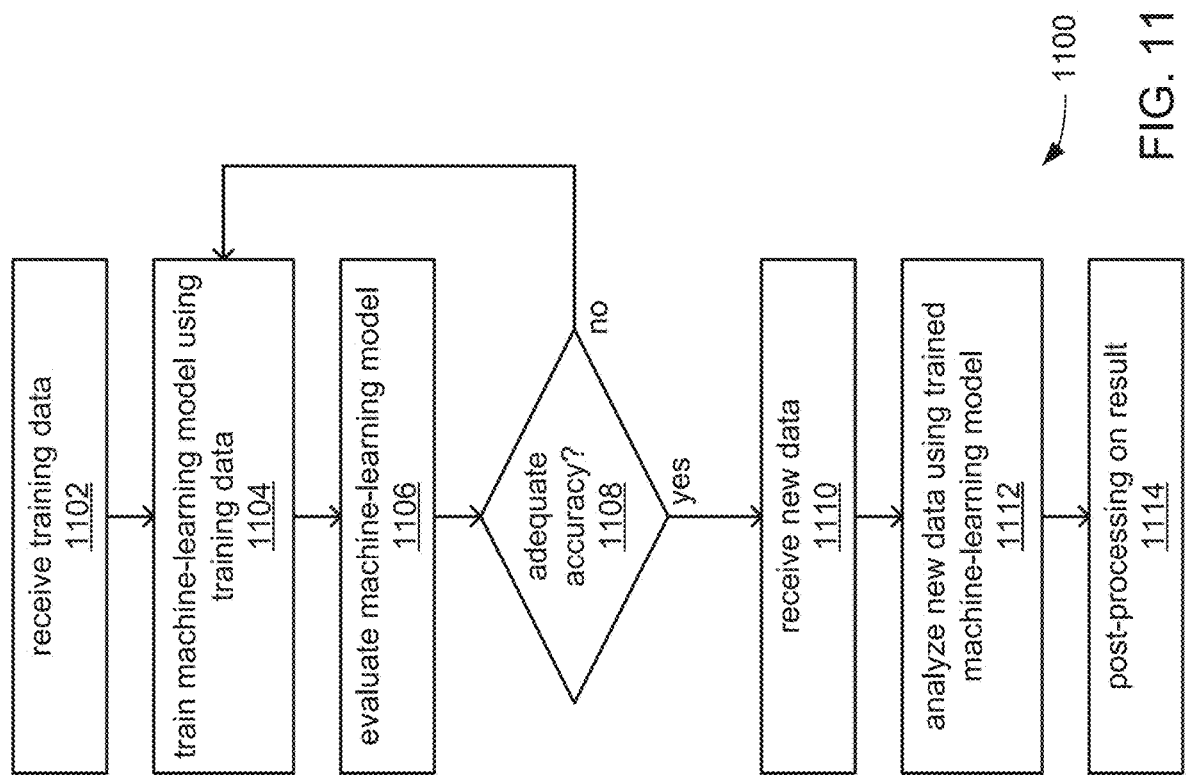
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
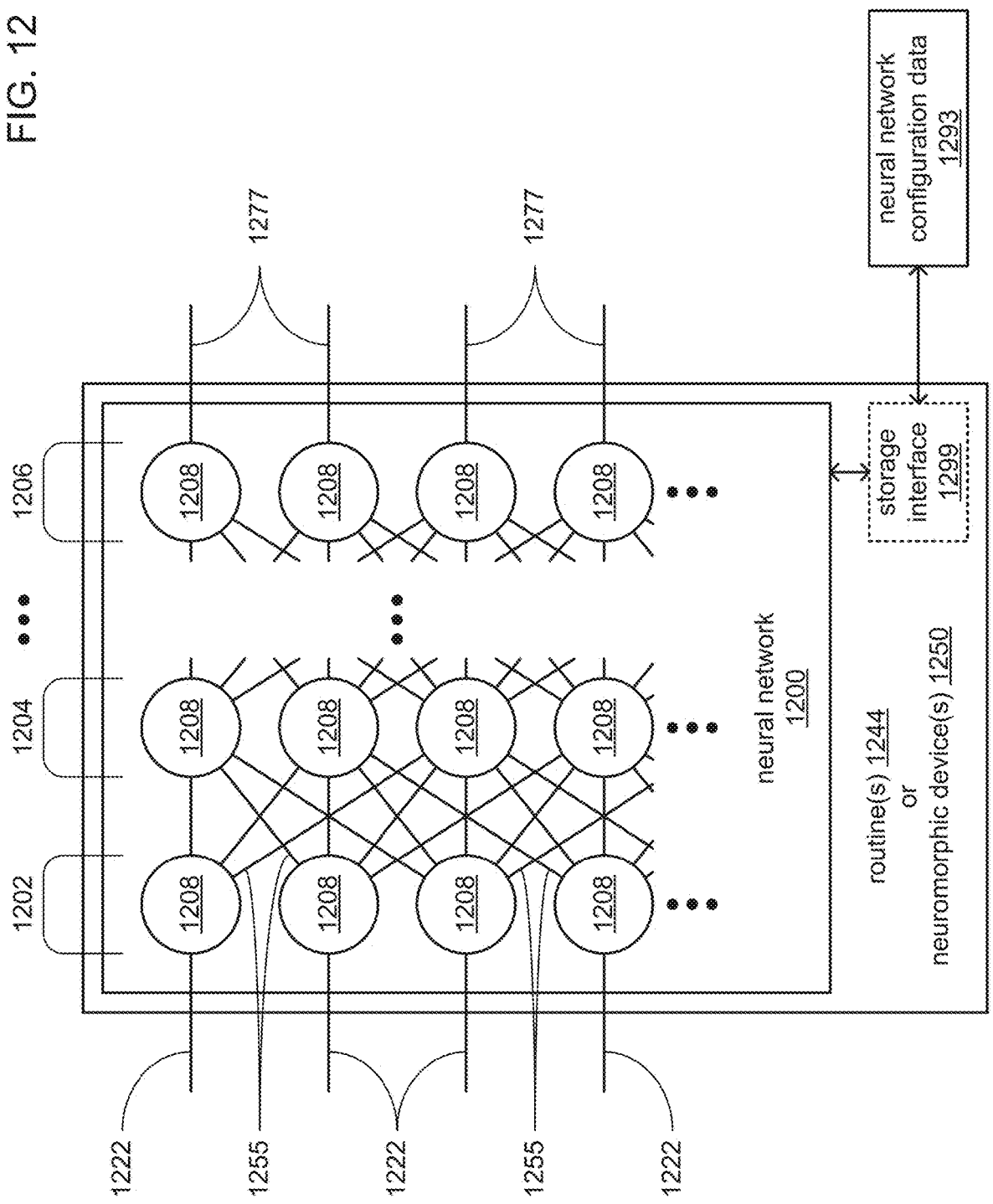
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, o) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
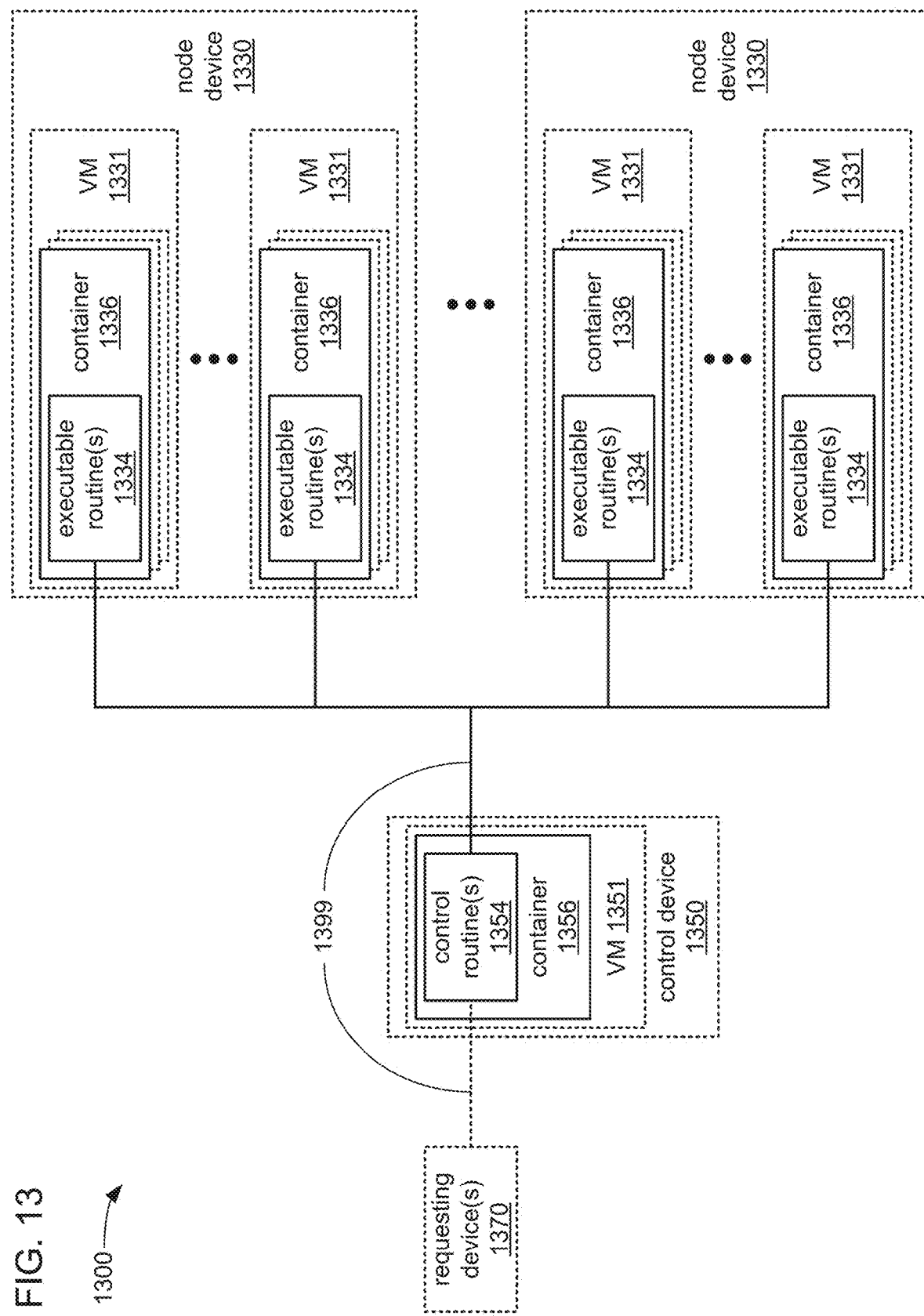
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

The systems, methods, computer program products, and embodiments described herein may be implemented in a variety of technology areas where data needs to be transferred between multiple computer processes running on a single computer. This includes, but is not limited to, cloud applications, data exchange systems, analytics platforms, streaming services, and any other type of system, service, or application that requires inter-process communication on a single computing device or machine.

Furthermore, as described in more detail herein, the systems, methods, computer program products, and embodiments may use multiple computer processes to execute analytical functions. The analytical functions may be encoded to use one or more algorithms written in a programming language suitable for performing the respective computational task. For example, an analytical function may be encoded to use an algorithm implemented in Python that leverages one or more machine learning frameworks such as PyTorch or TensorFlow, which are often better suited for machine learning applications than similar libraries available in other programming languages. At least one technical advantage of encoding analytical functions to use one or more algorithms written in a programming language "best" suited for the respective computational task may improve execution efficiency and reduce the complexity involved in developing analytical functions.

The systems, methods, computer program products, and embodiments may use a parent-child computer process relationship to execute an analytical function. In such systems, methods, computer program products, and embodiments, the parent computer process may execute instructions in a first programming language (e.g., C++) to perform data handling tasks (e.g., obtaining datasets, configuration data, etc.), invoke the analytical function, and launch a child computer process to execute the algorithm associated with the analytical function. Furthermore, in such systems, methods, computer program products, and embodiments, the child computer process may request data from the parent computer process, obtain the requested data, and execute the algorithm using the obtained data. At least one technical advantage of such a parent-child computer process relationship may enable the systems, methods, computer program products, and embodiments to execute analytical functions without being constrained to a single-language compute environment, allowing each computer process to operate in a runtime environment optimized for their respective tasks.

The systems, methods, computer program products, and embodiments may further transfer requests, commands, and data between the child computer process and the parent computer process using one or more cross-process queues. To transfer the requests, commands, and data between the child computer process and the parent computer process, the systems, methods, computer program products, and embodiments, may serialize the requests, commands, and data into a binary data format and write the serialized requests, serialized commands, and serialized data to the one or more cross-process queues. A subsequent computer process may function to read the serialized requests, serialized commands, and serialized data from the one or more cross-process queue and deserialize the serialized requests, the serialized commands, and the serialized data into a data structure compatible with the programming language and runtime environment associated with the subsequent computer process. At least one technical advantage of such serialization and deserialization may enable the conversion of data from a representation in a first programming language (e.g., C++) to a corresponding representation in a second programming language (e.g., Python), and vice versa. Another technical advantage of serializing data (e.g., converting the data into a compact binary data format) enables a faster data transfer between computer processes when compared to transferring the data in the corresponding native language representation (e.g., C++, Python, etc.). Accordingly, serializing the data into the corresponding binary data format reduces the amount of time needed to transfer the data from one computer process to another computer process and reduces the total amount of memory needed during the data transfer operation. Another technical advantage of deserializing data enables the receiving computer process to reconstruct the serialized data into a suitable data representation or format compatible with the receiving computer process, which allows the data to be available for immediate use and processing.

The systems, methods, computer program products, and embodiments may further invoke one or more application programming interface (API) functions to facilitate communication, coordination, and data exchange between the parent computer process and the child computer process. Such API functions may be designed to perform a variety of tasks, including creating requests for parameters or datasets, creating response messages, transmitting execution commands, executing data serialization and deserialization protocols, writing and reading messages to and from cross-process queues, logging execution events or errors, and transferring computational results. At least one technical advantage of such API functions may provide a reliable communication mechanism for transmitting requests, commands, response messages, and data between the parent computer process and the child computer process. Another technical advantage of invoking such API functions may provide enhanced computing performance by enabling parent and child computer processes to efficiently execute tasks such as data serialization tasks, deserialization tasks, and data transfer tasks through structured protocols, thereby reducing communication overhead, minimizing latency, and ensuring reliable inter-process communication.

The systems, methods, computer program products, and embodiments may further implement and use one or more cross-process queues to transfer data between a plurality of computer processes operating within a POSIX-compliant operating system. In traditional POSIX-compliant operating systems, transferring data between computer processes present significant technical challenges because each process operates within its own distinct memory address space, and memory addresses in one computer process do not correspond to the same physical memory locations in another computer process. Thus, transferring data across computer processes in traditional POSIX-compliant operating systems is not typically feasible because computer processes do not share the same memory address space. However, by implementing and using the one or more cross-process queues, the systems, methods, computer program products, and embodiments provide a mechanism that overcomes the traditional barriers of transferring data between computer processes in POSIX-compliant operating systems.

Furthermore, in such systems, methods, computer program products, and embodiments, fewer computing resources (e.g., fewer central processing units, fewer graphics processing units, etc.) may be needed to execute a computational task (e.g., analytical operation, analytical function, etc.) because each respective algorithm underpinning an analytical function may be encoded in a programming language best suited for the respective computational task. Encoding an algorithm in a programming language not well-suited for the respective computational task may lead to computational inefficiencies, as it may take significantly longer to compute a computational result and require more compute resources to achieve the same computational result. For instance, executing a machine learning operation in C++ instead of Python may result in more compute resources being used because C++ lacks access to specialized machine learning frameworks like TensorFlow or PyTorch, which are designed to efficiently handle machine learning-based computational tasks.

Furthermore, in such systems, methods, computer program products, and embodiments, fewer input/output (I/O) exchanges are required to execute a computational task (e.g., analytical operation, analytical function, etc.) because serialization and deserialization of data significantly reduce the number of operations needed to write data to the cross-process queue and read the data from the cross-process queue. For example, instead of transferring a 50 GB dataset encoded in a data structure of C++ or Python—where the transfer would require numerous, large, and fragmented read and write operations—the dataset may be serialized into a compact binary format that can be transferred in fewer read/write operations. Thereby, reducing the I/O overhead associated with inter-process communication, minimizing latency, and optimizing the use of memory and computational resources, enabling faster and more efficient execution of computational tasks.

Furthermore, in such systems, methods, computer program products, and embodiments, less memory may be required to store and transfer computational results during or after the execution of a computational task because the computational results are serialized into a binary data format before transmission. Transferring computational results in their native data structures, such as Python dictionaries or C++ objects, often involves additional metadata, padding, or unoptimized data representations that increase memory usage. By serializing the computational results into a binary data format, the memory footprint may be significantly reduced, as redundant metadata and structural overhead are eliminated. For example, a ten-gigabyte computational result represented in one or more data structures of Python may require substantial memory, whereas the serialized version may represent the same computational result with a fraction of the memory, enabling more efficient storage, faster data transfers, and improved resource utilization across computer processes.

Figure 14:
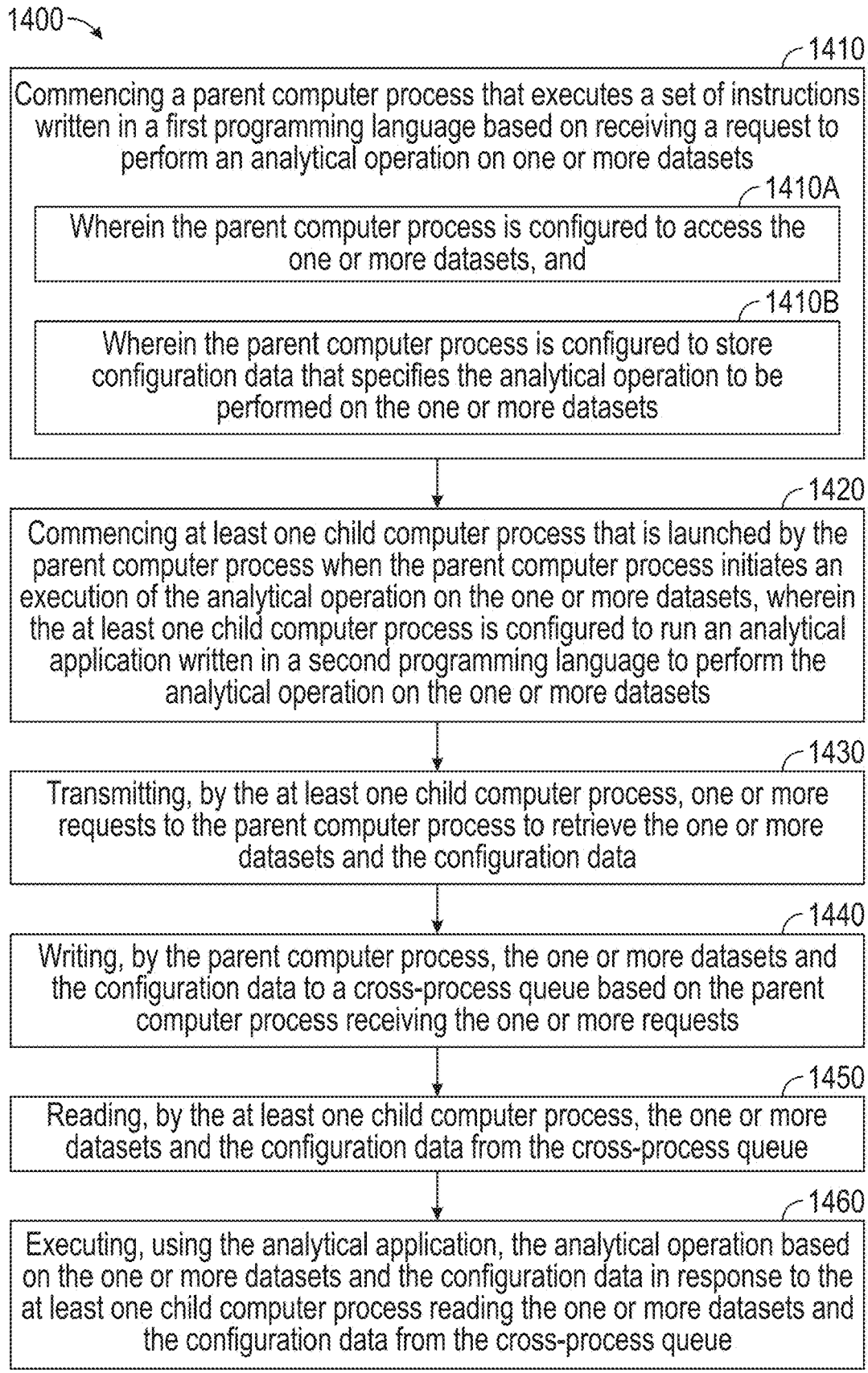
FIG. 14 illustrates a flow chart showing an example process executing an analytical operation using multiple computer processes, according to some embodiments of the present technology.

FIG. 14 illustrates one embodiment of a method 1400 for performing a computer procedure across multiple computer processes and multiple programming languages. It shall be appreciated that other embodiments contemplated within the scope of the present disclosure may involve more operations, fewer operations, different operations, or a different order of operations than as shown in FIG. 14.

Commencing a Parent Computer Process

In one or more embodiments, method 1400 may include process 1410. Process 1410, which may include commencing a parent computer process, may function to commence a parent computer process based on receiving a request to perform an analytical operation. An analytical operation, as generally referred to herein, may specify a computational task, a computer procedure, a computer function, or a set of computational steps to be performed by a system or service implementing method 1400. It shall be recognized that the phrase "parent computer process" may be interchangeably referred to herein as a "first computer process," a "computer process," an "operating system process," or the like.

In one or more embodiments, process 1410 may receive a request to perform an analytical operation from a user, a software application, or a software solution that may be directly or indirectly associated with the system or service implementing method 1400. The analytical operation, in one or more embodiments, may be a data visualization operation, a trend analysis operation, a machine learning model training operation, a statistical analysis operation, a data mining operation, a text mining operation, a text parsing operation, a text categorization operation, an image processing operation, a network analysis operation, an artificial neural network training operation, an artificial neural network scoring operation, a data clustering operation, a data cardinality operation, a principal component analysis operation, a quantile regression operation, a data preprocessing operation, a data transformation operation, a sentiment analysis operation, or the like. In one or more embodiments, to perform the analytical operation, the system or service implementing method 1400 may use multiple computer processes when the analytical operation uses one or more software libraries or algorithms incompatible with the parent computer process. It shall be recognized that process 1410 may obtain any other suitable type of request without departing from the scope of the disclosure.

In one or more embodiments, process 1410 may receive the request to perform the analytical operation via a graphical user interface that may be accessible by or provided to users of the system or service implementing method 1400. The graphical user interface, in one or more embodiments, may include one or more graphical user interface objects that may enable users to intuitively interact with the system or service. For instance, in a non-limiting example, process 1410 may receive a request to perform an analytical operation based on a user interacting with, providing input to, and/or selecting at least a subset of the one or more graphical user interface objects.

Additionally, or alternatively, in one or more embodiments, process 1410 may receive the request to perform the analytical operation via a network or application programming interface (API) call that may have originated from one or more microservices or one or more applications directly or indirectly associated with the system or service implementing method 1400. That is, in some embodiments, the application programming interface (API) call may include a payload comprising the request to perform the analytical operation.

Figure 15:
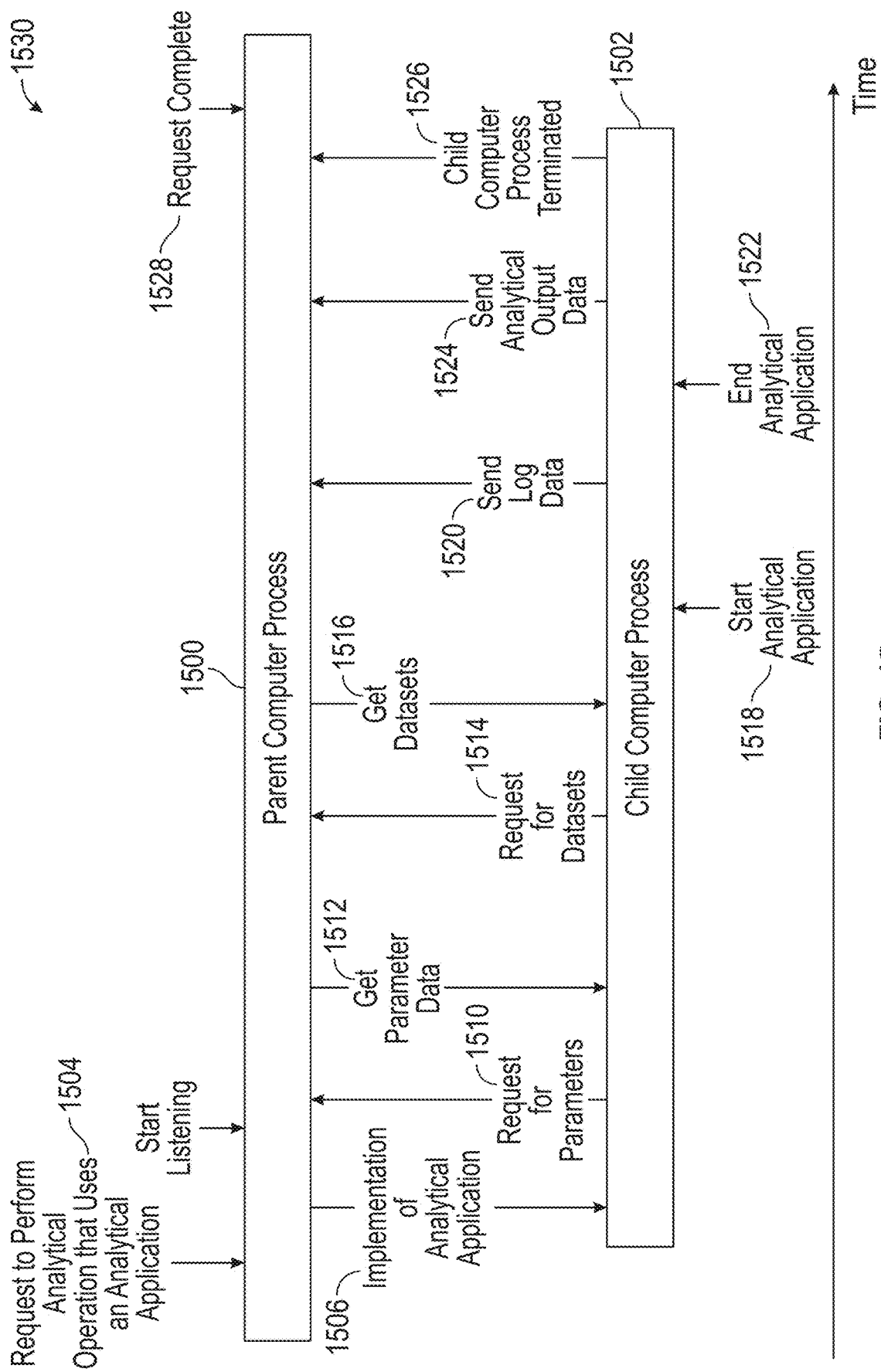
FIG. 15 illustrates an example schematic of an analytics service using a parent computer process and at least one child computer process to perform an analytical operation, according to some embodiments of the present technology.

Turning to FIG. 15, in one or more embodiments, analytics service 1530 may use multiple computer processes that execute computer instructions written in different programming languages to handle and execute inbound computational requests. For instance, in a non-limiting example, analytics service 1530 may receive analytical request 1504 and, in turn, commence or start parent computer process 1500. Parent computer process 1500, in one or more embodiments, may function as an analytics backend service capable of performing a plurality of backend operations or tasks (e.g., fetching data from a computer database, saving computational results to a computer database, logging events, etc.), as described in more detail herein. It shall be recognized that, in one or more embodiments, parent computer process 1500 may execute computer instructions of the analytics backend service in a first programming language (e.g., C++).

In one or more embodiments, analytics service 1530 may provide a plurality of predefined analytical operations (e.g., plurality of predefined analytical functions, plurality of predefined computer procedures, etc.) that are executable by analytics service 1530. In such an embodiment, each predefined analytical operation or at least a subset of the plurality of predefined analytical operations may be encoded or configured to use a distinct analytical application written in a programming language different from the first programming language (e.g., C++) to perform the respective analytical operation. For instance, in a non-limiting example, a first analytical operation (e.g., linear regression operation) of the plurality of predefined analytical operations may be configured to use a first analytical application written in Python to perform a linear regression task. In another non-limiting example, a second analytical operation (e.g., machine learning model training operation) of the plurality of predefined analytical operations may be configured to use a second analytical application written in Python to perform a model training task. In another non-limiting example, a third analytical operation of the plurality of predefined analytical operations may be configured to use an optimization algorithm written in Python to perform an optimization task. Stated another way, in one or more embodiments, each predefined analytical operation (e.g., analytical function or the like) of the subset may be encoded with a first set of instructions for performing a computational task in one programming language (e.g., Python) and a second set of instructions for performing data acquisition and configuration handling tasks in another programming language (e.g., C++).

Accordingly, in one or more embodiments, analytical request 1504 may specify an analytical operation from the plurality of predefined analytical operations to be performed by analytics service 1530. The analytical operation, in such an embodiment, may be encoded or configured to use an analytical application, written or developed in a programming language different from that of the analytics backend service and/or analytics service 1530, to perform the analytical operation. Furthermore, in such an embodiment, analytical request 1504 may specify one or more datasets on which the analytical operation is to be executed and/or configuration data that controls how the analytical operation is to be executed.

Configuration data, as generally referred to herein, may include a set of parameters, settings, or instructions that may define how the analytical operation (e.g., computer function or the like) is to be executed. For instance, in a non-limiting example, configuration data may include one or more of the analytical operation to be performed, one or more parameters (e.g., user-provided parameter values, default parameter values, function parameters, etc.) that control how the analytical operation is to be executed, and the one or more datasets on which the analytical operation is to be performed thereon.

In one or more embodiments, during the commencement of parent computer process 1500 or after parent computer process 1500 is commenced, parent computer process 1500 may function to load the one or more datasets and the configuration data associated with analytical request 1504 into memory of parent computer process 1500. For instance, in a non-limiting example, analytics service 1530 may receive analytical request 1504 that specifies a dataset, an analytical function (e.g., linear regression function) of the analytics service 1530 to perform on the dataset, and one or more parameters (e.g., a first set parameters that specify a target variable within the dataset to be predicted, a second set of parameters that specify one or more predictor variables within the dataset, etc.). Accordingly, in such a non-limiting example, based on analytics service 1530 receiving analytical request 1504, parent computer process 1500 may function to access or obtain the dataset from a computer database of the analytics backend service and, in turn, load or write the dataset into memory of parent computer process 1500 (e.g., process 1410A). Additionally, in such a non-limiting example, based on analytics service 1530 receiving analytical request 1504, parent computer process 1500 may function to load or write the one or more parameters specified within analytical request 1504 into memory of parent computer process 1500 (e.g., process 1410B).

It shall be recognized that, in another non-limiting example, analytical request 1504 may specify an analytical operation to be performed on one or more datasets, however, may not specify any user-provided parameters for the analytical operation. In such a non-limiting example, based on determining analytical request 1504 does not specify any parameters for the analytical operation, parent computer process 1500 may obtain a default set of parameters for the corresponding analytical operation from a configuration data repository or the like of the analytics backend service and, in turn, load or write the default set of parameters into memory of parent computer process 1500.

Commencing a Child Computer Process

In one or more embodiments, method 1400 may include process 1420. Process 1420, which may include commencing at least one child computer process, may function to commence one or more child computer processes when a subject parent computer process initiates an execution of an analytical operation associated with a respective analytical request. A child computer process, as generally referred to herein, may function to execute one or more analytical applications associated with a subject analytical operation to perform the requested computational task. It shall be recognized that the phrase "child computer process" may be interchangeably referred to herein as a "second computer process," an "auxiliary computer process," an "analytics execution process," or the like.

In one or more embodiments, analytics service 1530 may use a parent-child computer process relationship to perform an analytical operation when the analytical operation uses an analytical application that requires execution in a different runtime environment than that of the parent computer process. At least one technical benefit of such parent-child computer process relationship may enable the parent computer process to handle dataset and configuration data management in a first runtime environment (e.g., C++ runtime environment), while the child computer process performs the requested computation in a second runtime environment (e.g., Python runtime environment) by executing the associated analytical application. In other words, analytics service 1530 implementing method 1400 may enable analytical operations (e.g., analytical functions, computer procedures, etc.) to be created and executed in any suitable programming language, irrespective of the programming language used by analytics service 1530 or the analytics backend service.

Referring to FIG. 15, in one or more embodiments, analytics service 1530 may receive analytical request 1504 and, in turn, commence parent computer process 1500 that executes computer instructions written in a first programming language (e.g., C++). Analytical request 1504, in such an embodiment, may specify one or more datasets, an analytical operation (e.g., analytical function, etc.) to be performed on the one or more datasets, and configuration data that includes one or more parameters specifying conditions that control how the analytical operation (e.g., analytical function, etc.) is to be performed. It shall be further recognized that, in such an embodiment, to perform the analytical operation on the one or more datasets, the analytical operation may be encoded to use an analytical application written in a second programming language (e.g., Python).

Accordingly, in one or more embodiments, parent computer process 1500 may function to initiate an execution (e.g., call for an execution) of the analytical operation and, in turn, analytics service 1530 may commence a child computer process 1502 in response to parent computer process 1500 initiating the execution of the analytical operation. Stated another way, in one or more embodiments, parent computer process 1500 may launch child computer process 1502 when parent computer process 1500 initiates an execution (e.g., calls for an execution) of the analytical operation. At least one technical benefit of launching child computer process 1502 may enable the execution of analytical operations (e.g., analytical functions or the like) that use at least one analytical application written in a programming language (e.g., Python) incompatible with parent computer process 1500 (e.g., incompatible with the runtime environment of parent computer process 1500).

In other words, in one or more embodiments, during the commencement of child computer process 1502 or after child computer process 1502 is commenced, child computer process 1502 may be configured to run the at least one analytical application to perform the analytical operation invoked by parent computer process 1500. It shall be recognized that, in one or more embodiments, configuring child computer process 1502 to run the at least one analytical application may include loading one or more of a code interpreter for the target programming language (e.g., Python interpreter), one or more software libraries or dependencies (e.g., Pandas, NumPy, PyTorch, etc.) used by the at least one analytical application, and the at least one analytical application into memory of child computer process 1502. In other words, child computer process 1502 may be configured to run (e.g., execute) computer code written in the target programming language by creating a runtime environment compatible with the target programming language (e.g., the runtime environment may include the code interpreter for the target programming language, the one or more software libraries or dependencies used by the at least one analytical application, and the at least one analytical application).

For instance, in a non-limiting example, parent computer process 1500, executing instructions in a first programming language (e.g., C++), may initiate an execution of an analytical operation specified by analytical request 1504. The analytical operation, in such a non-limiting example, may be encoded or configured to use a pre-developed analytical application, written in a second programming language (e.g., Python), that is specifically designed to perform the analytical operation. Accordingly, based on parent computer process 1500 initiating the execution of the analytical operation, parent computer process 1500 may launch child computer process 1502 to run (e.g., execute or the like) the pre-developed analytical application to perform the analytical operation.

In another non-limiting example, parent computer process 1500, executing instructions in a first programming language (e.g., C++), may initiate an execution of a model training operation (e.g., analytical operation) specified by analytical request 1504. The model training operation, in such a non-limiting example, may be encoded or configured to use a pre-developed model training application, written in a second programming language (e.g., Python), that is specifically designed to execute a model training task. Accordingly, based on parent computer process 1500 initiating the execution of the model training operation, parent computer process 1500 may launch child computer process 1502 to run (e.g., execute or the like) the pre-developed model training application to perform the model training task.

In another non-limiting example, parent computer process 1500, executing instructions in a first programming language (e.g., C++), may initiate an execution of a data analysis operation (e.g., analytical operation) specified by analytical request 1504. The data analysis operation, in such a non-limiting example, may be encoded or configured to use a pre-developed algorithm (e.g., analytical application), written in a second programming language (e.g., Python), that is specifically designed to execute a target data analysis task. Accordingly, based on parent computer process 1500 initiating the execution of the data analysis operation, parent computer process 1500 may launch child computer process 1502 to run (e.g., execute or the like) the pre-developed algorithm to perform the target data analysis task.

In another non-limiting example, parent computer process 1500 may function to initiate an execution of an analytical operation specified by analytical request 1504. The analytical operation, in such a non-limiting example, may be encoded or configured to use an analytical application or an analytical algorithm specifically configured to perform the analytical operation. Accordingly, based on parent computer process 1500 initiating the execution of the analytical operation, parent computer process 1500 may launch child computer process 1502, which may be responsible for the implementation of analytical application 1506 or the analytical algorithm.

Transmitting Data Requests

In one or more embodiments, method 1400 may include process 1430. Process 1430, which may include transmitting one or more data requests, may function to transmit the one or more data requests from child computer process 1502 to parent computer process 1500. A data request, as generally referred to herein, may relate to a request to obtain, from parent computer process 1500, data of a target data type that the analytical application may need to perform the requested analytical operation. It shall be recognized that the phrase "data request" may be interchangeably referred to herein as a "request" or the like.

In one or more embodiments, after child computer process 1502 is commenced, child computer process 1502 may operate as a leader process to send the one or more data requests to parent computer process 1500, and parent computer process 1500 may operate as a listener process to receive and fulfill the one or more data requests.

Figure 16:
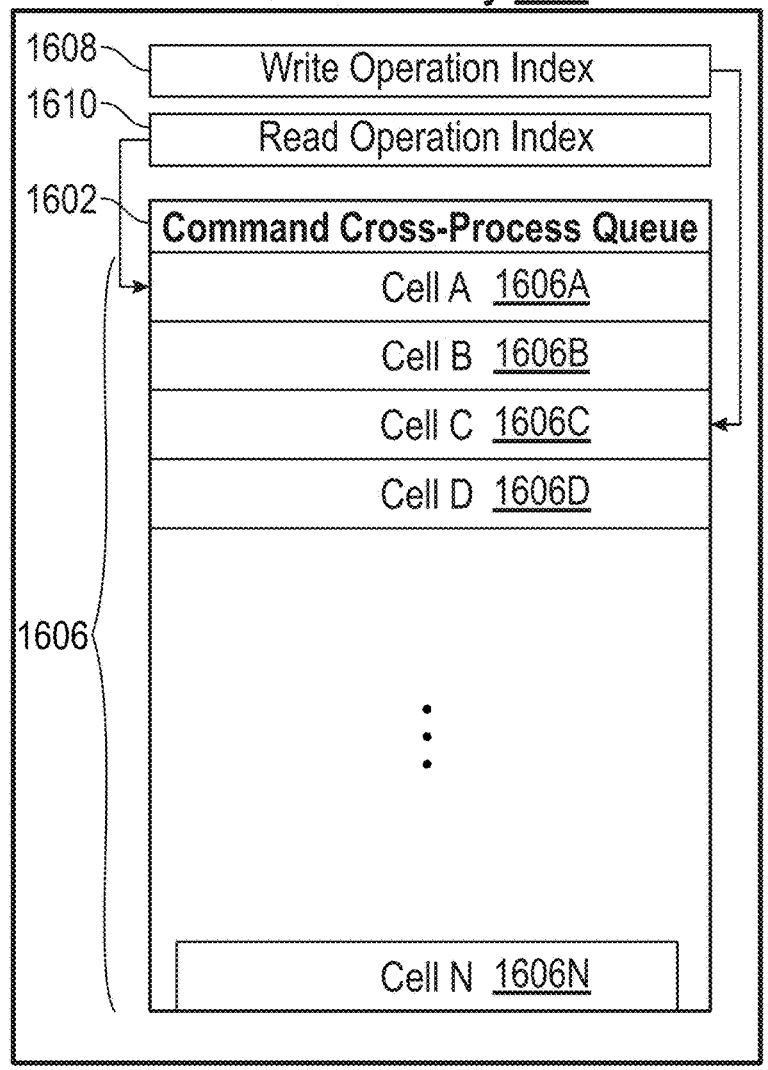
FIG. 16 illustrates an example schematic of a command cross-process queue, according to some embodiments of the present technology.

In one or more embodiments, process 1430 may use a command cross-process queue 1602 to transfer (e.g., transmit or the like) the one or more data requests from child computer process 1502 to parent computer process 1500, as shown generally by way of example in FIG. 16. Command cross-process queue 1602, in one or more embodiments, may be a single-producer, single-consumer queue that may enable a subject child computer process to write a data request to command cross-process queue 1602 and a subject parent computer process to read the data request from command cross-process queue 1602. In other words, in some embodiments, command cross-process queue 1602 may not be a multiple-producer, multiple-consumer queue that supports multiple computer processes writing data requests to command cross-process queue 1602 and multiple computer processes reading data requests from command cross-process queue 1602 at the same time.

In one or more embodiments, command cross-process queue 1602 may implement a timeout mechanism to prevent operations, such as reading or writing data requests, commands, or the like, to and/or from command cross-process queue 1602 from waiting indefinitely. For instance, in a non-limiting example, if a child computer process 1502 writes a data request (or command) to command cross-process queue 1602 and the parent computer process 1500 fails to read the data request (or the command) within the specified timeout period specified by the timeout mechanism, the write operation may fail, triggering an error or retry mechanism. This ensures a system or service implementing method 1400 remains responsive and avoids deadlocks caused by stalled computer processes. By enforcing a timeout, command cross-process queue 1602 may maintain reliable communication and allows for error recovery when delays or failures occur. In another non-limiting example, when child computer process 1502 writes a data request (or command) to command cross-process queue 1602, the write operation typically completes successfully if command cross-process queue 1602 has space. However, if parent computer process 1500 does not read the data request (or command) within a specified timeout period (e.g., 5-second timeout period), the read operation on parent computer process 1500 may fail. This timeout ensures parent computer process 1500 does not wait indefinitely for requests or commands, allowing the parent computer process 1500 to log the timeout event, retry the read operation, or invoke an error-handling routine.

Turning to FIG. 16, in one or more embodiments, command cross-process queue 1602 may be implemented in shared memory 1600 of computer 1604. Command cross-process queue 1602, in one or more embodiments, may include a plurality of cells 1606, such as cells 1606A-1606N. The plurality of cells 1606 may be used to temporarily store data for inter-process communication. It shall be recognized that each cell of the plurality of cells 1606 may be assigned a corresponding cell index value.

For instance, in a non-limiting example, command cross-process queue 1602 may include five (5) cells in which each cell is assigned a unique cell index value. In such a non-limiting example, a cell index value of zero (0) may correspond to the first cell of command cross-process queue 1602, a cell index value of one (1) may correspond to the second cell of command cross-process queue 1602, a cell index value of two (2) may correspond to the third cell of command cross-process queue 1602, a cell index value of three (3) may correspond to the fourth cell of command cross-process queue 1602, and a cell index value of four (4) may correspond to the fifth cell of command cross-process queue 1602.

Additionally, or alternatively, in one or more embodiments, a write operation index 1608 may be implemented within shared memory 1600 of computer 1604. The write operation index 1608, in one or more embodiments, may be configured to track which cells of the plurality of cells 1606 of command cross-process queue 1602 are available to have data written to them. In other words, in one or more embodiments, the write operation index 1608 may be configured to track index values of one or more cells of command cross-process queue 1602 that are available for writing.

Additionally, or alternatively, in one or more embodiments, a read operation index 1610 may be implemented within shared memory 1600 of computer 1604. The read operation index 1610, in one or more embodiments, may be configured to track which cells of the plurality of cells 1606 of command cross-process queue 1602 are available to have data read from them. In other words, in one or more embodiments, the read operation index 1610 may be configured to track index values of one or more cells of command cross-process queue 1602 that are available for reading.

Additionally, in one or more embodiments, cell synchronization data structure 1612 may be implemented within computer 1604. Cell synchronization data structure 1612, in one or more embodiments, may be configured to track a count of cells of the plurality of cells 1606 that are available to have data written to them (e.g., track a count of cells of the plurality of cells 1606 that are free) and track a count of cells of the plurality of cells 1606 that are available to have data read from them (e.g., track a count of cells of the plurality of cells 1606 that are not free).

It shall be recognized cell synchronization data structure 1612, write operation index 1608, and read operation index 1610 may govern the writing of data requests or commands to command cross-process queue 1602 and the reading of data requests or commands from command cross-process queue 1602, as described in more detail in method 2100.

It shall be further recognized that for implementing and using command cross-process queue 1602 and other components associated with command cross-process queue 1602, reference is made to U.S. Pat. No. 12,271,635, filed on 7 Jun. 2024, titled SYSTEMS AND METHODS FOR IMPLEMENTING AND USING A CROSS-PROCESS QUEUE WITHIN A SINGLE COMPUTER, which is incorporated herein in its entirety by this reference.

In one or more embodiments, child computer process 1502 may function to create a request for parameters 1510 and, in turn, write the request for parameters 1510 to command cross-process queue 1602. A request for parameters, as generally referred to herein, may include a request to obtain, from parent computer process 1500, parameter data associated with analytical request 1504. In other words, child computer process 1502 may function to transmit, using command cross-process queue 1602, the request for parameters 1510 to parent computer process 1500, which may instruct parent computer process 1500 to transfer parameter data (e.g., parameter data values, default parameter values, user-provided parameter values or the like) associated with analytical request 1504 to child computer process 1502. It shall be recognized that, in one or more embodiments, the analytical application configured to run on child computer process 1502 may need the parameter data to execute the analytical application.

For instance, in a non-limiting example, analytical request 1504 may specify an analytical operation, such as a linear regression operation, and child computer process 1502 may be configured to execute the analytical application that corresponds to the analytical operation to perform the linear regression operation. In such a non-limiting example, before executing the analytical application, the analytical application may require a set of parameters, such as a predictor variable parameter, one or more response variable parameters, and a fitting method parameter. Accordingly, in one or more embodiments, child computer process 1502 may function to create the request for parameters 1510 (e.g., request for configuration data, etc.) and, in turn, write the request for parameters 1510 to command cross-process queue 1602.

In another non-limiting example, analytical request 1504 may specify an analytical operation, such as a machine learning-based clustering operation, and child computer process 1502 may be configured to execute the analytical application that corresponds to the analytical operation to perform the machine learning-based clustering operation. In such a non-limiting example, before executing the analytical application, the analytical application may require a set of parameters, such as a cluster number parameter, a cluster distance parameter, and an iteration limit parameter. Accordingly, in one or more embodiments, child computer process 1502 may function to create the request for parameters 1510 (e.g., request for configuration data, etc.) and, in turn, write the request for parameters 1510 to command cross-process queue 1602.

Additionally, or alternatively, in one or more embodiments, child computer process 1502 may function to create a request for datasets 1514 and, in turn, write the request for datasets 1514 to command cross-process queue 1602. A request for datasets, as generally referred to herein, may include a request to obtain one or more datasets associated with analytical request 1504 from parent computer process 1500. In other words, child computer process 1502 may function to transmit, using command cross-process queue 1602, the request for datasets 1514 to parent computer process 1500, which may instruct parent computer process 1500 to transfer the one or more datasets (e.g., data tables, etc.) associated with analytical request 1504 to child computer process 1502. It shall be recognized that, in one or more embodiments, the analytical application configured to run on child computer process 1502 may need the one or more datasets to execute the analytical application.

For instance, in a non-limiting example, analytical request 1504 may specify an analytical operation, such as a linear regression operation, to perform on one or more datasets, and child computer process 1502 may be configured to execute the analytical application that corresponds to the analytical operation to perform the linear regression operation. In such a non-limiting example, the analytical application may require the one or more datasets before performing the requested linear regression operation. Accordingly, in one or more embodiments, child computer process 1502 may function to create the request for datasets 1514 and, in turn, write the request for datasets 1514 to command cross-process queue 1602.

In another non-limiting example, analytical request 1504 may specify an analytical operation, such as a machine learning model training operation, to train a machine learning model on one or more datasets, and child computer process 1502 may be configured to execute the analytical application that corresponds to the analytical operation to perform the training of the machine learning model. In such a non-limiting example, the analytical application may require the one or more datasets before performing the requested model training. Accordingly, in one or more embodiments, child computer process 1502 may function to create the request for datasets 1514 and, in turn, write the request for datasets 1514 to command cross-process queue 1602.

It shall be recognized that, in one or more embodiments, child computer process 1502 may create and serialize the request for parameters 1510 and the request for datasets 1514 using one or more techniques described in method 2100 and method 3000.

Data Writing

In one or more embodiments, method 1400 may include process 1440. Process 1440, which may include data writing, may function to write, by parent computer process 1500, the one or more datasets and the configuration data associated with analytical request 1504 to data transfer cross-process queue 1712. Data transfer cross-process queue 1712, in one or more embodiments, may be a multiple-producer, multiple-consumer queue that may enable multiple producer processes to write data to data transfer cross-process queue 1712 and multiple consumer processes to read the data from data transfer cross-process queue 1712 at the same time.

Figure 17:
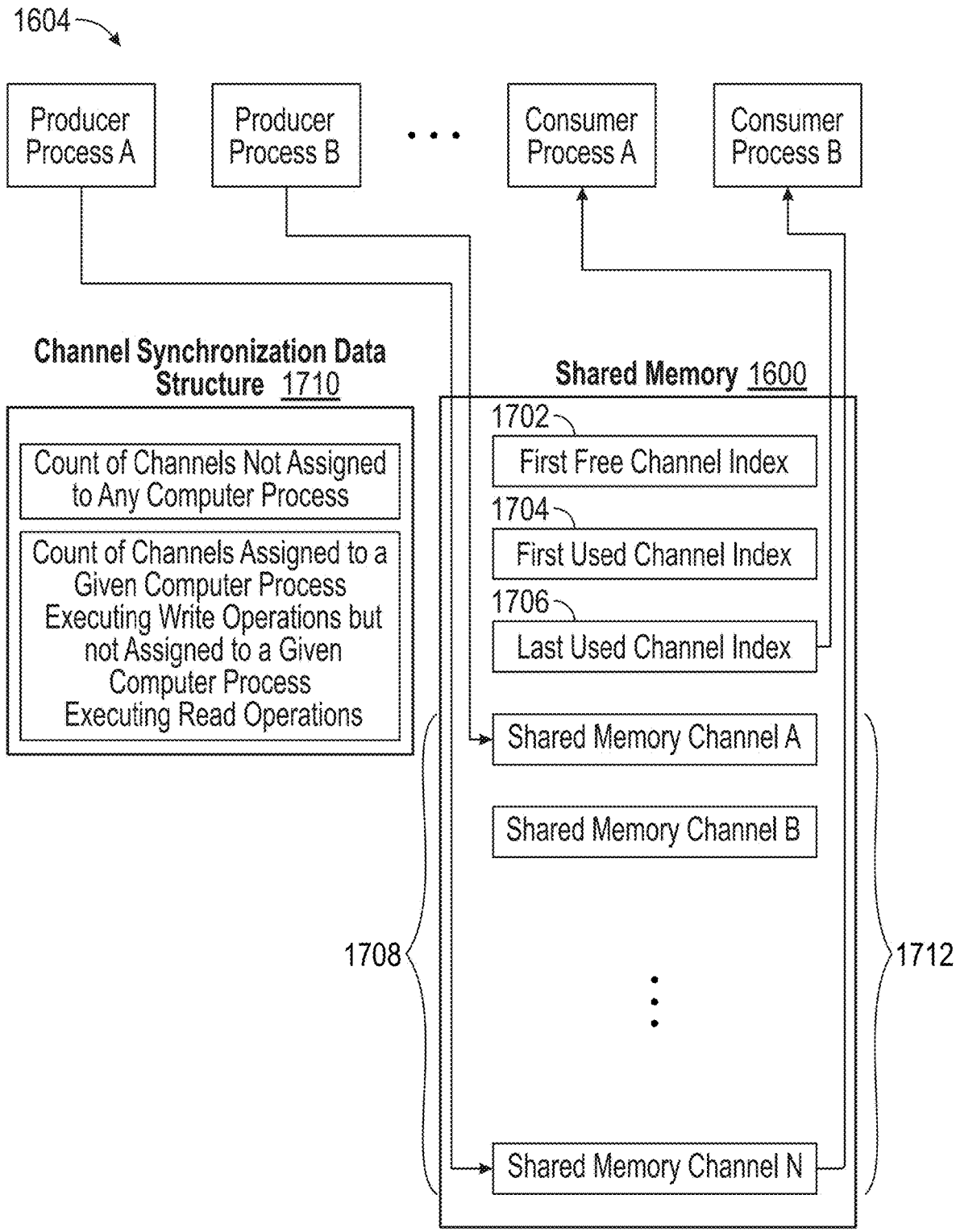
FIG. 17 illustrates an example schematic of a data transfer cross-process queue, according to some embodiments of the present technology.

In one or more embodiments, data transfer cross-process queue 1712 may include a plurality of shared memory channels 1708 implemented within computer 1604, as shown generally by way of example in FIG. 17. In such an embodiment, each shared memory channel of the plurality of shared memory channels 1708 may be assigned a corresponding channel index value. For instance, in a non-limiting example, an index value of zero (0) may correspond to the first shared memory channel of the multiple-producer, multiple-consumer cross-process queue, an index value of one (1) may correspond to the second shared memory channel of the multiple-producer, multiple-consumer cross-process queue, an index value of two (2) may correspond to the third shared memory channel of the multiple-producer, multiple-consumer cross-process queue, and an index value of three (3) may correspond to the fourth shared memory channel.

It shall be recognized that, in one or more embodiments, shared memory 1600 may be segmented into a plurality of distinct shared memory channels 1708 that may operate as individual in-memory components. In such an embodiment, each distinct shared memory channel of the plurality of shared memory channels 1708 may have a distinct cross-process queue (e.g., single-producer, single-consumer cross-process queue) that may be substantially similar to a structure of command cross-process queue 1602 described above. For instance, in a non-limiting example, data transfer cross-process queue 1712 may include three (3) distinct shared memory channels within shared memory 1600 (e.g., POSIX shared memory) of computer 1604, each of which, may include a distinct cross-process queue (e.g., single-producer, single-consumer cross-process queue).

Additionally, or alternatively, in one or more embodiments, a first free channel index 1702 may be implemented within shared memory 1600 (e.g., POSIX shared memory) of computer 1604. The first free channel index 1702, in one or more embodiments, may function to track an index value of a given shared memory channel that is at a head of a queue of shared memory channels that are available to write (e.g., the first free channel index 1702 may be configured to identify or indicate the foremost or next available shared memory channel available for writing).

Additionally, or alternatively, in one or more embodiments, a first used channel index 1704 may be implemented within shared memory 1600 (e.g., POSIX shared memory) of computer 1604. The first used channel index 1704, in one or more embodiments, may function to track an index value of a given shared memory channel that is at a head of a queue of shared memory channels that are available to read (e.g., the first used channel index 1704 may be configured to identify or indicate the foremost or next available shared memory channel within a data structure of shared memory channels that are available for reading).

Additionally, or alternatively, in one or more embodiments, a last used channel index 1706 may be implemented within shared memory 1600 (e.g., POSIX shared memory) of computer 1604. The last used channel index 1706, in one or more embodiments, may function to track an index value of a given shared memory channel that is at a tail of the queue of shared memory channels that are available to read (e.g., the last used channel index 1706 may be configured to identify or indicate which shared memory channel of the plurality of shared memory channels 1708 has been most recently used for writing data).

Additionally, or alternatively, in one or more embodiments, a channel synchronization data structure 1710 may be implemented within computer 1604. The channel synchronization data structure 1710, in one or more embodiments, may be configured to track a count of shared memory channels of the plurality of shared memory channels 1708 that are not assigned to any computer processes (e.g., the channel synchronization data structure 1710 may be configured to track a count of shared memory channels of the plurality of shared memory channels 1708 that are available to have data written to them). Furthermore, in one or more embodiments, the channel synchronization data structure 1710 may be configured to track a count of shared memory channels of the plurality of shared memory channels 1708 that are assigned to a given computer process executing write operations but not assigned to a given computer process executing read operations (e.g., the channel synchronization data structure 1710 may be configured to track a count of shared memory channels of the plurality of shared memory channels 1708 that available to have data read from them).

It shall be further recognized that for implementing and using data transfer cross-process queue 1712 and other components associated with data transfer cross-process queue 1712, reference is made to U.S. Pat. No. 12,271,635, filed on 7 Jun. 2024, titled SYSTEMS AND METHODS FOR IMPLEMENTING AND USING A CROSS-PROCESS QUEUE WITHIN A SINGLE COMPUTER, which is incorporated herein in its entirety by this reference.

In one or more embodiments, parent computer process 1500 may function to read the request for parameters 1510 from command cross-process queue 1602 and, in turn, write the one or more parameters associated with analytical request 1504 to data transfer cross-process queue 1712. Stated another way, in one or more embodiments, parent computer process 1500 may function to read a request for configuration data from command cross-process queue 1602 and, in turn, write the corresponding configuration data associated with analytical request 1504 to data transfer cross-process queue 1712.

For instance, with continued reference to the above non-limiting example, after parent computer process 1500 reads the request for parameters 1510 from command cross-process queue 1602, parent computer process 1500 may function to write the one or more parameters stored in memory of parent computer process 1500 to data transfer cross-process queue 1712. In such a non-limiting example, parent computer process 1500 may store, in memory, the parameters specified by analytical request 1504 for performing the linear regression operation, such as the predictor variable parameter, the one or more response variable parameters, and the fitting method parameter. Accordingly, in such a non-limiting example, in response to parent computer process 1500 reading the request for parameters 1510 from command cross-process queue 1602, parent computer process 1500 may function to write the parameters (e.g., the predictor variable parameter, the one or more response variable parameters, and the fitting method parameter) to data transfer cross-process queue 1712.

In another non-limiting example, based on or in response to parent computer process 1500 reading the request for parameters 1510 from command cross-process queue 1602, parent computer process 1500 may function to write the one or more parameters stored in memory of parent computer process 1500 to data transfer cross-process queue 1712. In such a non-limiting example, parent computer process 1500 may store, in memory, the parameters (e.g., parameter values, etc.) specified by analytical request 1504 for performing the machine learning-based clustering operation, such as the cluster number parameter, the cluster distance parameter, and the iteration limit parameter. Accordingly, in such a non-limiting example, in response to parent computer process 1500 reading the request for parameters 1510 from command cross-process queue 1602, parent computer process 1500 may function to write the parameters (e.g., the cluster number parameter, the cluster distance parameter, and the iteration limit parameter) to data transfer cross-process queue 1712.

It shall be recognized that, in one or more embodiments, writing a set of parameters associated with analytical request 1504 may include serializing the set of parameters into a language-agnostic data format. In such an embodiment, the set of serialized parameters may be written to data transfer cross-process queue 1712. It shall be further recognized that parent computer process 1500 may function to serialize the set of parameters using one or more operations described in method 2100 and method 3000.

Additionally, or alternatively, in one or more embodiments, parent computer process 1500 may function to read the request for datasets 1514 from command cross-process queue 1602 and, in turn, write the one or more datasets associated with analytical request 1504 to data transfer cross-process queue 1712. Stated another way, in one or more embodiments, parent computer process 1500 may function to obtain a request for datasets and, in turn, write the one or more datasets associated with analytical request 1504 to data transfer cross-process queue 1712.

For instance, with continued reference to the above non-limiting example, after parent computer process 1500 reads the request for datasets 1514 from command cross-process queue 1602, parent computer process 1500 may function to write the one or more datasets stored in memory of parent computer process 1500 to data transfer cross-process queue 1712. In such a non-limiting example, parent computer process 1500 may store the one or more datasets specified by analytical request 1504 associated with the linear regression operation. Accordingly, in such a non-limiting example, in response to parent computer process 1500 reading the request for datasets 1514 from command cross-process queue 1602, parent computer process 1500 may function to write the one or more datasets to data transfer cross-process queue 1712.

In another non-limiting example, based on or in response to parent computer process 1500 reading the request for datasets 1514 from command cross-process queue 1602, parent computer process 1500 may function to write the one or more datasets stored in memory of parent computer process 1500 to data transfer cross-process queue 1712. In such a non-limiting example, parent computer process 1500 may store the one or more datasets specified by analytical request 1504 associated with the training of the machine learning model. Accordingly, in such a non-limiting example, in response to parent computer process 1500 reading the request for datasets 1514 from command cross-process queue 1602, parent computer process 1500 may function to write the one or more datasets to data transfer cross-process queue 1712.

It shall be recognized that, in one or more embodiments, writing the one or more datasets associated with analytical request 1504 may include serializing the one or more datasets into one or more serialized datasets. In such an embodiment, the one or more serialized datasets may be written to data transfer cross-process queue 1712. It shall be further recognized that parent computer process 1500 may function to serialize the one or more datasets using one or more operations described in method 2100 and method 3000.

It shall be further recognized that, in one or more embodiments, a cross-process queue (e.g., command cross-process queue 1602, data transfer cross-process queue 1712, etc.) may be configured using shared memory of computer 1604. The cross-process queue, in such an embodiment, may be an in-memory queuing mechanism that may enable a subject parent computer process and at least one child computer process to transfer data or information between the subject parent computer process and the at least one child computer process by reading and writing the data or the information to the cross-process queue.

Data Reading

In one or more embodiments, method 1400 may include process 1450. Process 1450, which may include data reading, may function to read, by child computer process 1502, the one or more datasets and the one or more parameters from data transfer cross-process queue 1712. Stated another way, in one or more embodiments, child computer process 1502 may function to read the one or more datasets and the configuration data from data transfer cross-process queue 1712.

In one or more embodiments, based on or in response to parent computer process 1500 writing the one or more datasets and the one or more parameters (e.g., configuration data) to data transfer cross-process queue 1712, child computer process 1502 may function to read the one or more datasets and the one or more parameters into memory of child computer process 1502 (e.g., get parameter data 1512, get datasets 1516). At least one technical benefit of reading the one or more datasets and the one or more parameters into memory of child computer process 1502 may provide the analytical application with the necessary data to perform the requested computational task.

For instance, in a non-limiting example, parent computer process 1500 may function to write the one or more parameters specified by analytical request 1504—such as the predictor variable parameter, the one or more response variable parameters, and the fitting method parameter—to data transfer cross-process queue 1712 based on parent computer process 1500 receiving the request for parameters 1510 and, in turn, child computer process 1502 may function to read, from data transfer cross-process queue 1712, the one or more parameters (e.g., the predictor variable parameter, the one or more response variable parameters, and the fitting method parameter) into memory of child computer process 1502.

Additionally, or alternatively, in such a non-limiting example, parent computer process 1500 may function to write the one or more datasets specified by analytical request 1504 to data transfer cross-process queue 1712 based on parent computer process receiving the request for datasets 1514 and, in turn, child computer process 1502 may function to read, from data transfer cross-process queue 1712, the one or more datasets into memory of child computer process 1502 (e.g., get datasets 1516).

In another non-limiting example, parent computer process 1500 may function to write the one or more parameters specified by analytical request 1504 associated with the machine learning model training operation to data transfer cross-process queue 1712 based on parent computer process 1500 receiving the request for parameters 1510 and, in turn, child computer process 1502 may function to read, from data transfer cross-process queue 1712, the one or more parameters into memory of child computer process 1502 (e.g., get parameter data 1512).

Additionally, or alternatively, in such a non-limiting example, parent computer process 1500 may function to write the one or more datasets specified by analytical request 1504 to data transfer cross-process queue 1712 based on parent computer process 1500 receiving the request for datasets 1514 and, in turn, child computer process 1502 may function to read, from data transfer cross-process queue 1712, the one or more datasets into memory of child computer process 1502 (e.g., get datasets 1516).

It shall be recognized that, in one or more embodiments, reading the one or more datasets associated with analytical request 1504 from data transfer cross-process queue 1712 may include deserializing one or more serialized datasets into one or more deserialized datasets that is compatible with the corresponding programming language (e.g., Python) of the analytical application configured to run on child computer process 1502. Similarly, in one or more embodiments, reading the one or more parameters associated with analytical request 1504 from data transfer cross-process queue 1712 may include deserializing one or more serialized parameters into one or more deserialized parameters that is compatible with the corresponding programming language (e.g., Python) of the analytical application configured to run on child computer process 1502. It shall be recognized that, in such an embodiment, child computer process 1502 may function to deserialize data using one or more techniques described in method 2100 and method 3000.

Executing the Analytical Operation

In one or more embodiments, method 1400 may include process 1460. Process 1460, which may include executing the analytical operation, may function to execute the analytical operation associated with analytical request 1504 on child computer process 1502. In one or more embodiments, child computer process 1502 may function to execute the analytical operation specified in analytical request 1504 by using the analytical application that the analytical operation is encoded or configured to use.

In one or more embodiments, based on or in response to child computer process 1502 reading the one or more parameters and the one or more datasets into memory of child computer process 1502, child computer process 1502 may function to execute, using the analytical application, the analytical operation based on the one or more datasets and the one or more parameters. Stated another way, in one or more embodiments, child computer process 1502 may function to process, using the analytical application, the one or more datasets and the one or more parameters to perform the analytical operation. Stated differently, in one or more embodiments, child computer process 1502 may function to execute computer instructions of the analytical application to process the one or more datasets in accordance with the one or more parameters.

For instance, with continued reference to the above non-limiting example, when analytical request 1504 specifies the linear regression operation, child computer process 1502 may be configured to execute the corresponding analytical application to perform the linear regression operation. In such a non-limiting example, child computer process 1502 may function to provide the dataset, the predictor variable parameter, the one or more response variable parameters, and the fitting method parameter-already in memory of child computer process 1502—to the corresponding analytical application, which may be configured to perform the linear regression operation based on at least the dataset, the predictor variable parameter, the one or more response variable parameters, and the fitting method parameter.

Stated another way, in one or more embodiments, the corresponding analytical application may be started (e.g., start analytical application 1518) on child computer process 1502 based on or in response to child computer process 1502 receiving the necessary datasets and parameters from parent computer process 1500. Once the corresponding analytical application is started on child computer process 1502, the corresponding analytical application may use the one or more datasets and the one or more parameters to perform the requested analytical operation (e.g., linear regression) and, in turn, compute an analytical output (e.g., parameter estimates (e.g., coefficients), R-squared values, etc.).

In another non-limiting example, when analytical request 1504 specifies the machine learning model training operation (e.g., training a classification model), child computer process 1502 may be configured to execute the corresponding analytical application to perform the machine learning model training operation. In such a non-limiting example, child computer process 1502 may function to provide a corpus of training data (e.g., dataset), as well as model training parameters such as the learning rate, number of epochs, batch size, and any other specified hyperparameters-already in memory of child computer process 1502—to the corresponding analytical application, which may be configured to train the machine learning model based on the dataset and specified parameters.

Stated another way, in one or more embodiments, the corresponding analytical application may be started (e.g., start analytical application 1518) on child computer process 1502 based on or in response to child computer process 1502 receiving the corpus of training data and parameters from parent computer process 1500. Once started, the corresponding analytical application may use the dataset and parameters to train the machine learning model and, in turn, generate an analytical output such as model weights, accuracy metrics, loss values, and/or a trained model file that may be used for model deployment.

In one or more embodiments, computer process 1502 may function to transmit or transfer the analytical output (e.g., send analytical output data 1524) to parent computer process 1500 using a cross-process queue (e.g., command cross-process queue 1602, data transfer cross-process queue 1712, etc.), as described in more detail in method 2100 and method 3000. Furthermore, in one or more embodiments, based on or in response to parent computer process 1500 receiving the analytical output, parent computer process 1500 may function to write the analytical output to a computer database of analytics service 1530. It shall be recognized that, in such an embodiment, child computer process 1502 may not have permissions to write the analytical output to the computer database and parent computer process 1500 may have the permissions to write the analytical output to the computer database.

Accordingly, in one or more embodiments, after the analytical output is written to the computer database of analytics service 1530, analytical request 1504 may be completed (e.g., request complete 1528) and, in turn, parent computer process 1500 may be terminated. Additionally, or alternatively, in one or more embodiments, child computer process 1502 may be terminated (e.g., child computer process terminated 1526) based on or in response to successfully transferring the analytical output (e.g., the analytical output data) to parent computer process 1500.

Stated another way, in one or more embodiments, upon completing the analytical operation, the analytical application may reach its endpoint (e.g., end analytical application 1522) and, in turn, child computer process 1502 may be terminated. In one or more embodiments, child computer process 1502 may function to send a termination signal (e.g., termination indication) or the like to parent computer process 1500 when child computer process 1502 is terminated successfully and, in turn, parent computer process 1500 may be terminated in response to receiving the termination signal (e.g., termination indication). It shall be noted that, in one or more embodiments, parent computer process 1500 may not be terminated until child computer process 1502 is successfully terminated.

It shall be further recognized that, in one or more embodiments, child computer process 1502 may function to generate one or more logs while the analytical application is executing (e.g., performing the analytical operation by the analytical application). The one or more logs may include information associated with a status of the execution of the analytical operation. Accordingly, in one or more embodiments, child computer process 1502 may function to transmit log data that includes the one or more logs (e.g., send log data 1520) to parent computer process 1500 via a cross-process queue (e.g., command cross-process queue 1602, data transfer cross-process queue 1712, etc.), as described in more detail in method 2100 and method 3000.

Figure 18:
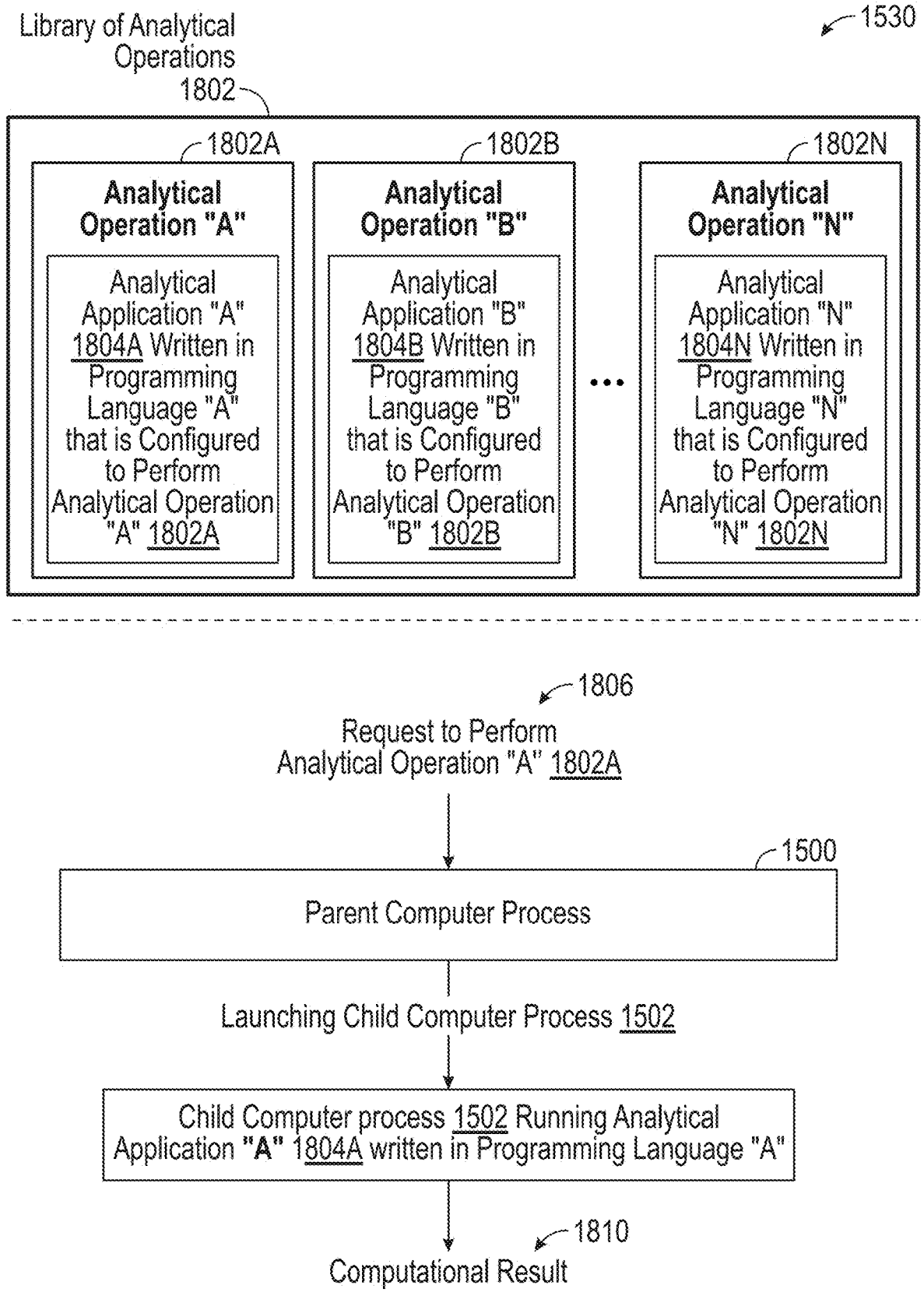
FIG. 18 illustrates an example of a library of analytical operations provided by the analytics service and an example of executing one of the analytical operations specified within the library of analytical operations, according to some embodiments of the present technology.

Turning to FIG. 18, in one or more embodiments, analytics service 1530 may provide a library of analytical operations 1802. In one or more embodiments, each distinct analytical operation of the library of analytical operations 1802 may be configured to perform a target type of data analysis or computation using an analytical application developed in a target programming language.

For instance, in a non-limiting example, analytical operation "A" 1802A may be configured to perform a first analytical task using analytical application "A" 1804A. Analytical application "A" 1804A, in one or more embodiments, may use one or more software libraries (e.g., PyTorch, NumPy, Pandas, TensorFlow, etc.) developed in programming language "A" (e.g., Python) that may assist with performing such analytical task.

In another non-limiting example, analytical operation "B" 1802B may be configured to perform a second analytical task using analytical application "B" 1804B. Analytical application "B" 1804B, in one or more embodiments, may use one or more software libraries developed in programming language "B" (e.g., R) that may assist with performing such analytical task.

In another non-limiting example, analytical operation "N" 1802N may be configured to perform a third analytical task using analytical application "N" 1804N. Analytical application "N" 1804N, in one or more embodiments, may use one or more software libraries developed in programming language "N" (e.g., *Julia*) that may assist with performing such task.

Accordingly, in one or more embodiments, parent computer process 1500 may function to receive a request 1806 to perform analytical operation "A" 1802A from a user and, in turn, parent computer process 1500 may initiate the execution of analytical operation "A" 1802A. Accordingly, in such embodiments, parent computer process 1500 may function to launch child computer process 1502—which may be configured to run analytical application "A" 1804A-based on parent computer process 1500 initiating the execution of analytical operation "A" 1802A. It shall be recognized that, in one or more embodiments, parent computer process 1500 and child computer process 1502 may be executed by analytics service 1530, which may be implemented by a distributed network of computers. It shall be further recognized, in some embodiments, child computer process 1502 may be executed by a remote service (e.g., third-party service, etc.) that operates independently of analytics service 1530 without departing from the scope of the disclosure.

In one or more embodiments, child computer process 1502, may execute analytical application "A" 1804A to perform one or more computational tasks defined by analytical operation "A" 1802A and, in turn, analytical application "A" 1804A may output computational result 1810. Computational result 1810, in one or more embodiments, may include a computational output such as a calculated value, data table, or any other suitable analytical output.

Figure 19:
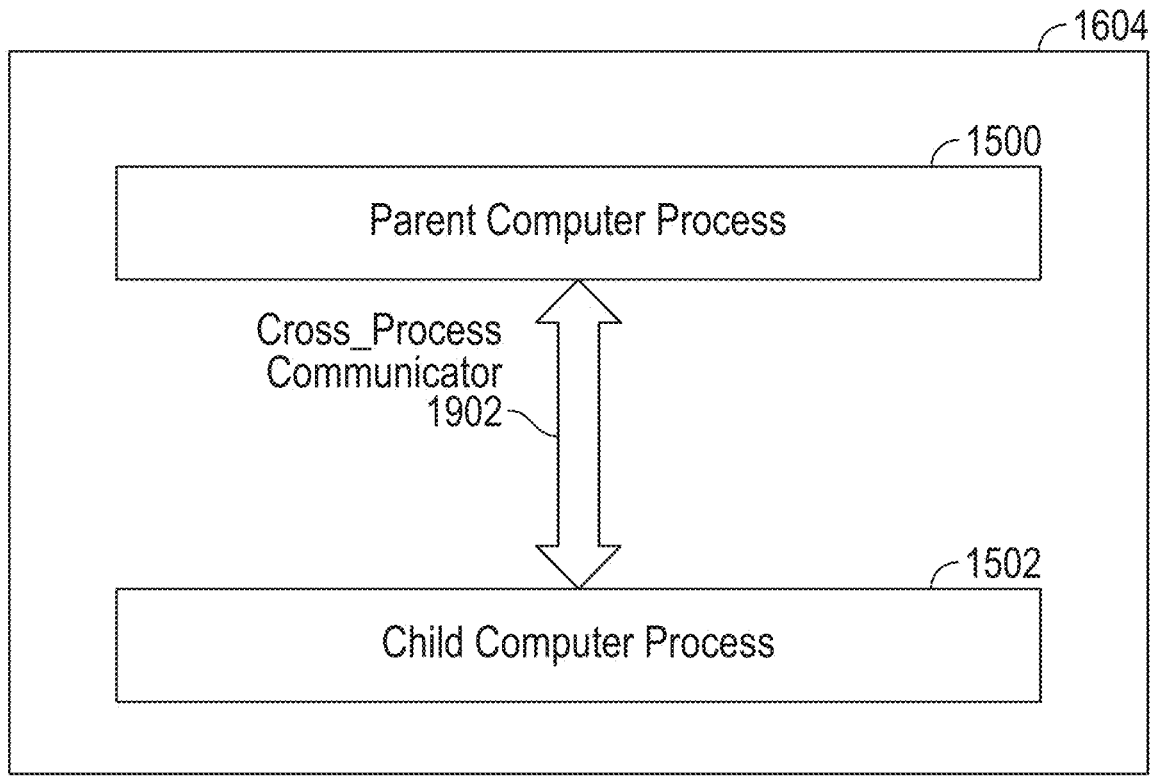
FIG. 19 illustrates an example schematic of using a cross-process communicator or middleware to transfer data, information, and commands between a parent computer process and a child computer process, according to some embodiments of the present technology.

It shall be recognized that, in one or more embodiments, parent computer process 1500 and child computer process 1502 may operate within an operating system of computer 1604 (e.g., single computer), as shown generally by way of example in FIG. 19. In such an embodiment, parent computer process 1500 and child computer process 1502 may communicate using cross-process communicator 1902. The cross-process communicator 1902, in one or more embodiments, may include an application programming interface and one or more cross-process queues that are operably configured to transfer data (e.g., messages, data blocks, etc.) between parent computer process 1500 and child computer process 1502.

In one or more embodiments, the application programming interface (API) may include a plurality of application programming interface (API) functions that may enable structured communication between parent computer process 1500 and child computer process 1502. In such an embodiment, child computer process 1502 may function to transmit or transfer, via a first cross-process queue (e.g., command cross-process queue 1602) of the one or more cross-process queues, one or more data requests or commands to parent computer process 1500 based on child computer process 1502 invoking one or more application programming interface functions of the plurality of application programming interface functions and, in turn, parent computer process 1500 may function to write data (e.g., configuration data, one or more datasets, etc.) to a second cross-process queue (e.g., data transfer cross-process queue 1712) of the one or more cross-process queues based on parent computer process 1500 reading the one or more data requests or commands from the first cross-process queue. It shall be recognized, in one or more embodiments, parent computer process 1500 may function to write the one or more datasets and the configuration data to the second cross-process queue based on a serialization protocol defined by the application programming interface.

Accordingly, in one or more embodiments, in response to parent computer process 1500 writing the one or more datasets and the configuration data to the second cross-process queue, child computer process 1502 may function to read the one or more datasets and the configuration data from the second cross-process queue based on a deserialization protocol defined by the application programming interface.

It shall be recognized, in one or more embodiments, the first cross-process queue (e.g., single-producer, single-consumer cross-process queue) and the second cross-process queue (e.g., multiple-producer, multiple-consumer cross-process queue) may be implemented in shared memory of computer 1604. Stated another way, in one or more embodiments, the first cross-process queue and the second cross-process may be implemented within random access memory (RAM) of computer 1604.

Figure 20:
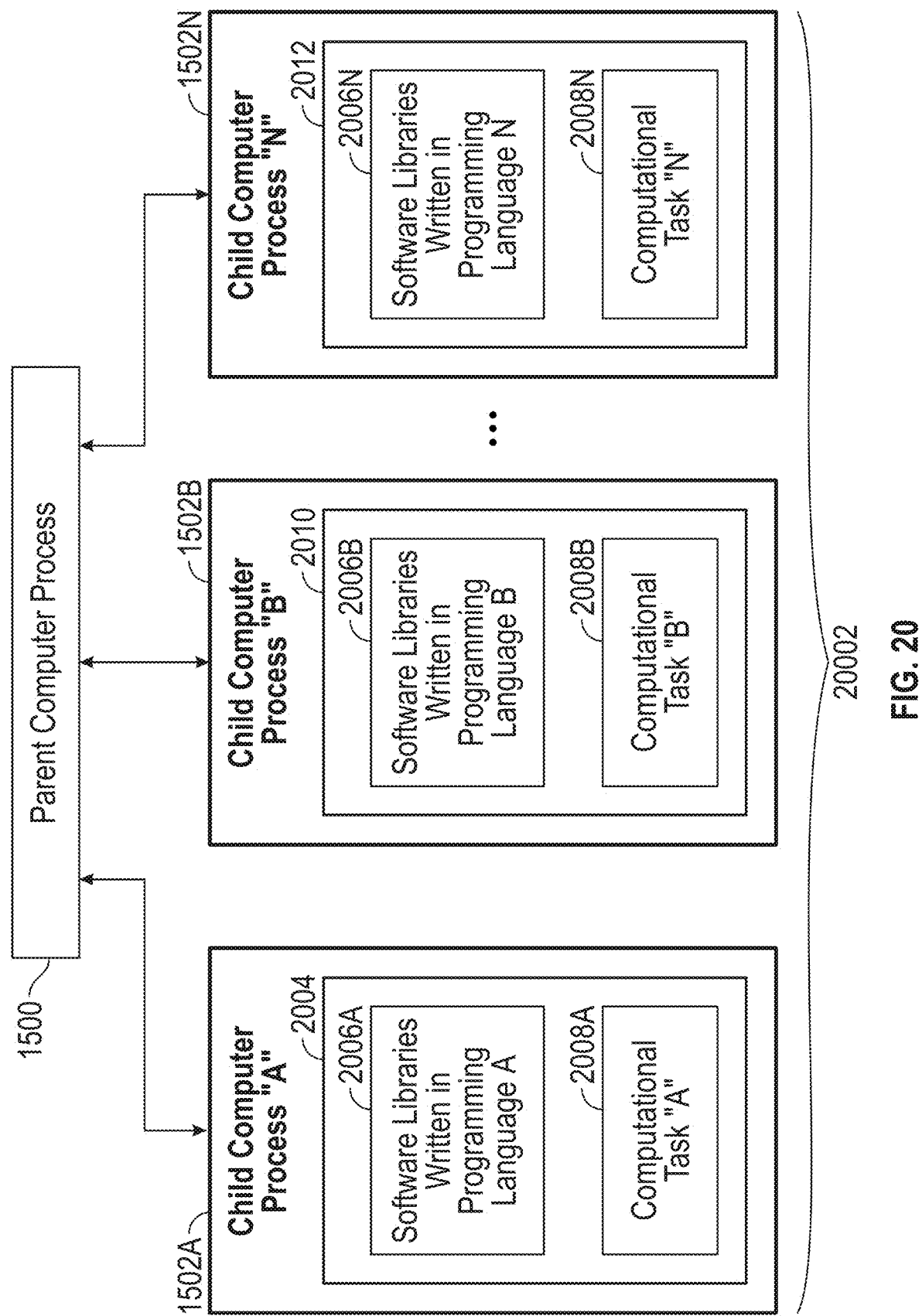
FIG. 20 illustrates an example schematic of using a single parent computer process and multiple child computer process to execute a computational task, according to some embodiments of the present technology.

Turning to FIG. 20, in one or more embodiments, parent computer process 1500 may function to launch a plurality of child computer processes 2002 when parent computer process 1500 initiates or calls for an execution of an analytical operation that uses a plurality of distinct analytical applications written in a plurality of distinct programming languages. In such an embodiment, each distinct child computer process of the plurality of child computer processes 2002 may be configured to use a distinct analytical application (e.g., distinct algorithm or the like) to perform a distinct task of the analytical operation.

For instance, in a non-limiting example, parent computer process 1500 may launch child computer process "A" 1502A to perform a first computational task (e.g., computational task "A" 2008A) of the analytical operation based on executing analytical application I 2004. Analytical application I 2004, in one or more embodiments, may be written in a first programming language (e.g., Python) and may use one or more software libraries (e.g., open-source libraries, etc.) written in the first programming language 2006A.

Additionally, in such a non-limiting example, parent computer process 1500 may launch child computer process "B" 1502B to perform a second computational task (e.g., computational task "B" 2008B) of the analytical operation based on executing analytical application II 2010. Analytical application II 2010, in one or more embodiments, may be written in a second programming language (e.g., R) and may use one or more software libraries (e.g., open-source libraries, etc.) written in the second programming language 2006B.

Additionally, in such a non-limiting example, parent computer process 1500 may launch child computer process "N" 1502N to perform a third computational task (e.g., computational task "N" 2008N) of the analytical operation based on executing analytical application III 2012. Analytical application III 2012, in one or more embodiments, may be written in a third programming language (e.g., *Julia*) and may use one or more software libraries (e.g., open-source libraries, etc.) written in the third programming language 2006N.

It shall be noted that, in one or more embodiments, parent computer process 1500 may simultaneously or sequentially launch child computer "A" 1502A, child computer "B" 1502B, and child computer "N" 1502N.

Accordingly, in one or more embodiments, each of the plurality of child computer processes 2002 may perform the respective computational task using the respective analytical application and, upon completion, transfer, using a cross-process queue (e.g., command cross-process queue 1602, data transfer cross-process queue 1712, etc.), the respective computational output to parent computer process 1500, which may aggregate, evaluate, or further process the computational outputs to complete the analytical operation as specified by the initial request.

It shall be recognized that, in one or more embodiments, analytical application I 2004, analytical application II 2010, and analytical application III 2012 may be written in the same programming language (e.g., Python) without departing from the scope of the disclosure. For instance, in a non-limiting example, parent computer process 1500 may launch multiple child computer processes (e.g., 1502A, 1502B, 1502N, etc.) to execute a computational task (e.g., scoring operation, etc.) on a target dataset having a plurality or records (e.g., 10,000 records, 100,000 records, etc.). Each child computer process, in such an embodiment, may concurrently perform a respective computational task (e.g., a substantially similar scoring operation, the same scoring operation, etc.) on a distinct subset of the target dataset using the respective analytical application (e.g., child computer process 1502A processing one subset using analytical application I 2004, child computer process 1502B processing another subset using analytical application II 2010, and so forth). Accordingly, upon completion, each child computer process may transmit a respective computational result for the respective subset to parent computer process 1500, which may aggregate the computational results to produce a final computational output (e.g., final scoring output) for the entire dataset. In other words, in one or more embodiments, the plurality of child computer processes 2002 may operate in parallel to process the target dataset, wherein each child computer processes performs the same type of computational task on a distinct subset of data of the target dataset.

Figure 21:
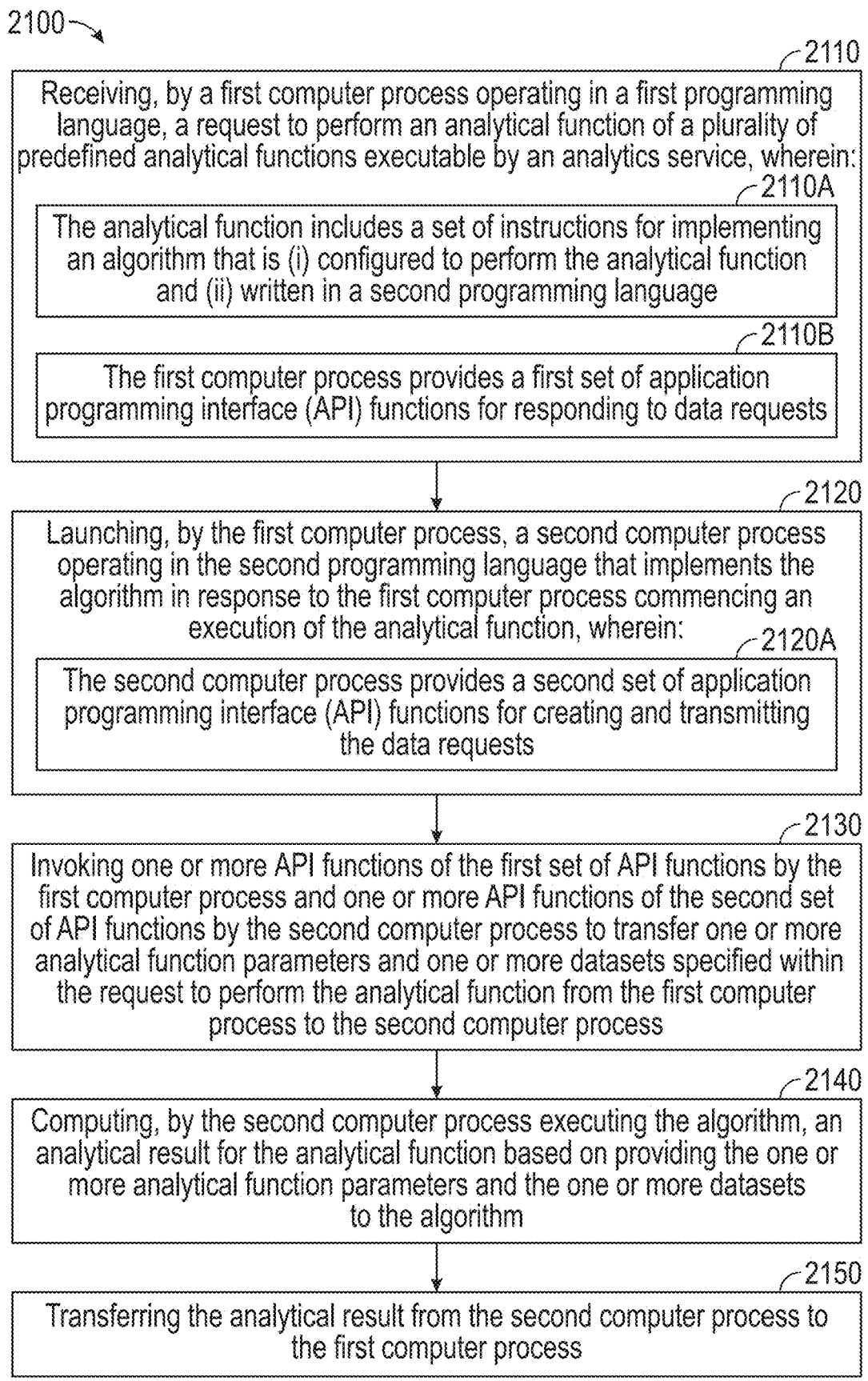
FIG. 21 illustrates a flow chart showing an example process executing an analytical function using an application programming interface, according to some embodiments of the present technology.

FIG. 21 illustrates one embodiment of a method 2100 for performing a computer function across a plurality of computer processes using an application programming interface (API) and one or more cross-process queues. It shall be appreciated that other embodiments contemplated within the scope of the present disclosure may involve more operations, fewer operations, different operations, or a different order of operations than as shown in FIG. 21.

Request to Perform an Analytical Function

In one or more embodiments, method 2100 may include process 2110. Process 2110, which may include receiving a request to perform an analytical function, may function to receive a request to perform an analytical function from a user, a software application, or a software solution associated with a system or service implementing method 2100. An analytical function, as generally referred to herein, may be configured to perform a computational operation or a set of operations using one or more predefined algorithms and, in turn, compute an analytical result. It shall be recognized that the phrase "analytical function" may be interchangeably referred to herein as an "analytical operation," or the like.

In one or more embodiments, analytics service 1530 may provide a plurality of predefined analytical functions that are executable by analytics service 1530. For instance, in a non-limiting example, a first analytical function of the plurality of predefined analytical functions may correspond to a linear regression function that may be encoded to use a linear regression algorithm to perform a linear regression-type computational task. Additionally, or alternatively, a second analytical function of the plurality of predefined analytical functions may correspond to a data classification function that may be encoded to use a random forest algorithm to perform a data classification-type computational task. Additionally, or alternatively, a third analytical function of the plurality of predefined analytical functions may correspond to a clustering function that may be encoded to use a k-means algorithm to perform a data clustering-type computational task. Additionally, or alternatively, a fourth analytical function of the plurality of predefined analytical functions may correspond to a machine learning model training function that may be encoded to use a neural network training algorithm to perform a model training-type computational task. It shall be recognized that analytics service 1530, in one or more embodiments, may include one or more additional analytical functions or a different set of analytical functions without departing from the scope of the disclosure.

For instance, in one or more embodiments, the plurality of predefined analytical functions may be extensible to enable users of analytics service 1530 to add custom analytical functions. A custom analytical function, as generally referred to herein, may be encoded to use a user-developed algorithm or a third-party algorithm written in any suitable programming language to perform a target analytical computation. For instance, in a non-limiting example, the plurality of predefined analytical functions of analytics service 1530 may be augmented to include a custom analytical function created by a user of analytics service 1530. The custom analytical function, in such a non-limiting example, may be configured to perform the target analytical computation using an algorithm, created by the user, in a target programming language (e.g., C++, Python, Rust, Julia, etc.).

Figure 22:
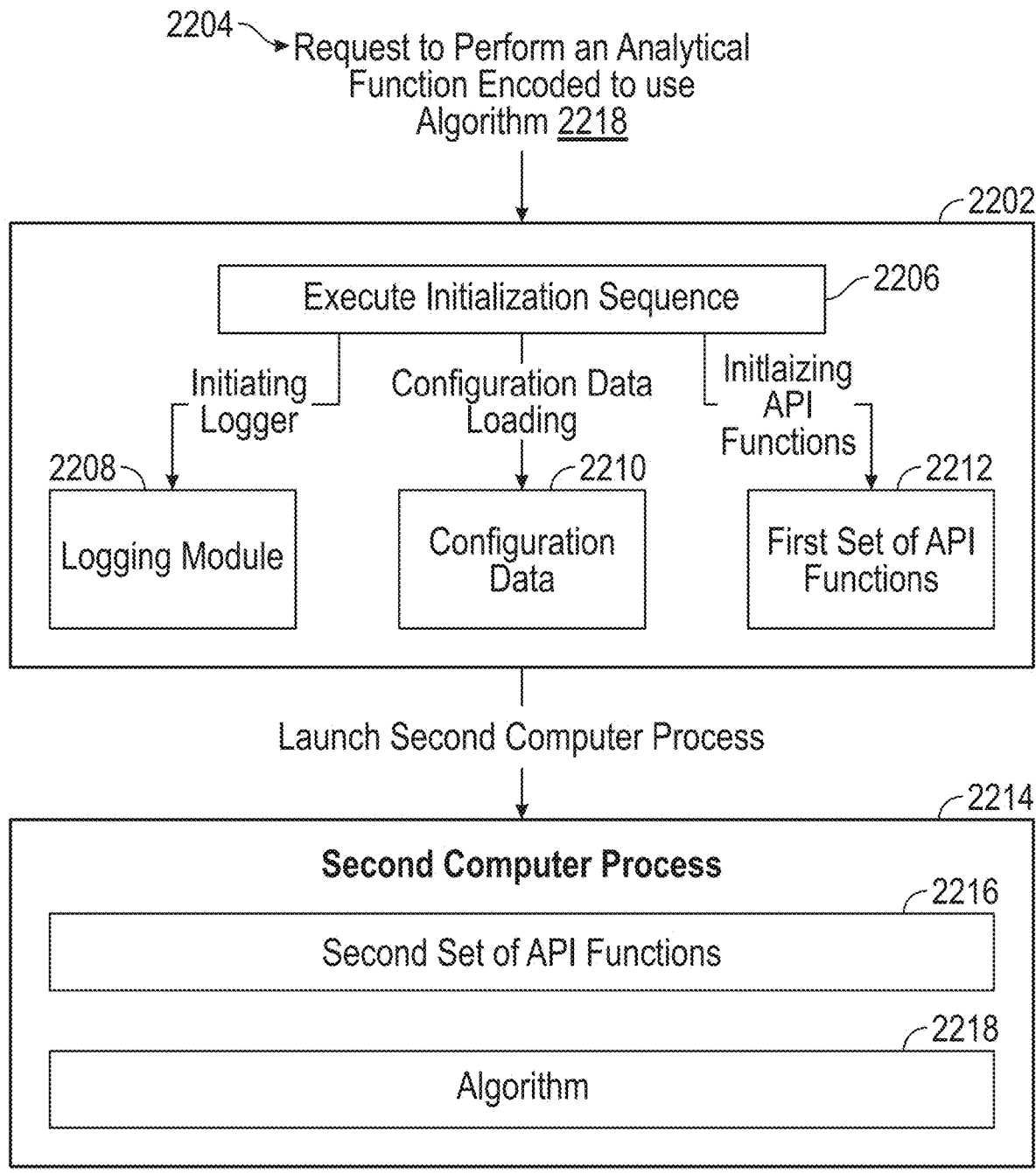
FIG. 22 illustrates an example schematic showing the first computer process and the second computer process, according to some embodiments of the present technology.

Turning to FIG. 22, in one or more embodiments, first computer process 2202 may be created based on receiving a request to perform an analytical function 2204. In one or more embodiments, in response to creating first computer process 2202, first computer process 2202 may function to execute an initialization sequence 2206. The initialization sequence 2206, in one or more embodiments, may be configured to load configuration data 2210 that corresponds to the analytical function into memory of first computer process 2202, initialize a logging module 2208, and provide a first set of application programming interface (API) functions 2212 for responding to data requests or commands, as described in more detail herein.

Configuration data 2210, in some embodiments, may include a set of parameters, settings, or instructions that may define how the analytical function (e.g., computer function or the like) is to be executed. In such an embodiment, configuration data 2210 may include a set of default parameters that may specify standard settings or behaviors that guide the execution of the analytical function and/or a set of user-provided parameters that may define user-specific settings for the analytical function that may be used alongside or in place of the set of default parameters. For instance, in a non-limiting example, configuration data 2210 may include algorithm parameters (e.g., model settings (e.g., learning rate, number of iterations, regularization terms, model type, etc.), specific methods or functions to be used (e.g., linear regression, decision trees, etc.), hyperparameters that define how algorithm(s) are applied to data (e.g., number of clusters in k-means, etc.)), data access information (e.g., paths to datasets (e.g., file locations, database connections, etc.), data format requirements (e.g., CSV, JSON, Parquet, etc.), access credentials or tokens for APIs or databases (e.g., username, password, API key, etc.)), execution parameters (e.g., resource allocation settings (e.g., memory usage, CPU/GPU resources, etc.), execution time limits (e.g., maximum execution duration, batch processing limits, etc.), parallelization settings (e.g., number of threads or worker nodes for distributed processing, etc.)), input/output settings (e.g., input data specifications (e.g., data format, data sources, etc.), output data format (e.g., table, graphical plot, file format for results, etc.), file paths or destinations for output (e.g., where results should be saved, etc.)), user-specific configurations (e.g., user preferences for data preprocessing (e.g., scaling methods, missing data handling, etc.), customized settings for report generation (e.g., summary statistics, chart types, etc.)), default configuration data (e.g., default behavior when no user input or user-provided parameters are provided (e.g., default algorithm parameters or settings), default directories for reading and saving data), and security and privacy parameters (e.g., user authentication and authorization settings, data access permissions (e.g., read/write access to datasets, etc.)).

The logging module 2208, in one or more embodiments, may be configured to track and record events, errors, and informational messages generated during the execution of the analytical function. The logging module 2208, in one or more embodiments, may function to record log events that occurred across a plurality of computer processes involved in or associated with the execution of the analytical function (e.g., parent computer process 1500 and any auxiliary computer processes, such as child computer process 1502, second computer process 2214, or the like).

The first set of application programming interface (API) functions 2212 provided by first computer process 2202, in one or more embodiments, may include a plurality of distinct application programming interface (API) functions operably configured to facilitate communication between first computer process 2202 and second computer process 2214 (e.g., process 2110B). In one or more embodiments, first computer process 2202 may invoke one or more application programming interface functions of the first set of application programming interface functions 2212 to transfer data (e.g., configuration data, parameters, datasets, etc.) from first computer process 2202 to second computer process 2214, as described in more detail herein.

In one or more embodiments, the analytical function associated with the request to perform the analytical function 2204 may include a set of instructions for implementing and using an algorithm operably configured to perform the analytical function (e.g., process 2110A). The algorithm, in such an embodiment, may be written in a target programming language, such as Python, R, or *Julia*, and may utilize one or more software libraries or software frameworks specific to the target programming language. It shall be noted that, in one or more embodiments, the set of instructions for implementing the algorithm may include the algorithmic code, the required libraries or frameworks used by the algorithm, and the runtime environment components necessary for executing the algorithm.

Launching Auxiliary Computer Processes

In one or more embodiments, method 2100 may include process 2120. Process 2120, which may include launching an auxiliary computer process, may function to launch one or more auxiliary computer processes in response to first computer process 2202 commencing an execution of the analytical function specified in the request to perform the analytical function 2204.

In one or more embodiments, in response to first computer process 2202 commencing an execution of the analytical function specified in the request to perform the analytical function 2204, first computer process 2202 may launch second computer process 2214. In such an embodiment, during the launch of second computer process 2214, first computer process 2202 may send the process identifier associated with first computer process 2202 to second computer process 2214. Accordingly, in such an embodiment, based on second computer process 2214 receiving the process identifier associated with first computer process 2202, second computer process 2214 may be connected with first computer process 2202 via the process identifier of first computer process 2202.

Stated another way, in some embodiments, based on second computer process 2214 receiving the process identifier of first computer process 2202, second computer process 2214 may be paired with first computer process 2202 based on the process identifier that corresponds to first computer process 2202. At least one technical benefit of pairing or connecting second computer process 2214 with first computer process 2202 may enable the parent-child computer process relationship described above.

It shall be recognized that, upon launch, second computer process 2214 may execute a set of instructions that initialize a second set of application programming interface (API) functions 2216. The second set of application programming interface (API) functions 2216 provided by second computer process 2214, in one or more embodiments, may be operably configured to create and transmit data requests to first computer process 2202 (e.g., process 2120A), as described in more detail herein.

In one or more embodiments, the analytical function specified in the request to perform the analytical function 2204 may be encoded to use an algorithm (e.g., analytical application) that may be written in a programming language incompatible for execution by first computer process 2202. In other words, the algorithm (e.g., algorithm 2218) may be written in a programming language that first computer process 2202 cannot directly execute due to a programming language mismatch (e.g., the first computer process executes instructions in C++ and the algorithm is written in Python). Accordingly, in one or more embodiments, based on or in response to first computer process 2202 invoking an execution of the analytical function, first computer process 2202 may function to launch second computer process 2214 that implements the algorithm (e.g., algorithm 2218) on second computer process 2214.

At least one technical benefit of using multiple computer processes to execute the analytical function may enable a first computer process to operate in a first programming language (e.g., C++) and a second computer process to operate in a second programming language (e.g., Python). In other words, first computer process 2202 may operate within a runtime environment compatible for performing tasks in a first programming language (e.g., C++), and second computer process 2214 may operate within a runtime environment compatible for executing the algorithm in a second programming language (e.g., Python).

Invoking Application Programming Interface (API) Functions

In one or more embodiments, method 2100 may include process 2130. Process 2130, which may include invoking one or more API functions, may function to invoke one or more API functions of the first set of API functions 2212 and one or more API functions of the second set of API functions 2216 to transfer one or more pieces of data from first computer process 2202 to second computer process 2214. An API function, as generally referred to herein, may be invoked by a computer process to perform a set of operations that facilitate an exchange of data between first computer process 2202 and second computer process 2214. It shall be recognized that, in one or more embodiments, the second set of API functions 2216 may be configured to create data transfer requests, and the first set of API functions 2212 may be configured to handle responses to the data transfer requests.

In one or more embodiments, before algorithm 2218 may be executed on second computer process 2214, algorithm 2218 may need one or more pieces of data (e.g., configuration data, parameters, datasets, etc.) stored in memory of first computer process 2202 or that may be accessible by first computer process 2202 (e.g., first computer process 2202 may be capable of sourcing or querying a computer database or any other suitable data repository of analytics service 1530 for the one or more pieces of data). For instance, in a non-limiting example, in response to pairing second computer process 2214 with first computer process 2202, second computer process 2214 may invoke one or more API functions of the second set of API functions 2216 to write one or more requests for function parameters and datasets to a first cross-process queue (e.g., command cross-process queue 1602) and, in turn, first computer process 2202 may invoke one or more API functions of the first set of API functions 2212 to write one or more response messages that includes the corresponding function parameters and the corresponding datasets to a second cross-process queue (e.g., data transfer cross-process queue 1712). Accordingly, in such a non-limiting example, second computer process 2214 may obtain the corresponding function parameters and the corresponding datasets in response to reading the one or more response messages from the second cross-process queue.

Stated another way, in one or more embodiments, the one or more API functions invoked by second computer process 2214 may include invoking a first API function to request one or more function parameters from first computer process 2202 and a second API function to request one or more datasets from first computer process 2202. For instance, in a non-limiting example, second computer process 2214 may invoke the first API function to retrieve the one or more function parameters, and after the second computer process receives the one or more function parameters, second computer process 2214 may invoke the second API function to request the datasets. It shall be further recognized, in some embodiments, the first API function and the second API function may be simultaneously invoked by second computer process 2214 without departing from the scope of the disclosure.

At least one technical benefit of using multiple cross-process queues may enable efficient handling of requests and data transfers between first computer process 2202 and second computer process 2214. The first cross-process queue, in some embodiments, may manage data requests in a sequential manner, while the second cross-process queue may enable large data blocks (e.g., large datasets, etc.) to be written simultaneously in chunks to the second cross-process queue rather than sequentially. This type of configuration reduces the time required to transfer large data blocks from first computer process 2202 to second computer process 2214.

Turning to FIG. 23, in one or more embodiments, second computer process 2214 may invoke a parameters request API function of the second set of API functions 2216 to transfer the request for parameters 1510 from second computer process 2214 to first computer process 2202. The parameters request API function, as generally referred to herein, may be configured to generate and transmit a request for one or more parameters (e.g., configuration data, etc.) that may be required by a given algorithm (e.g., algorithm 2218) for execution.

In one or more embodiments, in response to second computer process 2214 invoking the parameters request API function, the parameters request API function may create a parameters request message 2302. The parameters request message 2302, in one or more embodiments, may include a request to obtain, from first computer process 2202, parameter data (e.g., configuration data or the like) associated with the analytical function specified within request 2204. For instance, in a non-limiting example, the request to perform the analytical function 2204 may specify one or more parameters to provide algorithm 2218 as input and, in turn, second computer process 2214 may function to invoke the parameters request API function to obtain the one or more parameters. It shall be recognized that, in one or more embodiments, parameters request message 2302 may be encoded in a programming language compatible with second computer process 2214, such as the second programming language (e.g., Python).

Additionally, or alternatively, in one or more embodiments, based on the parameters request API function creating the parameters request message 2302, the parameters request API function may function to serialize parameters request message 2302 into a serialized parameters request message 2304. Serialized parameters request message 2304, in one or more embodiments, may be encoded in a binary data format. A binary data format, as generally referred to herein, may represent data as a sequence of binary digits (bits). It shall be recognized that, in one or more embodiments, parameters request message 2302 may be serialized into serialized parameters request message 2304 based on executing a serialization protocol of the parameters request API function, which may use one or more techniques described in method 3000.

At least one technical benefit of serializing parameters request message 2302 into serialized parameters request message 2304 may enable serialized parameters request message 2304 to be transferred to a target computer process (e.g., first computer process 2202, parent computer process 1500, etc.) irrespective of the programming language or runtime environment in which the target computer process operates.

Additionally, or alternatively, in one or more embodiments, based on the parameters request API function serializing parameters request message 2302 into serialized parameters request message 2304, the parameters request API function may function to write serialized parameters request message 2304 to command cross-process queue 1602. It shall be recognized that, in one or more embodiments, the parameters request API function may write serialized parameters request message 2304 to command cross-process queue 1602 using a data writer of the parameters request API function. At least one technical benefit of writing serialized parameters request message 2304 to command cross-process queue 1602 may enable cross-process communication between second computer process 2214 and first computer process 2202.

Figure 24:
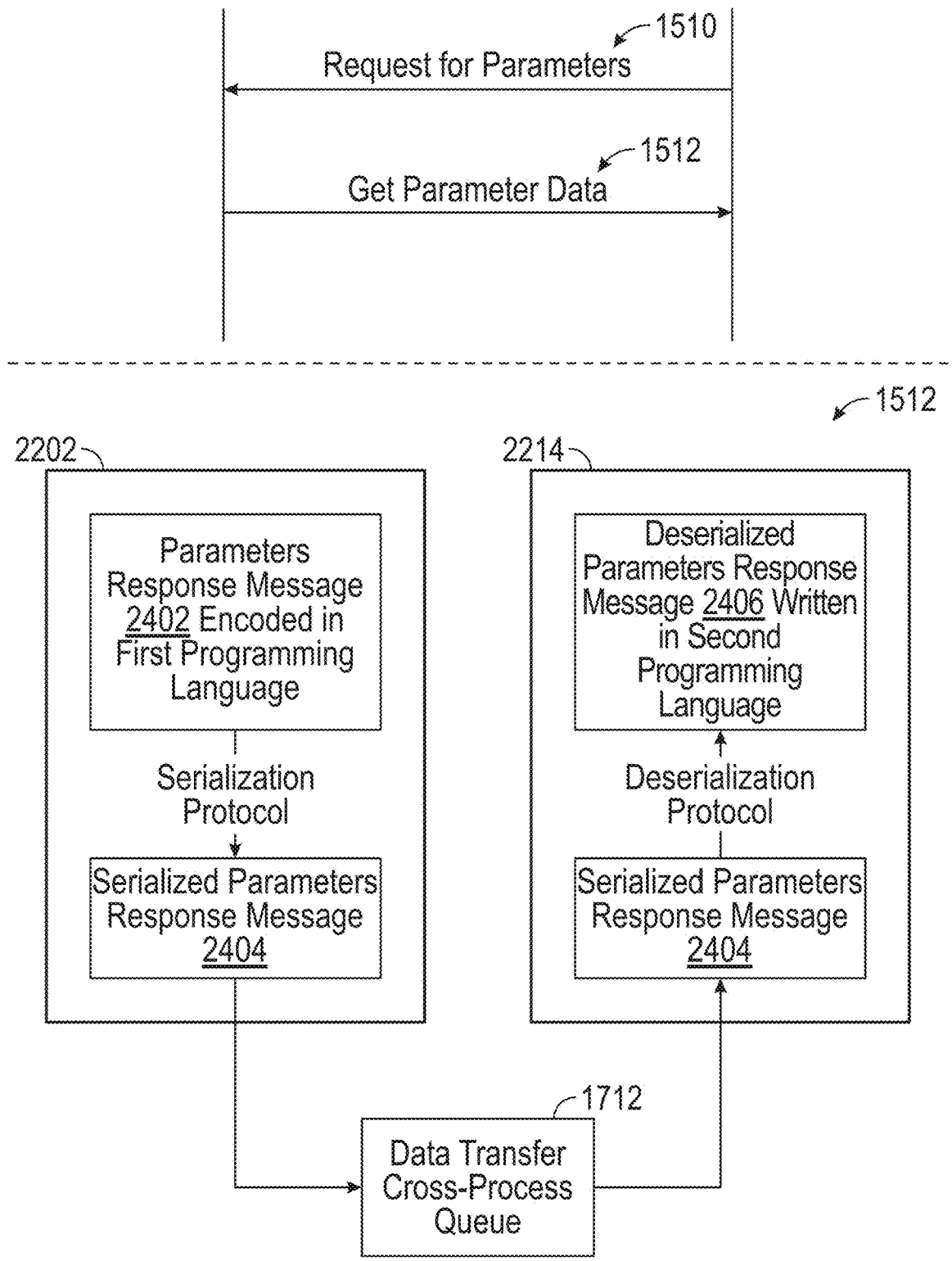
FIG. 24 illustrates an example schematic of transferring parameter data from a first computer process to a second computer process, according to some embodiments of the present technology.

Turning to FIG. 24, in one or more embodiments, first computer process 2202 may function to invoke a parameters response API function of the first set of API functions 2212 to transfer the requested parameter data stored in memory of first computer process 2202 or that may be accessible by first computer process to second computer process 2214. In one or more embodiments, first computer process 2202 may function as a listener to detect when data request messages (e.g., commands) are written to command cross-process queue 1602. For instance, in a non-limiting example, first computer process 2202 may function to detect serialized parameters request message 2304 within command cross-process queue 1602. In one or more embodiments, in response to detecting serialized parameters request message 2304 within command cross-process queue 1602, first computer process 2202 may invoke the parameters response API function of the first set of API functions 2212. The parameters response API function, as generally referred to herein, may be configured to generate a parameters response message that includes the requested parameter data (e.g., configuration data or the like).

In one or more embodiments, in response to first computer process 2202 invoking the parameters response API function, first computer process 2202 may function to read serialized parameters request message 2304 from command cross-process queue 1602. It shall be recognized, in one or more embodiments, first computer process 2202 may read serialized parameters request message 2304 from command cross-process queue 1602 using a data reader of the parameters response API function.

Additionally, or alternatively, in one or more embodiments, based on first computer process 2202 reading serialized parameters request message 2304 from command cross-process queue 1602, first computer process 2202 may function to deserialize serialized parameters request message 2304 into deserialized parameters request message 2306. Deserialized parameters request message 2306, in one or more embodiments, may be encoded in a programming language compatible with first computer process 2202, such as the first programming language (e.g., C++). It shall be recognized that, in one or more embodiments, first computer process 2202 may deserialize serialized parameters request message 2304 into deserialized parameters request message 2306 based on executing a deserialization protocol of the parameters response API function, which may use one or more techniques described in method 3000.

In one or more embodiments, deserialized parameters request message 2306 may include a representation of the original request for parameter data created by second computer process 2214, but now in a data format compatible with first computer process 2202. That is, in one or more embodiments, deserialized parameters request message 2306 may be in a form interpretable by first computer process 2202. Accordingly, in one or more embodiments, in response to deserializing serialized parameters request message 2304, first computer process 2202 may function to process and respond to deserialized parameters request message 2306 by retrieving parameter data (e.g., default function parameters, user-provided function parameters, configuration data, etc.) associated with the analytical function specified within request 2204. In other words, first computer process 2202, using the parameters response API function, may function to retrieve the parameter data stored in memory of first computer process 2202. It shall be noted that, in one or more embodiments, the parameter data may not be stored in memory of first computer process 2202, and the parameters response API function may function to retrieve the parameter data from a computer database or any other suitable data source of analytics service 1530.

Additionally, or alternatively, in one or more embodiments, based on retrieving the parameter data, first computer process 2202 may function to create a parameters response message 2402 that includes the parameter data stored in memory of first computer process 2202. In one or more embodiments, parameters response message 2402 may be created using the parameters response API function. It shall be noted that, in one or more embodiments, parameters response message 2402 may be encoded in the first programming language (e.g., C++) or in a format compatible with first computer process 2202.

Additionally, or alternatively, in one or more embodiments, based on creating parameters response message 2402 that includes the parameter data, first computer process 2202 may function to serialize parameters response message 2402 into serialized parameters response message 2404. Serialized parameters response message 2404, in one or more embodiments, may include the parameter data in a binary data format. It shall be recognized that, in one or more embodiments, first computer process 2202 may serialize parameters response message 2402 based on executing a serialization protocol of the parameters response API function.

At least one technical benefit of serializing parameters response message 2402 into serialized parameters response message 2404 may enable serialized parameters response message 2404 to be transferred to any auxiliary or child computer process irrespective of the programming language or runtime environment in which the receiving process operates.

Additionally, or alternatively, in one or more embodiments, based on the parameters response API function serializing parameters response message 2402 into serialized parameters response message 2404, first computer process 2202 may write serialized parameters response message 2404 to data transfer cross-process queue 1712. In one or more embodiments, first computer process 2202 may write serialized parameters response message 2404 to data transfer cross-process queue 1712 using a data writer of the parameters response API function.

Accordingly, in one or more embodiments, second computer process 2214 may detect serialized parameters response message 2404 within data transfer cross-process queue 1712 and, in turn, invoke a parameters response handler API function of the second set of API functions 2216 in response to detecting serialized parameters response message 2404 within data transfer cross-process queue 1712. In one or more embodiments, in response to invoking the parameters response handler API function, second computer process 2214 may function to read serialized parameters response message 2404 from data transfer cross-process queue 1712. It shall be recognized that, in one or more embodiments, second computer process 2214 may function to read serialized parameters response message 2404 from data transfer cross-process queue 1712 using a data reader of the parameters response handler API function.

Additionally, or alternatively, in one or more embodiments, in response to second computer process 2214 reading serialized parameters response message 2404 from data transfer cross-process queue 1712, second computer process 2214 may function to deserialize serialized parameters response message 2404 into deserialized parameters response message 2406. Deserialized parameters response message 2406, in one or more embodiments, may include the parameter data encoded in a programming language compatible with second computer process 2214, such as the second programming language (e.g., Python). It shall be recognized that, in one or more embodiments, second computer process 2214 may deserialize serialized parameters response message 2404 into deserialized parameters response message 2406 based on executing a deserialization protocol of the parameters response handler API function, which may use one or more techniques described in method 3000.

Accordingly, in one or more embodiments, in response to deserializing serialized parameters response message 2404 into deserialized parameters response message 2406, second computer process 2214 may function to extract the parameter data included within the deserialized parameters response message 2406, and, in turn, load or write the extracted parameter data into memory of second computer process 2214.

Stated another way, in one or more embodiments, in response to second computer process 2214 invoking the parameters request API function, serialized parameters request message 2304 may be transmitted or transferred to first computer process 2202 via command cross-process queue 1602. In one or more embodiments, after first computer process 2202 receives the serialized parameters request message 2304, first computer process 2202 may invoke the parameters response API function to write the serialized parameters response message 2404 that includes the requested parameter data to data transfer cross-process queue 1712. Accordingly, in one or more embodiments, second computer process 2214 may invoke the parameters response handler API function to read serialized parameters response message 2404 from data transfer cross-process queue 1712. In one or more embodiments, reading serialized parameters response message 2404 from data transfer cross-process queue 1712 may include reading, using a data reader of the parameters response handler API function, the requested parameter data encoded in the binary data format from data transfer cross-process queue 1712, and converting, using the data reader of the parameters response handler API function, the requested parameter data encoded in the binary data format to one or more representations in the second programming language.

Figure 25:
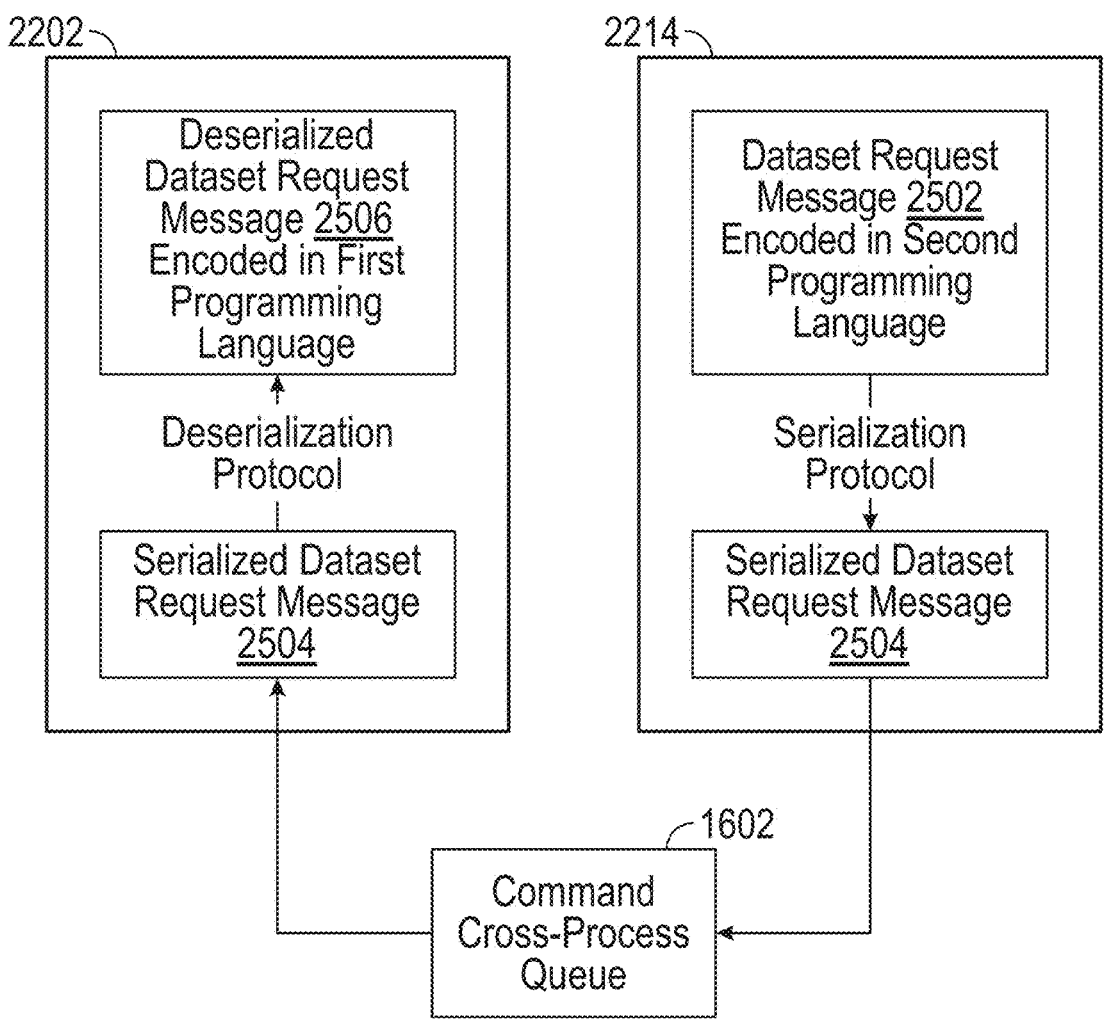
FIG. 25 illustrates an example schematic of transferring a request for datasets from a second computer process to a first computer process, according to some embodiments of the present technology.

Turning to FIG. 25, in one or more embodiments, second computer process 2214 may function to invoke a tabular data-request API function of the second set of API functions 2216 to transfer the request for datasets 1514 from second computer process 2214 to first computer process 2202. The tabular data-request API function, as generally referred to herein, may be configured to generate and transmit a request for one or more datasets (e.g., tabular data, etc.) that may be required by a given algorithm (e.g., algorithm 2218) for execution.

In one or more embodiments, in response to second computer process 2214 invoking the tabular data-request API function, the tabular data-request API function may function to create dataset request message 2502. The dataset request message 2502, in one or more embodiments, may include a request to obtain, from first computer process 2202, one or more datasets (e.g., tabular data or the like) specified within the request to perform the analytical function 2204. For instance, in a non-limiting example, the request to perform the analytical function 2204 may specify one or more datasets for the analytical function to process during the requested computation task and, in turn, second computer process 2214 may function to invoke the tabular data-request API function to obtain the one or more datasets. It shall be recognized that, in one or more embodiments, dataset request message 2502 may be encoded in a programming language compatible with second computer process 2214, such as the second programming language (e.g., Python).

Additionally, or alternatively, in one or more embodiments, based on the tabular data-request API function creating the dataset request message 2502, the tabular data-request API function may function to serialize dataset request message 2502 into serialized dataset request message 2504. Serialized dataset request message 2504, in one or more embodiments, may be encoded in a binary data format. It shall be recognized that, in one or more embodiments, dataset request message 2502 may be serialized into serialized dataset request message 2504 based on a serialization protocol of the tabular data-request API function, which may use one or more techniques described in method 3000.

At least one technical benefit of serializing dataset request message 2502 into serialized dataset request message 2504 may enable serialized dataset request message 2504 to be transferred to a target computer process (e.g., first computer process 2202, parent computer process 1500, etc.) irrespective of the programming language or runtime environment in which the target computer process operates.

Additionally, or alternatively, in one or more embodiments, based on the tabular data-request API function serializing dataset request message 2502 into serialized dataset request message 2504, the tabular data-request API function may function to write serialized dataset request message 2504 to command cross-process queue 1602. It shall be recognized that, in one or more embodiments, the tabular data-request API function may function to write serialized dataset request message 2504 to command cross-process queue 1602 using a data writer of the tabular data-request application programming interface function. At least one technical benefit of writing serialized dataset request message 2504 to command cross-process queue 1602 may enable cross-process communication between second computer process 2214 and first computer process 2204.

Figure 26:
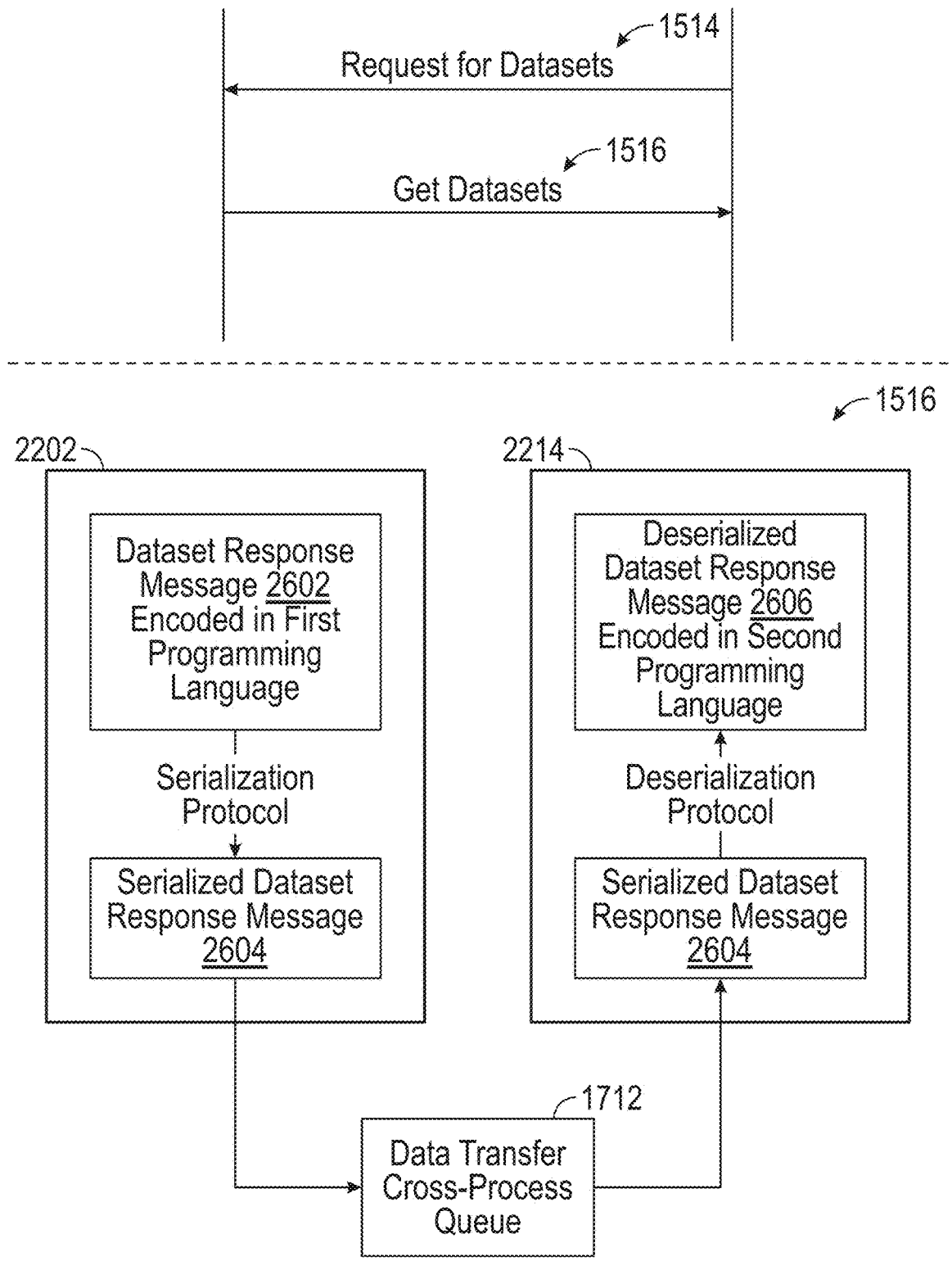
FIG. 26 illustrates an example schematic of transferring datasets from a first computer process to a second computer process, according to some embodiments of the present technology.

Turning to FIG. 26, in one or more embodiments, first computer process 2202 may function to invoke a tabular data-response API function of the first set of API functions 2212 to transfer the requested dataset or datasets stored in memory of first computer process 2202 or that may be accessible by first computer process 2202 to second computer process 2214. In one or more embodiments, first computer process 2202 may function as a listener to detect when data request messages (e.g., commands or the like) are written to command cross-process queue 1602. For instance, in a non-limiting example, first computer process 2202 may function to detect serialized dataset request message 2504 within command cross-process queue 1602. In one or more embodiments, in response to detecting serialized dataset request message 2504 within command cross-process queue 1602, first computer process 2202 may invoke the tabular data-response API function of the first set of API functions 2212. The tabular data-response API function, as generally referred to herein, may be configured to generate a dataset response message that includes the requested datasets (e.g., tabular data, etc.).

In one or more embodiments, in response to first computer process 2202 invoking the tabular data-response API function, first computer process 2202 may function to read serialized dataset request message 2504 from command cross-process queue 1602. It shall be recognized, in one or more embodiments, first computer process 2202 may read serialized dataset request message 2504 from command cross-process queue 1602 using a data reader of the tabular data-response API function.

Additionally, or alternatively, in one or more embodiments, based on first computer process 2202 reading serialized dataset request message 2504 from command cross-process queue 1602, first computer process 2202 may function to deserialize serialized dataset request message 2504 into deserialized dataset request message 2506. Deserialized dataset request message 2506, in one or more embodiments, may be encoded in a programming language compatible with first computer process 2202, such as the first programming language (e.g., C++). It shall be recognized that, in one or more embodiments, first computer process 2202 may deserialize serialized dataset request message 2504 into deserialized dataset request message 2506 based on executing a deserialization protocol of the tabular data-response API function, which may use one or more techniques described in method 3000.

In one or more embodiments, deserialized dataset request message 2506 may include a representation of the original request for datasets created by second computer process 2214, but now in a data format compatible with first computer process 2202. That is, in one or more embodiments, deserialized dataset request message 2506 may be in a form interpretable by first computer process 2202. Accordingly, in one or more embodiments, in response to deserializing serialized dataset request message 2504, first computer process 2202 may function to process and respond to deserialized dataset request message 2506 by retrieving one or more datasets associated with the analytical function specified within request 2204. In other words, first computer process 2202, using the tabular data-response API function, may function to retrieve the one or more datasets stored in memory of first computer process 2202. It shall be noted that, in one or more embodiments, the one or more datasets may not be stored in memory of first computer process 2202, and the tabular data-response API function may function to retrieve the one or more datasets from a computer database of analytics service 1530.

Additionally, or alternatively, in one or more embodiments, based on retrieving the one or more datasets, first computer process 2202 may function to create a dataset response message 2602 that includes the one or more datasets stored in memory of first computer process 2202 or retrieved from the computer database of analytics service 1530. In one or more embodiments, dataset response message 2602 may be created using the tabular data-response API function. It shall be noted that, in one or more embodiments, dataset response message 2602 may be encoded in the first programming language (e.g., C++) or in a format compatible with first computer process 2202.

Additionally, or alternatively, in one or more embodiments, based on creating the dataset response message 2602 that includes the one or more datasets, first computer process 2202 may function to serialize dataset response message 2602 into serialized dataset response message 2604. Serialized dataset response message 2604, in one or more embodiments, may include the one or more datasets in a binary data format. It shall be recognized that, in one or more embodiments, first computer process 2202 may serialize dataset response message 2602 based on executing a serialization protocol of the tabular data-response API function.

At least one technical benefit of serializing dataset response message 2602 into serialized dataset response message 2604 may enable serialized dataset response message 2604 to be transferred to any auxiliary or child computer process irrespective of the programming language or runtime environment in which the receiving process operates.

Additionally, or alternatively, in one or more embodiments, based on the tabular data-response API function serializing dataset response message 2602 into serialized dataset response message 2604, first computer process 2202 may write serialized dataset response message 2604 to data transfer cross-process queue 1712. In one or more embodiments, first computer process 2202 may write serialized dataset response message 2604 to data transfer cross-process queue 1712 using a data writer of the tabular data-response API function.

Accordingly, in one or more embodiments, second computer process 2214 may detect serialized dataset response message 2604 within data transfer cross-process queue 1712 and, in turn, invoke a dataset response handler API function of the second set of API functions 2216 in response to detecting serialized dataset response message 2604 within data transfer cross-process queue 1712. In one or more embodiments, in response to invoking the dataset response handler API function, second computer process 2214 may function to read serialized dataset response message 2604 from data transfer cross-process queue 1712. It shall be recognized that, in one or more embodiments, second computer process 2214 may function to read serialized dataset response message 2604 from data transfer cross-process queue 1712 using a data reader of the dataset response handler API function.

Additionally, or alternatively, in one or more embodiments, in response to second computer process 2214 reading serialized dataset response message 2604 from data transfer cross-process queue 1712, second computer process 2214 may function to deserialize serialized dataset response message 2604 into deserialized dataset response message 2606. Deserialized dataset response message 2606, in one or more embodiments, may include the one or more datasets encoded in a programming language compatible with second computer process 2214, such as the second programming language (e.g., Python). It shall be recognized that, in one or more embodiments, second computer process 2214 may deserialize serialized dataset response message 2604 into deserialized dataset response message 2606 based on executing a deserialization protocol of the dataset response handler API function, which may use one or more techniques described in method 3000.

Accordingly, in one or more embodiments, in response to deserializing dataset response message 2604 into deserialized dataset response message 2606, second computer process 2214 may function to extract the one or more datasets included within deserialized dataset response message 2606, and, in turn, load the extracted datasets into memory of second computer process 2214.

Stated another way, in one or more embodiments, in response to second computer process 2214 invoking the tabular data-request API function, serialized dataset request message 2504 may be transmitted or transferred to first computer process 2202 via command cross-process queue 1602. In one or more embodiments, after first computer process 2202 receives the serialized dataset request message 2504, first computer process 2202 may invoke the tabular data-response API function to write serialized dataset response message 2604 that includes the one or more datasets to data transfer cross-process queue 1712. Accordingly, in one or more embodiments, second computer process 2214 may invoke the dataset response handler API function to read serialized dataset response message 2604 from data transfer cross-process queue 1712. In one or more embodiments, reading serialized dataset response message 2604 from data transfer cross-process queue 1712 may include reading, using a data reader of the dataset response handler API function, the requested dataset data encoded in the binary data format from data transfer cross-process queue 1712, and converting, using the data reader of the dataset response handler API function, the requested dataset data encoded in the binary data format to one or more representations in the second programming language (e.g., converting each dataset included in serialized dataset response message 2604 to a corresponding pandas dataframe object, etc.).

Computing an Analytical Result

In one or more embodiments, method 2100 may include process 2140. Process 2140, which includes computing an analytical result, may function to compute, by second computer process 2214 executing algorithm 2218, an analytical result based on providing algorithm 2218 with one or more pieces of data transferred from first computer process 2202. An analytical result, as generally referred to herein, may be a computed output that a subject algorithm produces by executing a predefined set of instructions or operations.

The analytical result outputted by a subject algorithm, in one or more embodiments, may include one or more computational artifacts (e.g., one or more computational artifacts, two or more computational artifacts, three or more computational artifacts, four or more computational artifacts, etc.). For instance, in a non-limiting example, the analytical result may include one or more of a data table, a graphical chart, a numerical value, a predictive score, a machine learning-based inference, a correlation matrix, a regression coefficient table, a trend analysis, a time series forecast, a probability distribution, a cluster map, a decision boundary map, an automated decisioning decision (e.g., allow, deny, review), a principal component analysis (PCA) plot, and any other suitable computational artifact.

In one or more embodiments, second computer process 2214 may execute algorithm 2218 based on or in response to second computer process 2214 receiving one or more parameters and one or more datasets from first computer process 2202. For instance, in a non-limiting example, when the analytical function associated with the request to perform the analytical function 2204 is encoded to use algorithm 2218, second computer process 2214 may provide the one or more parameters and the one or more datasets as input to algorithm 2218 and, in turn, algorithm 2218 may output an analytical result based on the provided parameters and datasets (e.g., the parameters and datasets transferred from first computer process 2202).

It shall be recognized that, in such an embodiment, the one or more datasets and the one or more parameters may initially be encoded in one or more data structures of the first programming language (e.g., C++), making them incompatible for direct use by algorithm 2218, which may be encoded in the second programming language (e.g., Python). Accordingly, in one or more embodiments, during the transfer of the one or more datasets and the one or more parameters from first computer process 2202 to second computer process 2214, first computer process 2202 may function to serialize and write the one or more datasets and the one or more parameters to a cross-process queue (e.g., data transfer cross-process queue 1712) and, in turn, second computer process 2214 may read and deserialize the one or more serialized datasets and the one or more serialized parameters written to the cross-process queue into one or more corresponding data structures of the second programming language.

Stated another way, in one or more embodiments, process 2140 may function to compute, by second computer process 2214 executing algorithm 2218, an analytical result based on providing the deserialized parameters and the deserialized datasets to algorithm 2218.

In another non-limiting example, second computer process 2214 may execute algorithm 2218 based on or in response to second computer process 2214 receiving one or more parameters and/or one or more datasets from first computer process 2202. In such a non-limiting example, when the analytical function associated with the request to perform the analytical function 2204 is encoded to use algorithm 2218, second computer process 2214 may provide the one or more parameters and the one or more datasets to algorithm 2218 and, in turn, algorithm 2218 may output an analytical result that includes a first computational artifact of a first computational artifact type (e.g., data table) and a second computational artifact of a second computational artifact type (e.g., a graph). In such a non-limiting example, the first computational artifact may include a summary data table that includes one or more metrics derived from the one or more datasets (e.g., averages, standard deviations, or any other suitable statistical values), and the second computational artifact may include a visual graph that represents a trend or distribution within the one or more datasets.

Transferring Analytical Result

Figure 27:
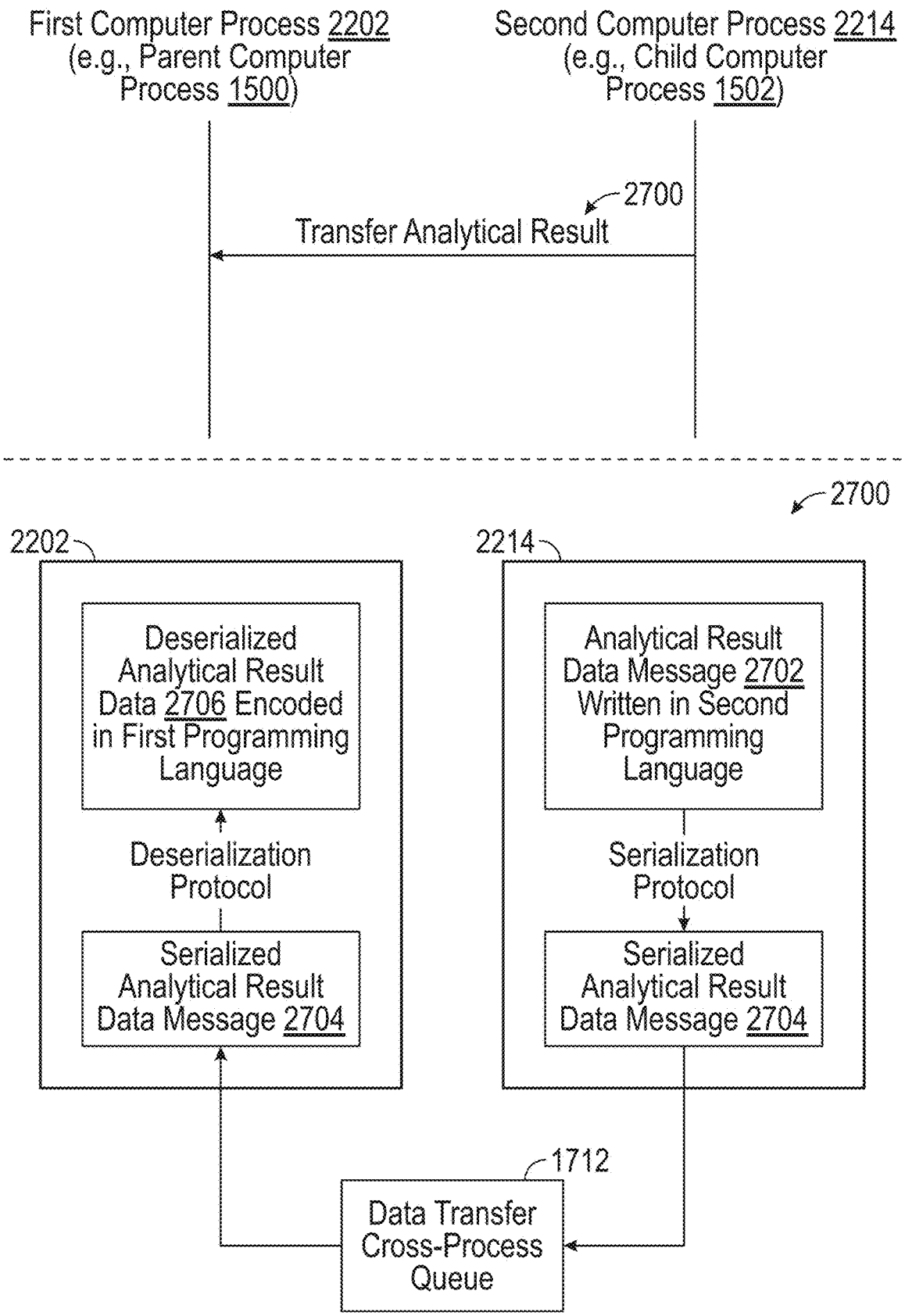
FIG. 27 illustrates an example schematic of transferring an analytical result from a second computer process to a first computer process, according to some embodiments of the present technology.

In one or more embodiments, method 2100 may include process 2150. Process 2150, which includes transferring analytical result 2700, may function to transfer the analytical result computed by algorithm 2218 from second computer process 2214 to first computer process 2202, as shown generally by way of example in FIG. 27. It shall be recognized that the phrase "transferring analytical result 2700" may be interchangeably referred to herein as "sending analytical output data 1524" or the like.

In one or more embodiments, child computer process 2214 may invoke an output data writer API function to transfer the analytical result computed by algorithm 2218 from second computer process 2214 to first computer process 2202. An output data writer API function, as generally referred to herein, may be a programming interface or a routine designed to transfer computational outputs (e.g., algorithmic outputs, analytical results, etc.) from one computer process to another computer process.

In one or more embodiments, algorithm 2218 may function to process raw input data to generate raw output data.

In one or more embodiments, based on algorithm 2218 generating the raw output data, algorithm 2218 may transform the raw output data into a structured data format, such as a data table. In other words, in one or more embodiments, the analytical result computed by algorithm 2218 may include one or more data tables that includes the raw output data.

Accordingly, in one or more embodiments, based on or in response to algorithm 2218 computing or generating the analytical result, second computer process 2214 may function to invoke the output data writer API function to transfer the analytical result from second computer process 2214 to first computer process 2202. In one or more embodiments, in response to invoking the output data writer API function, second computer process 2214 may function to create analytical result data message 2702 that includes the analytical result computed by algorithm 2218. Analytical result data message 2702, in one or more embodiments, may be encoded or written in one or more data structures of a programming language compatible with second computer process 2214, such as Python. Stated another way, in one or more embodiments, second computer process 2214 may function to create analytical result data message 2702 using the output data writer API function.

In one or more embodiments, based on or in response to creating analytical result data message 2702, the output data writer API function may function to serialize analytical result data message 2702 into serialized analytical result data message 2704. Serialized analytical result data message 2704, in one or more embodiments, may include the analytical result (e.g., the one or more data tables that includes the raw output data) in a binary data format. It shall be recognized that, in one or more embodiments, analytical result data message 2702 may be serialized into serialized analytical result data message 2704 based on executing a serialization protocol of the output data writer API function, which may use one or more techniques described in method 3000.

In one or more embodiments, based on or in response to serializing analytical result data message 2702 into serialized analytical result data message 2704, second computer process 2214 may function to write serialized analytical result data message 2704 to data transfer cross-process queue 1712. In one or more embodiments, second computer process 2214 may write serialized analytical result data message 2704 to data transfer cross-process queue 1712 using a data writer of the output data writer API function. That is, in one or more embodiments, the output data writer API function may write serialized analytical result data message 2704 to data transfer cross-process queue 1712.

Accordingly, in one or more embodiments, first computer process 2202 may detect serialized analytical result data message 2704 within data transfer cross-process queue 1712 and, in turn, invoke an output data reader API function in response to detecting serialized analytical result data message 2704 within data transfer cross-process queue 1712. In one or more embodiments, in response to invoking the output data reader API function, first computer process 2202 may function to read serialized analytical result data message 2704 from data transfer cross-process queue 1712. It shall be recognized that, in one or more embodiments, first computer process 2202 may function to read serialized analytical result data message 2704 from data transfer cross-process queue 1712 using a data reader of the output data reader API function.

In one or more embodiments, reading the serialized analytical result data message 2704 from data transfer cross-process queue 1712 may include reading, using the data reader of the output data reader API function, the analytical result that includes the one or more data tables in the binary data format from data transfer cross-process queue 1712 and deserializing, using the data reader of the output data reader API function, the one or more data tables in the binary data format into one or more deserialized data tables encoded in one or more data structures of the first programming language (e.g., deserialized analytical result data 2706).

Accordingly, in one or more embodiments, first computer process 2202 may write the one or more deserialized data tables (e.g., deserialized analytical result data 2706) to a computer database of analytics service 1530. Stated another way, in one or more embodiments, based on or in response to first computer process 2202 reading the one or more deserialized data tables (e.g., deserialized analytical result data 2706) into memory of first computer process 2202, first computer process 2202 may write the one or more deserialized data tables into the computer database of analytics service 1530 (e.g., saving or loading the one or more deserialized data tables to a computer database that corresponds to the user that initiated the request). It shall be recognized that, in such an embodiment, second computer process 2214 may not have permissions to write the analytical result to the computer database and first computer process 2202 may have the permissions to write the analytical result (e.g., deserialized analytical result data 2706) to the computer database.

Additionally, or alternatively, in one or more embodiments, second computer process 2214 may invoke the output data writer API function to create analytical result data message 2702. Analytical result data message 2702, in one or more embodiments, may include the analytical result computed by algorithm 2218 and may specify a request for first computer process 2202 to save the analytical result to the computer database of analytics service 1530.

In one or more embodiments, based on or in response to creating analytical result data message 2702, the output data writer API function may function to serialize analytical result data message 2702 into serialized analytical result data message 2704. Serialized analytical result data message 2704, in one or more embodiments, may include the analytical result computed by algorithm 2218 in a binary data format and the request for first computer process 2202 to save the analytical result to the computer database in the same binary data format. It shall be recognized that, in one or more embodiments, analytical result data message 2702 may be serialized into serialized analytical result data message 2704 based on a serialization protocol of the output data writer API function.

Accordingly, in one or more embodiments, based on the output data writer API function serializing analytical result data message 2702 into serialized analytical result data message 2704, second computer process 2214 may write serialized analytical result data message 2704 to command cross-process queue 1602. In one or more embodiments, second computer process 2214 may write serialized analytical result data message 2704 to command cross-process queue 1602 using a data writer of the output data writer API function.

Accordingly, in one or more embodiments, first computer process 2202 may detect serialized analytical result data message 2704 within command cross-process queue 1602 and, in turn, invoke an output data reader API function in response to detecting serialized analytical result data message 2704 within command cross-process queue 1602. In one or more embodiments, in response to invoking the output data reader API function, first computer process 2202 may read serialized analytical result data message 2704 from command cross-process queue 1602. It shall be recognized that, in one or more embodiments, first computer process 2202 may read serialized analytical result data message 2704 from command cross-process queue 1602 using the output data reader API function.

In one or more embodiments, reading serialized analytical result data message 2704 from command cross-process queue 1602 may include reading, using a data reader of the output data reader API function, serialized analytical result data message 2704 from command cross-process queue 1602. Furthermore, in one or more embodiments, serialized analytical result data message 2704 may be deserialized into deserialized analytical result data 2706. Deserialized analytical result data 2706, in one or more embodiments, may include a representation of the analytical result in one or more data structures of the first programming language (e.g., C++) and a representation of the request for first computer process 2202 to save the analytical result to the computer database in one or more data structures of the first programming language (e.g., C++). Accordingly, in one or more embodiments, first computer process, using the output data reader API function, may read the deserialized analytical result data 2706 into memory of first computer process 2202.

Accordingly, based on or in response to first computer process 2202 identifying or detecting the deserialized request to save the analytical result to the computer database, first computer process 2202 may write the representation of the analytical result in the one or more data structures of the first programming language (e.g., C++) to the computer database of analytics service 1530.

It shall be further recognized that, in one or more embodiments, serialized analytical result data message 2704 may be deserialized into deserialized analytical result data 2706 based on executing a deserialization protocol of the output data reader API function, which may use one or more techniques described in method 3000.

Figure 28:
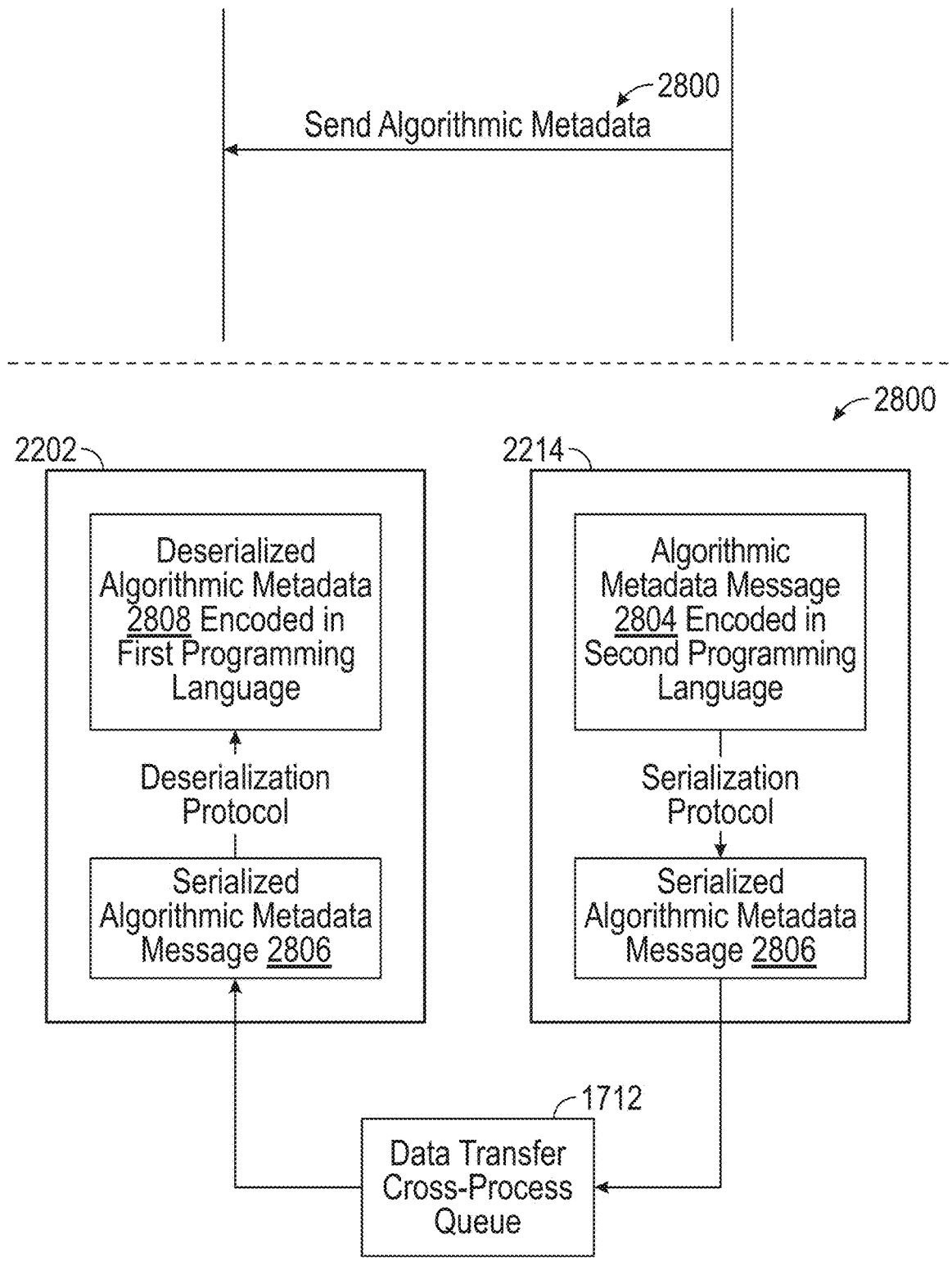
FIG. 28 illustrates an example schematic of transferring algorithmic metadata from a second computer process to a first computer process, according to some embodiments of the present technology.

Turning to FIG. 28, in one or more embodiments, second computer process 2214 may function to collect or obtain algorithmic metadata associated with or related to the execution of algorithm 2218. Algorithmic metadata, as generally referred to herein, may include information describing the execution, configuration, performance, and/or outputs of algorithm 2218. For example, the algorithmic metadata, in one or more embodiments, may include algorithm execution data (e.g., algorithm start and end times, total runtime or processing time, resource consumption (e.g., memory usage, utilization of one or more central processing units (CPU), utilization of one or more graphics processing unit (GPU), etc.), input/output data (e.g., details about input datasets (e.g., size, format, structure), information about analytical result or output artifacts (e.g., type, size, summary, etc.), configuration data (e.g., parameter values used during execution of algorithm 2218 (e.g., learning rates, number of clusters, hyperparameters), algorithmic-specific settings or options, etc.), version of algorithm 2218 used, and/or execution context (e.g., programming language or runtime environment (e.g., Python 3.9, Julia 1.6, etc.), hardware environment (e.g., CPU type, GPU model, RAM availability, etc.).

In one or more embodiments, process 2150 may further function to transfer algorithmic metadata 2800 associated with or related to the execution of algorithm 2218 from second computer process 2214 to first computer process 2202. It shall be recognized that the phrase "transferring algorithmic metadata 2800" may be interchangeably referred to herein as "transferring metadata" or the like.

In one or more embodiments, second computer process 2214 may invoke an algorithm metadata writer API function to transfer algorithmic metadata associated with the execution of algorithm 2218 from second computer process 2214 to first computer process 2202. An algorithm metadata writer API function, as generally referred to herein, may be a programming interface or a routine designed to transfer algorithmic metadata from one computer process to another computer process.

Accordingly, in one or more embodiments, based on or in response to second computer process 2214 obtaining algorithmic metadata associated with the execution of algorithm 2218, second computer process 2214 may invoke the algorithm metadata writer API function to transfer the algorithmic metadata from second computer process 2214 to first computer process 2202. In one or more embodiments, in response to invoking the algorithm metadata writer API function, second computer process 2214 may function to create algorithmic metadata message 2804 that includes the algorithmic metadata associated with the execution of algorithm 2218. Algorithmic metadata message 2804, in one or more embodiments, may be encoded or written in one or more data structures of a programming language compatible with second computer process 2214, such as Python. Stated another way, in one or more embodiments, second computer process 2214 may function to create algorithmic metadata message 2804 using the algorithm metadata writer API function.

In one or more embodiments, based on or in response to creating algorithmic metadata message 2804, the algorithm metadata writer API function may function to serialize algorithmic metadata message 2804 into serialized algorithmic metadata message 2806. Serialized algorithmic metadata message 2806, in one or more embodiments, may include the algorithmic metadata associated with the execution of algorithm 2218 in a binary data format rather than in the one or more data structures of the second programming language (e.g., Python). It shall be recognized that, in one or more embodiments, algorithmic metadata message 2804 may be serialized into serialized algorithmic metadata message 2806 based on executing a serialization protocol of the algorithm metadata writer API function, which may use one or more techniques described in method 3000.

In one or more embodiments, based on or in response to serializing algorithmic metadata message 2804 into serialized algorithmic metadata message 2806, second computer process 2214 may function to write serialized algorithmic metadata message 2806 to data transfer cross-process queue 1712. Stated differently, in one or more embodiments, second computer process 2214 may write serialized algorithmic metadata message 2806 to data transfer cross-process queue 1712 using a data writer of the algorithm metadata writer API function. That is, in one or more embodiments, the algorithm metadata writer API function may write serialized algorithmic metadata message 2806 to data transfer cross-process queue 1712.

Accordingly, in one or more embodiments, first computer process 2202 may detect serialized algorithmic metadata message 2806 within data transfer cross-process queue 1712 and, in turn, invoke an algorithm metadata reader API function in response to detecting serialized algorithmic metadata message 2806 within data transfer cross-process queue 1712. In one or more embodiments, in response to invoking the algorithm metadata reader API function, first computer process 2202 may function to read serialized algorithmic metadata message 2806 from data transfer cross-process queue 1712. It shall be recognized that, in one or more embodiments, first computer process 2202 may function to read serialized algorithmic metadata message 2806 from data transfer cross-process queue 1712 using a data reader of the algorithm metadata reader API function.

In one or more embodiments, reading the serialized algorithmic metadata message 2806 from data transfer cross-process queue 1712 may include reading, using the data reader of the algorithm metadata reader API function, the algorithmic metadata encoded in the binary data format from data transfer cross-process queue 1712, and deserializing, using the data reader of the algorithm metadata reader API function, the algorithmic metadata in the binary data format into deserialized algorithmic metadata 2808 that is encoded in one or more data structures of the first programming language (e.g., C++).

It shall be recognized, in one or more embodiments, deserialized algorithmic metadata 2808 may be saved to a computer database of analytics service 1530 in analogous ways described above.

It shall be further recognized that, in one or more embodiments, serialized algorithmic metadata message 2806 may be deserialized into deserialized algorithmic metadata message 2808 based on executing a deserialization protocol of the algorithm metadata reader API function, which may use one or more techniques described in method 3000.

Figure 29:
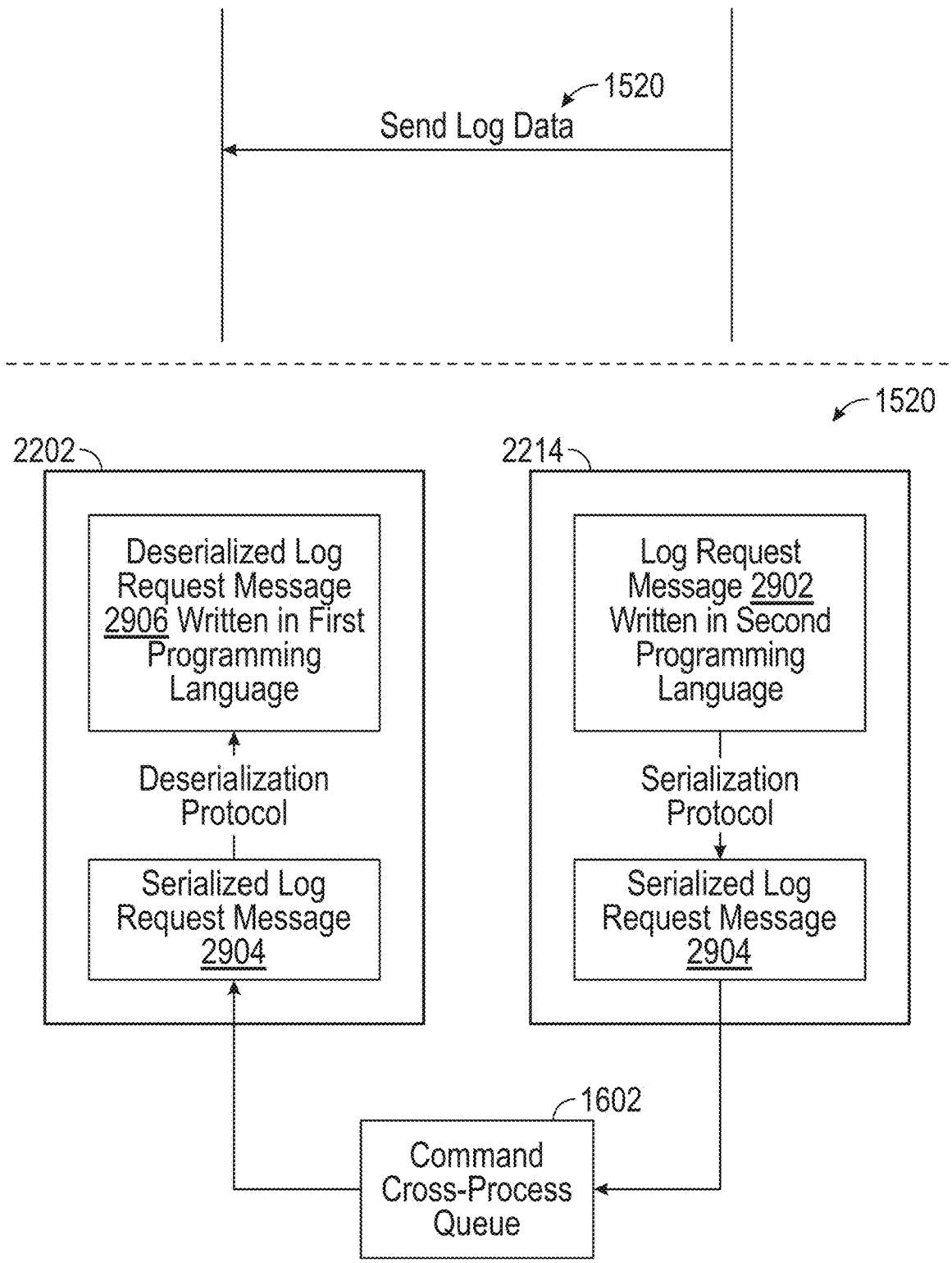
FIG. 29 illustrates an example schematic of transferring log data from a second computer process to a first computer process, according to some embodiments of the present technology.

Turning to FIG. 29, in one or more embodiments, second computer process 2214 may generate one or more log request messages before, during, and/or after the execution of algorithm 2218. In such an embodiment, each respective log request message generated by second computer process 2214 may be transferred to first computer process 2202 via command cross-process queue 1602. It shall be recognized that, in one or more embodiments, second computer process 2214 may function to send or transfer the one or more log request messages from second computer process 2214 to first computer process 2202. It shall be further recognized that the phrase "sending or transferring log request messages" may be interchangeably referred to herein as "sending or transferring log data 1520" or the like.

In one or more embodiments, second computer process 2214 may invoke a log writer API function to create a log request message that specifies a request for logging module 2208 to log a target event that occurred within second computer process 2214. The target event, in one or more embodiments, may occur before, during, or after the execution of algorithm 2218. For instance, in a non-limiting example, second computer process 2214 may function to create, before the execution of algorithm 2218, a log request message that indicates the one or more parameters and the one or more datasets were successfully transferred from first computer process 2202 to second computer process 2214. In another non-limiting example, second computer process 2214 may function to create a log request message that indicates algorithm 2218 may have been commenced. In another non-limiting example, second computer process 2214 may function to create, during the execution of algorithm 2218, one or more log request messages that indicates an execution status of algorithm 2218 (e.g., first iteration completed, second iteration completed, algorithm proceeding to next phase of computation, etc.). In other words, in one or more embodiments, log request messages generated by second computer process 2214 may provide information associated with a status of a respective computation.

In one or more embodiments, second computer process 2214 may detect a subject event, occurring within second computer process 2214, that satisfies logging criteria and, in turn, second computer process 2214 may invoke a log writer API function that creates log request message 2902 that includes event data associated with the subject event. A log request message, as generally referred to herein, may specify a request for first computer process 2202 to log a target event and the corresponding event data that occurred on second computer process 2214 using logging module 2208 (e.g., add the target event to logging module 2208).

In one or more embodiments, based on or in response to creating log request message 2902, the log writer API function may function to serialize log request message 2902 into serialized log request message 2904. Serialized log request message 2904, in one or more embodiments, may include the event data associated with the subject event encoded in a binary data format. It shall be recognized that, in one or more embodiments, log request message 2902 may be serialized into serialized log request message 2904 based on executing a serialization protocol of the log writer API function.

Accordingly, in one or more embodiments, based on the log writer API function serializing log request message 2902 into serialized log request message 2904, second computer process 2214 may write serialized log request message to command cross-process queue 1602. In one or more embodiments, second computer process 2214 may write serialized log request message 2904 to command cross-process queue 1602 using a data writer of the log writer API function.

Accordingly, in one or more embodiments, first computer process 2202 may detect serialized log request message 2904 within command cross-process queue 1602 and, in turn, invoke a log reader API function in response to detecting serialized log request message 2904 within command cross-process queue 1602. In one or more embodiments, in response to invoking the log reader API function, first computer process 2202 may read serialized log request message 2904 from command cross-process queue 1602. It shall be recognized that, in one or more embodiments, first computer process 2202 may read serialized log request message 2904 from command cross-process queue 1602 using the log reader API function.

In one or more embodiments, reading serialized log request message 2904 from command cross-process queue 1602 may include reading, using a data reader of the log reader API function, serialized log request message 2904 from command cross-process queue 1602. Furthermore, in one or more embodiments, serialized log request message 2904 may be deserialized into deserialized log request message 2906. Deserialized log request message 2906, in one or more embodiments, may include a representation of the event data in one or more data structures of the first programming language (e.g., C++). Accordingly, in one or more embodiments, first computer process 2202, using the log reader API function, may read the deserialized event data into memory of first computer process 2202.

It shall be further recognized that, in one or more embodiments, serialized log request message 2904 may be deserialized into deserialized log request message 2906 based on executing a deserialization protocol of the log reader API function, which may use one or more techniques described in method 3000.

Furthermore, in one or more embodiments, first computer process may function to surface the deserialized event data that corresponds to the subject event via logging module 2208. That is, in one or more embodiments, in accordance with the instructions specified by deserialized log request message 2906, the subject event and the associated deserialized event data may be logged within the logging module 2208 for storage, monitoring, or further analysis.

It shall be recognized that, in one or more embodiments, first computer process 2202 may function to surface, using logging module 2208, a set of log messages that includes one or more error events or one or more informational events that occurred within first computer process 2202 and second computer process 2214. The set of log messages, in such an embodiment, may include a first subset of log messages generated by the first computer process and a second subset of log messages generated by the second computer process.

FIG. 30 illustrates one embodiment of a method 3000 for transferring data blocks between multiple computer processes running on a single computer. It shall be appreciated that other embodiments contemplated within the scope of the present disclosure may involve more operations, fewer operations, different operations, or a different order of operations than as shown in FIG. 30.

Transferring Data Blocks

In one or more embodiments, method 3000 may include process 3110. Process 3110, which may include transferring data blocks, may function to transfer a plurality of data blocks between a plurality of computer processes operating within an operating system of a single computer. A single computer, as generally referred to herein, may be a computing device (e.g., a server, a desktop computer, a laptop computer, etc.) that is capable of simultaneously or sequentially running multiple computer processes using one or more hardware components and/or one or more software components of the computing device. It shall be recognized that the phrase "data block" may be interchangeably referred to herein as a "message," or the like.

In one or more embodiments, a system or service implementing method 3000 may transfer the plurality of data blocks from first computer process 2202 to second computer process 2214 using an application programming interface. The application programming interface, in one or more embodiments, may provide a plurality of application programming interface (API) functions that may be invoked to assist with transferring the plurality of data blocks from first computer process 2202 to second computer process 2214. At least one technical benefit of using the application programming interface and the associated application programming interface functions may enable the plurality of data blocks to be transferred from first computer process 2202 to second computer process 2214 even when first computer process 2202 and second computer process 2214 execute instructions in different programming languages.

In one or more embodiments, the application programming interface may include the first set of API functions 2212 and the second set of API functions 2216. In such an embodiment, the first set of API functions 2212 of the application programming interface may be accessible by first computer process 2202, and the second set of API functions 2216 of the application programming interface may be accessible by second computer process 2214. It shall be noted that, in one or more embodiments, the first set of API functions 2212 and the second set of API functions 2216 may operate in a complementary manner to enable computer processes to interpret data blocks (e.g., messages, etc.) exchanged during the execution of an analytical operation, analytical function, or the like.

In one or more embodiments, the transfer of the plurality of data blocks from first computer process 2202 to second computer process 2214 may occur sequentially or simultaneously. For instance, in a non-limiting example, second computer process 2214 may initiate a data transfer process by sending a request for a specific data block (e.g., request for parameters 1510) to first computer process 2202, which may respond by writing the requested data block to a subject cross-process queue. Once second computer process 2214 reads the data block from the subject cross-process queue, second computer process 2214 may send a new request (e.g., request for datasets 1514) for the next data block, continuing such process for each subsequent request and corresponding data block. In another non-limiting example, to simultaneously transfer the plurality of data blocks from first computer process 2202 to second computer process 2214, first computer process 2202 may concurrently execute, via a plurality of producer processes, a plurality of write operations that write the plurality of data blocks to a target cross-process queue, while second computer process 2214 may concurrently execute, via a plurality of consumer processes, a plurality of read operations that read the plurality of data blocks from the target cross-process queue.

In another non-limiting example, a system or service implementing method 3000 may implement a plurality of cross-process queues (e.g., plurality of data transfer cross-process queues) within shared memory 1600 of computer 1604 in response to obtaining the plurality of data blocks to be transferred from first computer process 2202 to second computer process 2214. For instance, in a non-limiting example, first computer process 2202 may use the application programming interface to create and implement the plurality of cross-process queues (e.g., the plurality of data transfer cross-process queues) within shared memory 1600 of computer 1604. It shall be noted that, in such an embodiment, each distinct cross-process queue may be assigned to a respective data block of the plurality of data blocks. Accordingly, in such a non-limiting example, the plurality of data blocks may be simultaneously transferred from first computer process 2202 to second computer process 2214 using the plurality of cross-process queues.

As described above, in one or more embodiments, first computer process 2202 may execute backend instructions of the analytics backend service in a first programming language (e.g., C++), while second computer process 2214 may be configured to execute algorithm 2218, written in a second programming language (e.g., Python), to process data transferred from first computer process 2202. The plurality of data blocks to be transferred from first computer process 2202 to second computer process 2214 may be encoded in one or more data structures of the first programming language. Accordingly, in such an embodiment, since second computer process 2214 may execute algorithm 2218 in a different programming language, the plurality of data blocks may not be in a format compatible with the second programming language and may need to be translated into a compatible format before algorithm 2218 can process the plurality of data blocks.

It shall be further recognized that, in one or more embodiments, process 3110 may perform a series of steps or operations to transfer each respective data block of the plurality of data blocks from first computer process 2202 to second computer process 2214, as described in more detail herein. The series of steps or operations, in one or more embodiments, may include creating a data block, serializing the data block, writing the serialized data block to a cross-process queue, reading the serialized data block from the cross-process queue, and deserializing the serialized data block.

Data Block Creation

Figure 31:
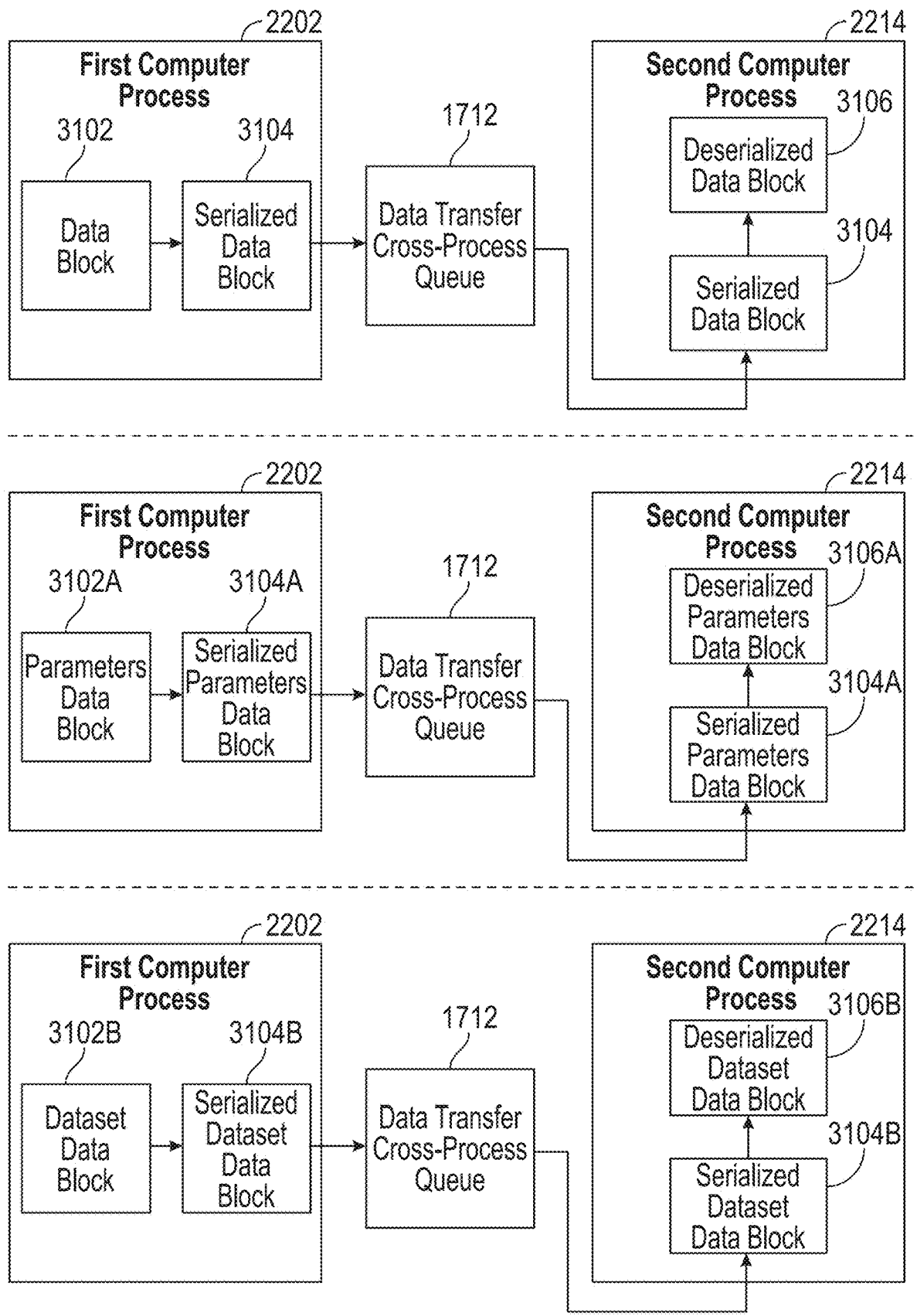
FIG. 31 illustrates an example schematic of using a data transfer cross-process queue to transfer a respective data block from a first computer process to a second computer process, according to some embodiments of the present technology.

Turning to FIG. 31, in one or more embodiments, in response to first computer process 2202 receiving a request to obtain data of a target data category, first computer process 2202 may obtain the data of the target data category from the analytics backend service as requested.

In one or more embodiments, the data of the target data category may be stored within memory of first computer process 2202 and, in turn, first computer process 2202 may invoke one or more API functions of the first set of API functions 2212 to query first computer process 2202 for the data of the target data category. For instance, in a non-limiting example, the request to obtain the data of the target data category may relate to a request to obtain one or more parameters (e.g., requests for parameters 1510) and, in turn, first computer process 2202 may invoke an API function (e.g., parameters response API function) of the first set of API functions 2212 to query first computer process 2202 for the requested parameters (e.g., the parameters may include parameter values entered by an end user and/or provided as default values). In another non-limiting example, the request to obtain the data of the target data category may relate to a request to obtain a dataset (e.g., requests for datasets 1514) and, in turn, first computer process 2202 may invoke an API function (e.g., tabular data-response API function) of the first set of API functions 2212 to query first computer process 2202 for the requested dataset.

Additionally, or alternatively, in one or more embodiments, the data of the target data category may be stored in a database of the analytics backend service and, in turn, first computer process 2202 may query the database of the analytics backend service for the data of the target data category. For instance, in a non-limiting example, the request to obtain the data of the target data category may relate to a request to obtain a dataset (e.g., requests for datasets 1514) and, in turn, first computer process 2202 may query the database of the analytics backend service for the dataset. In another non-limiting example, the request to obtain the data of the target data category may relate to a request to obtain one or more parameters (e.g., requests for parameters 1510) and, in turn, first computer process 2202 may query the database of the analytics backend service for the one or more parameters.

Accordingly, in one or more embodiments, based on or in response to retrieving the data of the target data category from the memory allocated to first computer process 2202 or from the database accessible by first computer process 2202, first computer process 2202 may function to create data block 3102 using the retrieved data, as shown generally by way of example in FIG. 31. In one or more embodiments, creating data block 3102 may include instantiating a data model that corresponds to the target data category and populating the instantiated data model with the retrieved data. In such an embodiment, data block 3102 may be encoded in one or more data structures of the first programming language, as first computer process 2202 executes instructions in the first programming language. It shall be recognized that, in one or more embodiments, the retrieved data may include one or more data matrices, one or more data vectors, or any other type of data without departing from the scope of the disclosure.

It shall be further recognized that, in one or more embodiments, analytics service 1530, in one or more embodiments, may include a plurality of predefined data models (e.g., plurality of predefined message schemas). Each predefined data model of the plurality of predefined data models, in one or more embodiments, may include a plurality of attributes (e.g., data fields or the like) along with the corresponding data type (e.g., integer, string, float, etc.) that defines a data structure for organizing and representing data associated with a respective data category. In other words, the data structure defined by each data model may provide a distinct schema for representing the corresponding data category, where the distinct schema specifies not only the attributes but also the associated data type (e.g., integer, string, float, etc.) for each respective attribute.

For instance, in one or more embodiments, the plurality of predefined data models may include a predefined data model for parameters (e.g., configurations). The predefined data model for parameters, in one or more embodiments, may specify a schema that includes a plurality of parameter-related attributes (e.g., parameter-related data fields), with each parameter-related attribute being associated with a corresponding data type (e.g., integer, string, float, etc.) that specifies the data format or data type required by the respective attribute. For instance, in a non-limiting example, a first parameter-related attribute of the plurality of parameter-related attributes may specify that the respective attribute requires data (e.g., an attribute value or the like) in a string format, while a second parameter-related attribute may specify that the respective attribute requires data (e.g., an attribute value) in an integer format.

Additionally, or alternatively, in one or more embodiments, the plurality of predefined data models may include a predefined data model for datasets. The predefined data model for datasets, in one or more embodiments, may specify a schema that includes a plurality of dataset-related attributes (e.g., dataset-related data fields), with each dataset-related attribute being associated with a corresponding data type (e.g., integer, string, float, etc.) that specifies the data format or data type required by the respective attribute. For instance, in a non-limiting example, a first dataset-related attribute of the plurality of dataset-related attributes may specify that the respective attribute requires data (e.g., an attribute value or the like) in a string format, while a second dataset-related attribute may specify that the respective attribute requires data (e.g., an attribute value) in an integer format.

In one or more embodiments, in response to first computer process 2202 receiving request for parameters 1510, first computer process 2202 may create parameters data block 3102A (e.g., parameters response message or the like). For instance, in a non-limiting example, based on first computer process 2202 receiving request for parameters 1510, first computer process 2202 may invoke the parameters response API function to create parameters data block 3102A. In such a non-limiting example, in response to invoking the parameters response API function, the parameters response API function may create parameters data block 3102A by retrieving parameter data associated with the request for parameters 1510, instantiating an instance of the predefined data model for parameters, and attributing a corresponding attribute value to each parameter-related attribute of the instantiated data model based on the retrieved parameter data (e.g., a first parameter-related attribute of the instantiated data model may be assigned one or more pieces of data included in the retrieved data, a second parameter-related attribute of the instantiated data model may be assigned one or more pieces of data included in the retrieved data, etc.).

In one or more embodiments, in response to first computer process 2202 receiving request for datasets 1514, first computer process 2202 may create dataset data block 3102B (e.g., dataset response message or the like). For instance, in a non-limiting example, based on first computer process 2202 receiving the request for datasets 1514, first computer process 2202 may invoke the tabular data-response API function to create dataset data block 3102B. In such a non-limiting example, in response to invoking the tabular data-response API function, the tabular data-response API function may create dataset data block 3102B by retrieving a dataset associated with the request for datasets 1514, instantiating an instance of the predefined data model for datasets, and attributing a corresponding attribute value to each dataset-related attribute of the instantiated data model based on the retrieved dataset (e.g., a column names attribute of the instantiated data model may be assigned the column names from the dataset, a column data types attribute of the instantiated data model may be assigned the data types of the dataset's columns, a data values attribute of the instantiated data model may be assigned the actual data values from the dataset, and an index attribute of the instantiated data model may be assigned the row labels or indices of the dataset, etc.).

Data Block Serialization

In one or more embodiments, method 3000 may include process 3110A. Process 3110A, which may include serializing data blocks, may function to serialize each respective data block of the plurality of data blocks to be transferred from first computer process 2202 to second computer process 2214. At least one technical benefit of serializing a respective data block into a corresponding serialized data block may enable any computer process in receipt of the corresponding serialized data block to interpret and deserialize the data within the corresponding serialized data block, regardless of the programming language used by the respective computer process.

In one or more embodiments, based on or in response to creating data block 3102, first computer process 2202 may serialize data block 3102, encoded in the first programming language (e.g., C++), into serialized data block 3104, which may be encoded in a programming language-agnostic data format. For instance, in a non-limiting example, process 3110A may serialize, using the application programming interface, data block 3102 into serialized data block 3104 based on a serialization protocol executed by the application programming interface. The serialization protocol, in one or more embodiments, may include a set of instructions, method, or rules for converting or translating a subject data block encoded in one or more data structures of a target programming language (e.g., C++, Python, etc.) into a corresponding serialized data block encoded in a programming language-agnostic data format, such as a binary-based data format.

Accordingly, in one or more embodiments, serializing data block 3102 into serialized data block 3104 may include translating each attribute of the plurality of attributes included in data block 3102 into a corresponding binary-based representation, translating each attribute value attributed to each attribute of the plurality of attributes included in data block 3102 into a corresponding binary-based representation, and translating the data type that corresponds to each attribute of the plurality of attributes included in data block 3102 into a corresponding binary-based representation. Stated another way, in one or more embodiments, serialized data block 3104 may include a binary-based representation of each attribute of the plurality of attributes included in data block 3102, a binary-based representation of the attribute value attributed to each attribute of the plurality of attributes included in data block 3102, and a binary-based representation of a data type that corresponds to each attribute of the plurality of attributes included in data block 3102.

For instance, in a non-limiting example, based on creating parameters data block 3102A, the parameters response API function may function to serialize parameters data block 3102A into serialized parameters data block 3104A (e.g., serialized parameters response message 2404). Serialized parameters data block 3104A, in one or more embodiments, may represent parameters data block 3102A as a sequence of bytes. It shall be recognized that, in one or more embodiments, the parameters response API function may function to serialize parameters data block 3102A into serialized parameters data block 3104A by executing a serialization protocol of the parameters response API function.

In another non-limiting example, based on creating dataset data block 3102B, the tabular data-response API function may function to serialize dataset data block 3102B into serialized dataset data block 3104B (e.g., serialized dataset response message 2604). Serialized dataset data block 3104B, in one or more embodiments, may represent dataset data block 3102B as a sequence of bytes. It shall be recognized that, in one or more embodiments, the tabular data-response API function may function to serialize dataset data block 3102B into serialized dataset data block 3104B by executing a serialization protocol of the tabular data-response API function.

Stated another way, in one or more embodiments, at least a subset of the first set of API functions 2212 may be invoked by first computer process 2202 to create a respective data block and serialize the respective data block.

Figure 32:
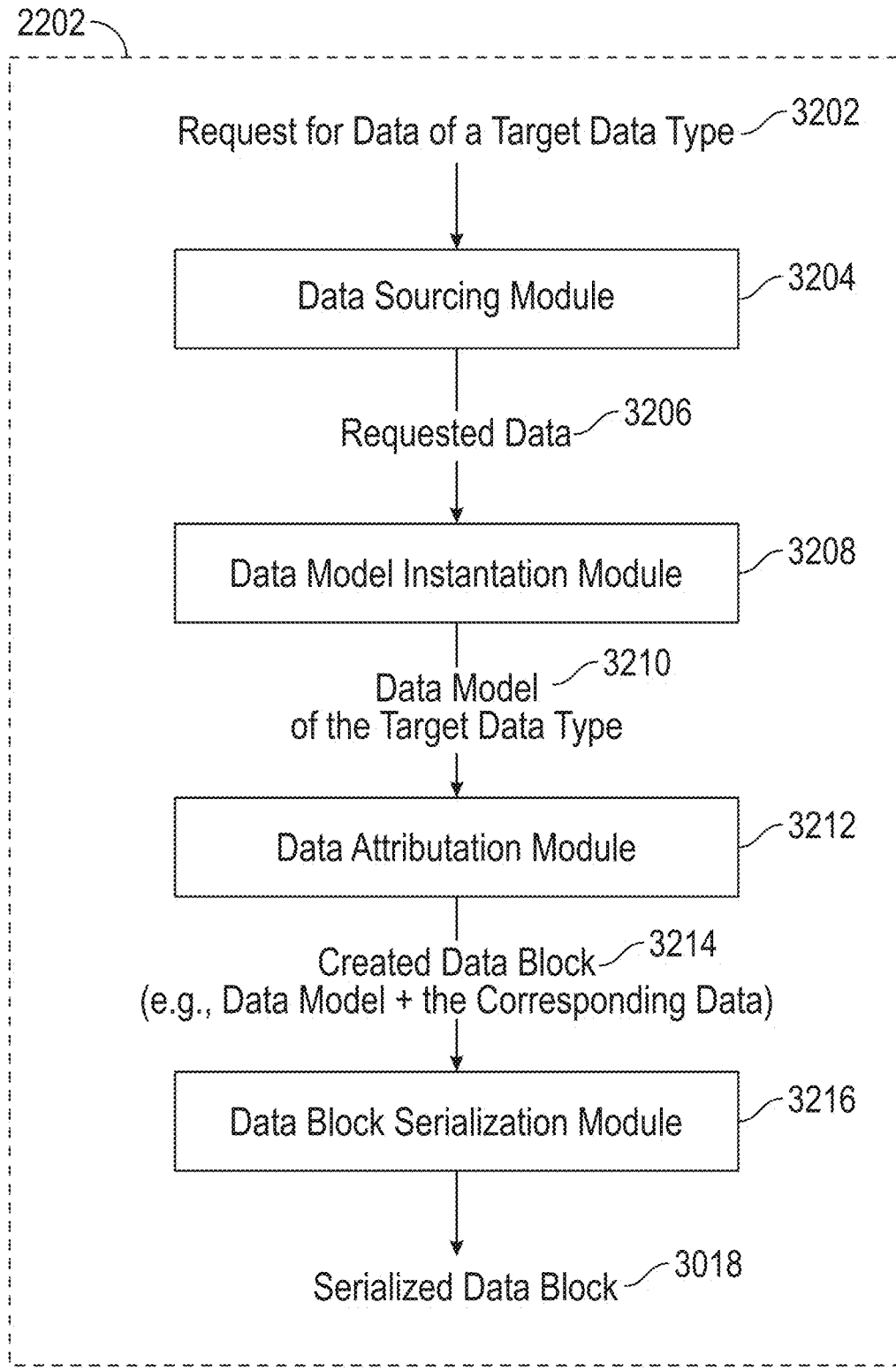
FIG. 32 illustrates an example schematic of serializing a respective data block, according to some embodiments of the present technology.

Turning to FIG. 32, in one or more embodiments, in response to first computer process 2202 receiving a request for data of a target data type 3202, first computer process 2202 may use data sourcing module 3204 to obtain the requested data 3206. Additionally, in such an embodiment, based on first computer process 2202 obtaining the requested data 3206 from data sourcing module 3204, first computer process may function to instantiate, using data model instantiation module 3208, an instance of a data model of the target data type 3210 encoded in the first programming language, as first computer process 2202 executes instructions in the first programming language.

Furthermore, in one or more embodiments, based on instantiating the instance of the data model of the target data type 3210 encoded in the first programming language, first computer process 2202 may use data attribution module 3212 to output created data block 3214. In such an embodiment, data attribution module 3212 may have created data block 3214 by populating the instantiated data model with the obtained data (e.g., requested data 3206). Accordingly, in one or more embodiments, first computer process 2202 may use data block serialization module 3216 to serialize created data block 3214 into a corresponding serialized data block 3018.

Data Block Writing

In one or more embodiments, method 3000 may include process 3110B. Process 3110B, which may include data block writing, may function to write a subject serialized data block to a cross-process queue in response to serializing the subject data block.

In one or more embodiments, based on creating serialized data block 3104, first computer process 2202 may write serialized data block 3104 to data transfer cross-process queue 1712. In such an embodiment, before first computer process 2202 writes serialized data block 3104 to data transfer cross-process queue 1712, process 3310B may use channel synchronization data structure 1710 to regulate or govern when first computer process 2202 has access to one or more of the plurality of shared memory channels. For instance, in a non-limiting example, when the count of shared memory channels of the plurality of shared memory channels is greater than zero, the channel synchronization data structure 1710 may allow an acquisition of a given shared memory channel of the plurality of shared memory channels by first computer process 2202.

In one or more embodiments, when the count of shared memory channels of the plurality of shared memory channels is greater than zero, an index value (or memory address) of a shared memory channel that is available for writing may be assigned to first computer process 2202. It shall be recognized that, in one or more embodiments, the index value (or memory address) of the shared memory channel assigned to first computer process 2202 may be the index value of the given shared memory channel that is at the head of the queue of shared memory channels tracked by first free channel index 1702. Accordingly, in such an embodiment, first computer process 2202 may write serialized data block 3104 to the shared memory channel of the plurality of shared memory channels that corresponds to the index value (or memory address).

It shall be recognized that, in one or more embodiments, during the commencement or after first computer process 2202 is commenced, first computer process 2202 may implement command cross-process queue 1602 and data transfer cross-process queue 1712 within shared memory 1600 of computer 1604. The command cross-process queue 1602, in such an embodiment, may be assigned a unique cross-process queue identifier that includes the process identifier of first computer process 2202. The data transfer cross-process queue 1712, in one or more embodiments, may be assigned a unique cross-process queue identifier that includes the process identifier of first computer process 2202. For instance, in a non-limiting example, cross-process queue 1602 and data transfer cross-process queue 1712 may be assigned unique identifiers such as "command_queue_12345" and "data_transfer_queue_12345", respectively, where "12345" represents the process identifier of first computer process 2202. Accordingly, in such an embodiment, when first computer process 2202 writes serialized data block 3104 to data transfer cross-process queue 1712, first computer process 2202 may write serialized data block 3104 to the data transfer cross-process queue having the cross-process queue identifier that includes the process identifier of first computer process 2202 (e.g., data_transfer_queue_12345).

For instance, in a non-limiting example, based on creating serialized parameters data block 3104A, first computer process 2202 may write serialized parameters data block 3104A to data transfer cross-process queue 1712.

In another non-limiting example, based on creating serialized dataset data block 3104B, first computer process 2202 may write serialized dataset data block 3104B to data transfer cross-process queue 1712.

Data Block Reading

In one or more embodiments, method 3000 may include process 3110C. Process 3110C, which may include data block reading, may function to read a subject serialized data block from a respective cross-process queue in response to first computer process 2202 writing the subject serialized data block to the cross-process queue. For instance, in a non-limiting example, process 3110C may monitor data transfer cross-process queue 1712 for serialized data blocks and, upon detecting the availability of a serialized data block, process 3110C may invoke one or more API functions of the second set of API functions 2216 to retrieve the serialized data block from data transfer cross-process queue 1712.

In one or more embodiments, in response to first computer process 2202 writing serialized data block 3104 to data transfer cross-process queue 1712, second computer process 2214 may function to read the serialized data block 3104 from data transfer cross-process queue 1712. Accordingly, in such an embodiment, second computer process 2214 may read the serialized data block 3104 into memory of second computer process 2214. It shall be recognized that, in one or more embodiments, second computer process 2214 may invoke one or more API functions of the second set of API functions 2216 to read serialized data block 3104 into memory of second computer process 2214.

For instance, in a non-limiting example, in response to first computer process 2202 writing serialized parameters data block 3104A to data transfer cross-process queue 1712, second computer process 2214 may read serialized parameters data block 3104A from data transfer cross-process queue 1712. It shall be recognized that, in one or more embodiments, when first computer process 2202 starts second computer process 2214, first computer process 2202 may send the process ID (PID) of first computer process 2202 (e.g., "12345") to second computer process 2214 during the startup sequence. Accordingly, in such a non-limiting example, second computer process 2214 may be configured to monitor data transfer cross-process queue 1712 for serialized data blocks, as data transfer cross-process queue 1712 has the cross-process queue identifier that includes the process ID of first computer process 2202 (e.g., data_transfer_queue_12345).

In one or more embodiments, when second computer process 2214 detects serialized parameters data block 3104A within data transfer cross-process queue 1712, second computer process 2214 may invoke an API function (e.g., the parameters response handler API function) of the second set of API functions 2216 to read serialized parameters data block 3104A into memory of second computer process 2214.

In another non-limiting example, based on first computer process 2202 writing serialized dataset data block 3104B to data transfer cross-process queue 1712, second computer process 2214 may read the serialized dataset data block 3104B from data transfer cross-process queue 1712. As previously mentioned, in one or more embodiments, when first computer process 2202 launches second computer process 2214, first computer process 2202 may send the process ID (PID) of first computer process 2202 (e.g., "12345") to second computer process 2214 as part of the initialization process. Accordingly, in such a non-limiting example, second computer process 2214 may be configured to monitor data transfer cross-process queue 1712 for serialized data blocks, as data transfer cross-process queue 1712 has a cross-process queue identifier that includes the process ID of first computer process 2202 (e.g., data_transfer_queue_12345).

In one or more embodiments, when second computer process 2214 detects serialized dataset data block 3104B within data transfer cross-process queue 1712, second computer process may function to invoke an API function (e.g., the dataset response handler API function) of the second set of API functions 2216 to read serialized dataset data block 3104B into memory of second computer process 2214.

In another non-limiting example, when second computer process 2214 detects serialized dataset data block 3104B in data transfer cross-process queue 1712, second computer process 2214 may read serialized dataset data block 3104B into memory of second computer process 2214. Accordingly, in such a non-limiting example, second computer process 2214 may function to invoke an API function of the second set of API functions 2216 to deserialize the serialized dataset data block 3104B, as described in more detail herein.

Data Block Deserialization

In one or more embodiments, method 3000 may include process 3110D. Process 3110D, which may include deserializing data blocks, may function to deserialize a subject serialized data block into a data format or data structure compatible with a target computer process. A deserialized data block, as generally referred to herein, may be a representation of the subject serialized data block in one or more data structures of the programming language in which the target computer process executes instructions. It shall be recognized that the phrase "deserialized data block" may be interchangeably referred to herein as "deserialized data," a "translated data block," or the like.

At least one technical benefit of deserializing a subject serialized data block into a corresponding deserialized data block may enable a computer process that reads or receives the serialized data block to interpret and utilize the data in a format compatible with the programming language in which the computer process executes instructions, regardless of the programming language in which the original data block was created.

In one or more embodiments, based on second computer process 2214 reading serialized data block 3104 from data transfer cross-process queue 1712, second computer process 2214 may deserialize serialized data block 3104 into deserialized data block 3106. Deserialized data block 3106, in one or more embodiments, may be a translated representation of serialized data block 3104, transformed into one or more data structures of the second programming language (e.g., Python). For instance, in a non-limiting example, process 3110D may deserialize, using the application programming interface, serialized data block 3104 into deserialized data block 3106 based on a deserialization protocol executed by the application programming interface. The deserialization protocol, in one or more embodiments, may include a set of instructions, method, or rules for converting or translating a target serialized data block into a corresponding deserialized data block that is in one or more representations of the second programming language.

For example, as described above, in one or more embodiments, based on first computer process 2202 receiving the request for data of the target data category, data block 3102 may have been created by instantiating the instance of the predefined data model that corresponds to the target data category and populating the instance of the predefined data model with the requested data. The instance of the predefined data model of the target data category, in such an embodiment, may be encoded in the first programming language. Subsequently, in such an embodiment, data block 3102, encoded in the first programming language (e.g., C++), may be serialized into serialized data block 3104 using a serialization protocol and, in turn, serialized data block 3104 may be written to data transfer cross-process queue 1712.

Accordingly, in such an embodiment, second computer process 2214 may read serialized data block 3104 from data transfer cross-process queue 1712 and deserialize serialized data block 3104 into deserialized data block 3106 using the application programming interface. Deserializing serialized data block 3104, in one or more embodiments, may involve translating serialized data block 3104 encoded in the binary-based data format to a corresponding data structure encoded in the second programming language (e.g., Python).

For instance, in a non-limiting example, second computer process 2214, using the application programming interface, may instantiate an instance of the predefined data model that corresponds to the target data category in the second programming language and populate the instance of the predefined data model that corresponds to the target data category in the second programming language with attribute values extracted from serialized data block 3104. In other words, the predefined data model instantiated in the second programming language may be the same or a substantially similar predefined data model as that used by first computer process 2202, but encoded and structured in a manner compatible with the second programming language (e.g., Python).

Stated another way, in one or more embodiments, deserializing serialized data block 3104 into deserialized data block 3106 may include translating serialized data block 3104, encoded in the binary-based data format, to the second programming language (e.g., Python). Translating serialized data block 3104 encoded in the binary-based data format to the second programming language, in such an embodiment, may include constructing an instance of the predefined data model that corresponds to the target data category in the second programming language and attributing a set of attribute values extracted from serialized data block 3104 to the instance of the data model in the second programming language. Each attribute value of the set of attribute values extracted from serialized data block 3104 may be converted to a corresponding representation compatible with the second programming language (e.g., a binary-encoded string value in serialized data block 3104 may be converted to a string object in Python, a binary-encoded integer value in serialized data block 3104 may be converted to an integer object in Python, and similarly, other data types may be mapped to their corresponding representations in the second programming language). Accordingly, in such an embodiment, each converted attribute value may then be attributed to a corresponding component or portion of the instance of the predefined data model that corresponds to the target data category in the second programming language.

For instance, in a non-limiting example, after reading serialized parameters data block 3104A from data transfer cross-process queue 1712, second computer process 2214 may deserialize serialized parameters data block 3104A into deserialized parameters data block 3106A using the parameters response handler API function. In such a non-limiting example, the parameters response handler API function may execute a parameters deserialization protocol that translates serialized parameters data block 3104A into a corresponding data block (e.g., deserialized parameters data block 3106A, deserialized parameters response message 2406) encoded in the second programming language. The parameters deserialization protocol, in one or more embodiments, may include a set of instructions, methods, or rules for converting or translating a serialized parameters data block, such as serialized parameters data block 3104A, into a corresponding deserialized parameters data block (e.g., deserialized parameters data block 3106A) that is in one or more representations of the second programming language.

In such a non-limiting example, the parameters deserialization protocol of the parameters response handler API function may create deserialized parameters data block 3106A by instantiating the predefined data model for parameters in the second programming language, extracting binary-encoded parameter-related attribute values from serialized parameters data block 3104A, converting the extracted parameter-related attribute values into their equivalent representations in the second programming language, and assigning the converted parameter-related attribute values to corresponding parameter-related attributes of the instantiated predefined data model for parameters in the second programming language.

In another non-limiting example, after reading serialized dataset data block 3104B from data transfer cross-process queue 1712, second computer process 2214 may deserialize serialized dataset data block 3104B into deserialized dataset data block 3106B using the dataset response handler API function. In such a non-limiting example, the dataset response handler API function may execute a dataset deserialization protocol that translates serialized dataset data block 3104B into a corresponding data block (e.g., deserialized dataset data block 3106B) encoded in the second programming language. The dataset deserialization protocol, in one or more embodiments, may include a set of instructions, methods, or rules for converting or translating a serialized dataset data block, such as serialized dataset data block 3104B, into a corresponding deserialized dataset data block (e.g., deserialized dataset data block 3106B, deserialized dataset response message 2606) that is in one or more representations of the second programming language.

In such a non-limiting example, the dataset deserialization protocol of the dataset response handler API function may create deserialized dataset data block 3106B by instantiating the predefined data model for datasets in the second programming language, extracting binary-encoded dataset-related attribute values from serialized dataset data block 3104B, converting the extracted dataset-related attribute values into their equivalent representations in the second programming language, and assigning the converted dataset-related attribute values to corresponding dataset-related attributes of the instantiated predefined data model for datasets in the second programming language.

Stated another way, in one or more embodiments, at least a subset of the second set of API functions 2216 may be invoked by second computer process 2214 to read a respective data block from a subject cross-process queue (e.g., data transfer cross-process queue 1712, etc.) and deserialize the respective data block.

Figure 33:
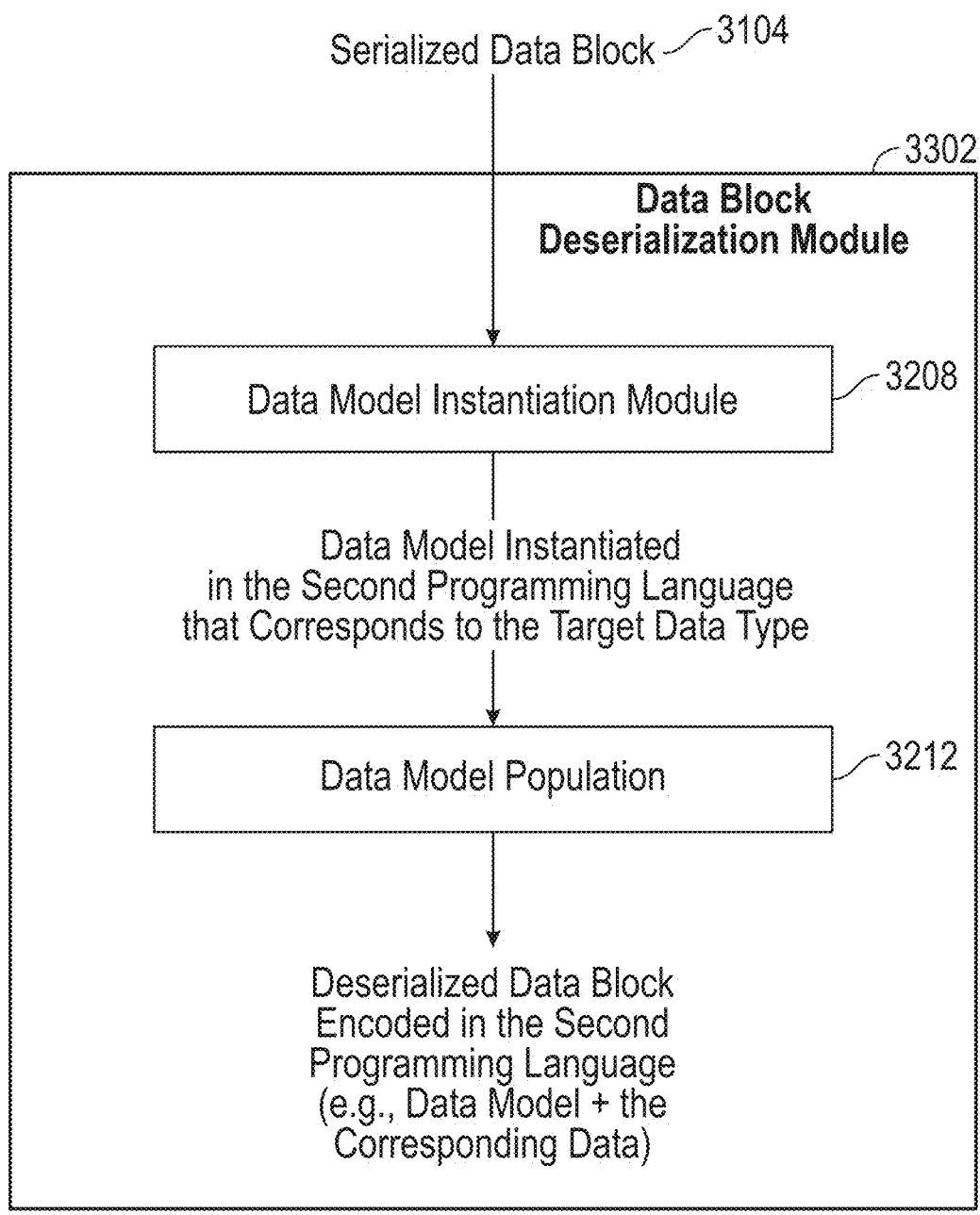
FIG. 33 illustrates an example schematic of deserializing a respective data block, according to some embodiments of the present technology.

Turning to FIG. 33, in one or more embodiments, deserializing a serialized data block (e.g., serialized data block 3104, serialized parameters data block 3104A, serialized dataset data block 3104B, etc.) into a deserialized data block (e.g., deserialized data block 3106, deserialized parameters data block 3106A, deserialized dataset data block 3106B, etc.) may involve multiple operations performed by second computer process 2214. In one or more embodiments, after second computer process 2214 reads the serialized data block into memory, second computer process 2214 may use data block deserialization module 3302 to perform a deserialization process. Accordingly, in one or more embodiments, the deserialization process may include instantiating a data model in the second programming language that corresponds to the target data type associated with the serialized data block using the data model instantiation module 3208. The instantiated data model, in such an embodiment, may then be populated with attributes values extracted from the serialized data block using the data model population module 3212, resulting in the deserialized data block.

Algorithm Execution

In one or more embodiments, method 3000 may include process 3120. Process 3120, which may include executing an algorithm, may function to execute, by second computer process 2214, algorithm 2218 based on providing deserialized data to algorithm 2218. In one or more embodiments, based on providing the deserialized data to algorithm 2218, algorithm 2218 may process the deserialized data to perform a computational task and, in turn, compute a computational result.

In one or more embodiments, in response to second computer process 2214 deserializing serialized data block 3104 into deserialized data block 3106, second computer process 2214 may execute algorithm 2218 based on providing at least a portion of deserialized data block 3106 to algorithm 2218 for data processing.

In another non-limiting example, second computer process 2214 may execute algorithm 2218 by providing one or more deserialized parameters included in deserialized parameters data block 3106A and one or more deserialized datasets included in deserialized dataset data block 3106B to algorithm 2218. The deserialized parameters may include algorithm configurations, operational thresholds, or processing instructions that control how algorithm 2218 operates. The deserialized dataset, in one or more embodiments, may serve as data input for algorithm 2218 and may include structured data such as tabular records, time-series data, or any other suitable type of data. Accordingly, in such a non-limiting example, algorithm 2218 may apply the specified configurations and thresholds from the deserialized parameters to control or guide a processing of the one or more deserialized datasets to produce one or more computational artifacts.

It shall be recognized that, in one or more embodiments, the system or service implementing method 3000 may transfer, using the application programming interface, a plurality of data blocks (e.g., second plurality of data blocks) from second computer process 2214 to first computer process 2202. For instance, in a non-limiting example, transferring a respective data block may include serializing, using the application programming interface, the respective data block into a programming language-agnostic format using a serialization protocol executed by the application programming interface. In such a non-limiting example, second computer process 2214 may write the serialized data block to command cross-process queue 1602 in response to serializing the respective data block. It shall be noted that, in one or more embodiments, second computer process 2214 may serialize the respective data block into the programming language-agnostic format by invoking an API function of the second set of API functions 2216 that executes the serialization protocol.

Accordingly, in one or more embodiments, first computer process 2202 may read the serialized data block from command cross-process queue 1602. In such an embodiment, first computer process 2202 may use the application programming interface (e.g., invoke an API function of the first set of API functions 2212) to deserialize the serialized data block retrieved from command cross-process queue 1602 into a data format or representation compatible with the first programming language (e.g., C++).

Figure 34:
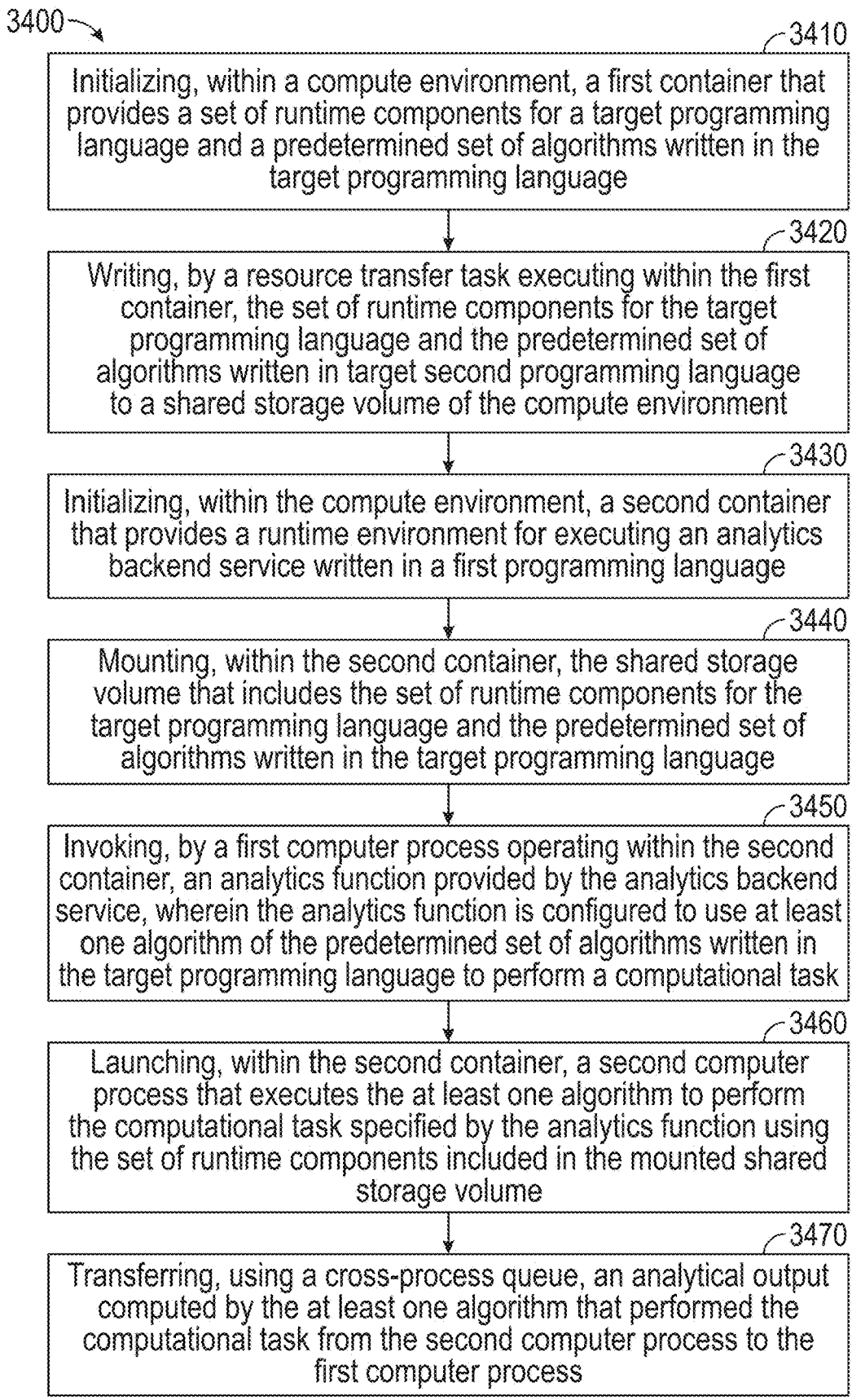
FIG. 34 illustrates a flow chart showing an example process of initializing a plurality of containers to execute a computational task, according to some embodiments of the present technology.

FIG. 34 illustrates one embodiment of a method 3400 for executing analytical functions in a compute environment using containers. It shall be appreciated that other embodiments contemplated within the scope of the present disclosure may involve more operations, fewer operations, different operations, or a different order of operations than as shown in FIG. 34.

Initializing a First Container

In one or more embodiments, method 3400 may include process 3410. Process 3410, which may include initializing a first container within a compute environment, may function to initialize a first container that may provide a set of runtime components for a target programming language and a predetermined set of algorithms written in the target programming language to a shared storage volume of the compute environment. It shall be recognized that the phrase "first container" may be interchangeably referred to herein as "container "A"," an "initialization container," an "init container," or the like.

In one or more embodiments, a system or service implementing method 3400 may use a container orchestration service (e.g., Kubernetes® or the like) to deploy pod 3504 within compute environment 3502. A pod (e.g., Kubernetes® pod or the like), as generally referred to herein, may include one or more containers that may share the same network namespace, networking resources, storage volume, and runtime dependencies. It shall be noted that, in one or more embodiments, each container within a subject pod may operate as an isolated runtime unit, capable of running specific computer processes, applications, services, or tasks.

Figure 35:
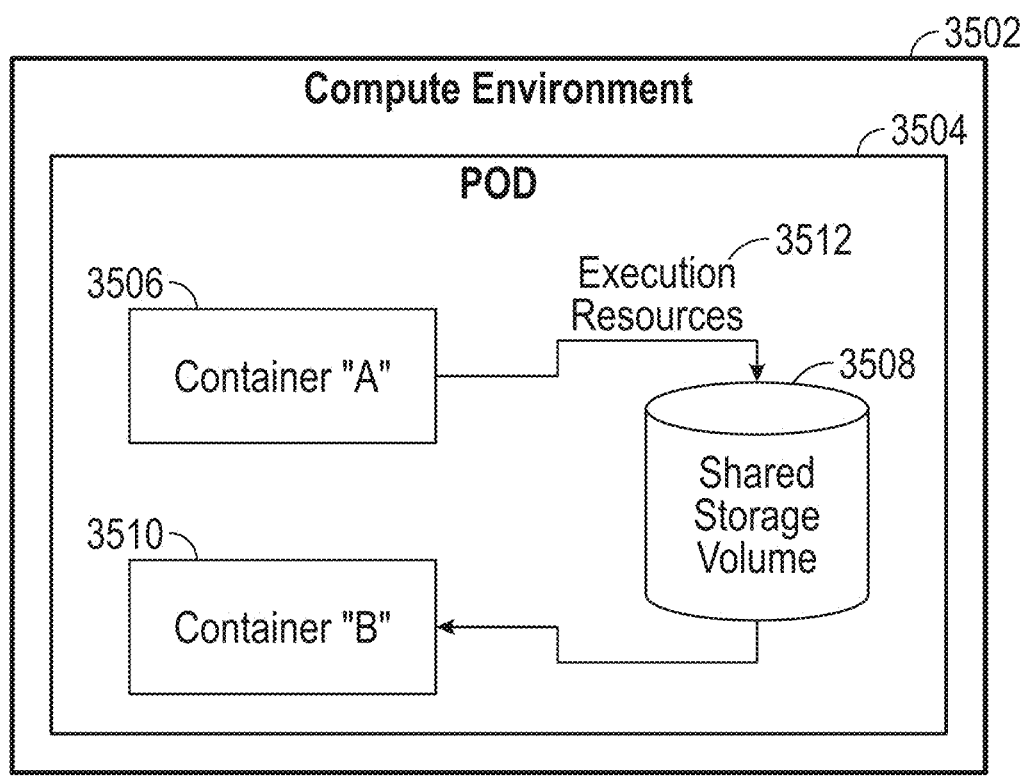
FIG. 35 illustrates an example schematic of providing execution resources to a target container, according to some embodiments of the present technology.

Turning to FIG. 35, in one or more embodiments, pod 3504 may be deployed within compute environment 3502 based on executing a pod configuration file. A pod configuration file, as generally referred to herein, may specify a set of deployment specifications or deployment parameters for deploying a respective pod, including, but not limited to, compute resource allocations (e.g., amount of CPU, amount of memory, etc.), a set of container images, one or more shared storage volumes to be mounted, and network configurations required for the respective pod to function within compute environment 3502. The pod configuration file, in one or more embodiments, may further include a container initialization sequence that may specify an order in which the set of containers are initialized, created, or deployed within the respective pod.

For instance, in a non-limiting example, the pod configuration file may include an instruction to initialize container "A" 3506 based on a first container image. A container image, as generally referred to herein, may be a predefined file that may be used to create an instance of a target container within compute environment 3502. The first container image, in one or more embodiments, may include a predetermined set of algorithms written in a target programming language and a set of runtime components for the target programming language.

The predetermined set of algorithms, in one or more embodiments, may include a plurality of algorithms that are encoded for use by the plurality of analytical functions provided by analytics service 1530. That is, in such an embodiment, the predetermined set of algorithms may include each distinct algorithm (e.g., analytical application or the like) configured to be executed or used by each analytical function of the plurality of analytical functions provided by analytics service 1530. For instance, in a non-limiting example, analytics service 1530 may provide a first analytical function that is encoded or configured to use a first algorithm written in the target programming language to perform a first computational task, a second analytical function that is encoded or configured to use a second algorithm written in the target programming language to perform a second computational task, a third analytical function that is encoded or configured to use a third algorithm written in the target programming language to perform a third computational task. Accordingly, in such a non-limiting example, the first container image may include the first algorithm associated with the first analytical function, the second algorithm associated with the second analytical function, and the third algorithm associated with the third analytical function. It shall be noted that, in one or more embodiments, the first container image may include more algorithms, fewer algorithms, or a different set of algorithms without departing from the scope of the disclosure.

The set of runtime components for the target programming language, in one or more embodiments, may be operably configured to provide the runtime environment required for executing code (e.g., computer instructions) written in the target programming language. The set of runtime components, in one or more embodiments, may include a code interpreter (e.g., Python interpreter) that may read and execute code written in the target programming language, one or more software libraries (e.g., PyTorch, NumPy, Pandas, etc.) implemented by the plurality of algorithms to perform their respective computational tasks, and any other suitable software packages (e.g., python packages), executables (e.g. python executables), or the like that may be needed to support the execution of the plurality of algorithms of the predetermined set of algorithms. For instance, with continued reference to the above non-limiting example, the target programming language may be Python, and the first container image may further include a Python interpreter, a repository of software libraries (e.g., open-source software libraries, third-party software libraries, etc.) written in Python that may be used by one or more algorithms of the plurality of algorithms to perform at least a portion of their respective computational task.

In one or more embodiments, in response to deploying pod 3504 within compute environment 3502, pod 3504 may be started (e.g., commenced). Pod 3504, in such an embodiment, may initialize container "A" 3506 by starting or creating a container that corresponds to the first container image, as defined in the pod configuration file. Container "A" 3506, in one or more embodiments, upon initialization may provide the set of runtime components for the target programming language and the predetermined set of algorithms written in the target programming language. Accordingly, in one or more embodiments, in response to initializing container "A" 3506, the predetermined set of algorithms and the set of runtime components included in the first container image or Container "A" 3506 may be written, copied, or loaded into shared storage volume 3508, as described in more detail herein. At least one technical benefit of writing, copying, or loading the predetermined set of algorithms and the set of runtime components (e.g., execution resources 3512) to shared storage volume 3508 may enable other containers or computer processes within compute environment 3502 to access and use the runtime components and algorithms required for executing analytical functions, as needed.

It shall be recognized that, in one or more embodiments, the first container image may be periodically scanned for security vulnerabilities to identify if any security threats exist within the software components, open-source libraries, third-party libraries, or algorithms included in the first container image. In such an embodiment, periodically scanning the first container image for security vulnerabilities may include assessing a security risk of one or more open-source libraries included in the first container image. Additionally, or alternatively, in one or more embodiments, periodically scanning the first container image for security vulnerabilities may include assessing a security threat of each algorithm of the plurality of predetermined set of algorithms included in the first container image.

It shall be further recognized that, in one or more embodiments, the first container image may be configured with a set of container permissions that restricts an end user from modifying the first container image.

Writing Execution Resources to Shared Storage Volume

In one or more embodiments, method 3400 may include process 3420. Process 3420, which may include writing execution resources to shared storage volume 3508, may function to write the execution resources 3512 provided by container "A" 3506 to shared storage volume 3508. A shared storage volume, as generally referred to herein, may be a storage resource (backed by a physical or virtual storage device) that provides an allocated space for storing data and can be mounted into one or more containers within a pod. It shall be recognized that the phrase "shared storage volume" may be interchangeably referred to herein as a "data storage unit," a "mountable storage resource," or the like.

In one or more embodiments, during or after the initialization of the first container, a resource transfer task executing within the first container may write execution resources 3512 provided by the first container to shared storage volume 3508. For instance, in a non-limiting example, during or after the initialization of container "A" 3506, a resource transfer task executing within container "A" 3506 may write the predetermined set of algorithms written in the target programming language and the set of runtime components for the target programming language to shared storage volume 3508. Stated another way, in such a non-limiting example, the resource transfer task executing within container "A" 3506 may function to copy or load the predetermined set of algorithms written in the target programming language and the set of runtime components for the target programming language to shared storage volume 3508. It shall be recognized that, in one or more embodiments, writing or copying, via the resource transfer task, the set of runtime components for the target programming language to shared storage volume 3508 may include writing or copying the plurality of software libraries (e.g., open-source software libraries, third-party software libraries, etc.) that are used by the predetermined set of algorithms to shared storage volume 3508, as well as writing or copying a code interpreter for the target programming language to the same shared storage volume.

In one or more embodiments, after the resource transfer task is completed, the execution resources 3512, such as the predetermined set of algorithms written in the target programming language and the set of runtime components for the target programming language, may be stored within shared storage volume 3508. The execution resources 3512 may be accessed by other containers or computer processes within pod 3504 or compute environment 3502 by mounting shared storage volume 3508 to their respective filesystems, as described in more detail herein.

It shall be further recognized, that in one or more embodiments, container "A" 3506 may be in an active state while the resource transfer task is writing, copying, or loading the predetermined set of algorithms written in the target programming language and the set of runtime components for the target programming language to the shared storage volume 3508 of compute environment 3502. It shall be further recognized that, in one or more embodiments, in response to the resource transfer task completing the writing, copying, or loading the predetermined set of algorithms and the set of runtime components to the shared storage volume 3508 of compute environment 3502, container "A" 3506 may be transitioned from the active state to an inactive state (e.g., completed state), which may include terminating container "A" 3506. Accordingly, in such an embodiment, in response to transitioning container "A" 3506 to the inactive state, the compute resources previously allocated to container "A" 3506 (e.g., CPU, memory, etc.) may be deallocated and made available for other containers or computer processes within compute environment 3502.

Initializing a Second Container

In one or more embodiments, method 3400 may include process 3430. Process 3430, which may include initializing a second container, may function to initialize a second container that may provide a runtime environment for executing an analytics backend service written in a first programming language. It shall be recognized that the phrase "second container" may be interchangeably referred to herein as "container "B"," an "analytics container," or the like.

In one or more embodiments, based on starting or deploying pod 3504 in compute environment 3502, pod 3504 may function to initialize and run container "B" 3510 after container "A" 3506 completes the resource transfer task. Stated another way, in one or more embodiments, the system or service implementing method 3400 may use the container orchestration service (e.g., Kubernetes® or the like) to initialize and run container "B" 3510 within compute environment 3502.

For instance, with reference to the above non-limiting example, the pod configuration file that corresponds to pod 3504 may include an instruction to initialize container "B" 3510 based on a second container image different from the first container image. The second container image, in one or more embodiments, may include a set of runtime components for executing the analytics backend service in the first programming language (e.g., C++). The set of runtime components in the second container image may include the code for the analytics backend service written in the first programming language (e.g., C++), along with one or more software libraries written in the first programming language, configuration files, executables, and other resources that may be needed to support the execution of the analytics backend service written in the first programming language.

Accordingly, in one or more embodiments, pod 3504 may initialize container "B" 3510 by starting or creating a container that corresponds to the second container image. Container "B" 3510, in one or more embodiments, upon initialization may provide a runtime environment for the analytics backend service. It shall be recognized that, in one or more embodiments, initializing container "B" 3510 (e.g., second container or the like) within compute environment 3502 may include loading one or more software libraries written in the first programming language (e.g., C++) that are required by the analytics backend service, loading algorithmic code associated with the analytics backend service written in the first programming language, and configuring (e.g., creating or the like) the runtime environment to execute tasks or operations associated with the analytics backend service.

At least one technical benefit of initializing container "B" 3510 to execute the analytics backend service may provide a dedicated runtime environment for optimally handling and executing analytical requests within the system or service implementing method 3400.

It shall be recognized that, in one or more embodiments, container "A" 3506 and container "B" 3510 may be different containers within compute environment 3502. That is, in such an embodiment, container "B" 3510 may operate independently of container "A" 3506. At least one technical benefit of container "A" 3506 and container "B" 3510 operating independently of each other may enable a more secure computing environment. For instance, in a non-limiting example, if a security threat or vulnerability is detected in container "A" 3506, the security threat or vulnerability may be localized to container "A" 3506 based on container "A" 3506 operating independently of container "B" 3510. In other words, the security threat or vulnerability does not compromise container "B" 3510 as container "B" 3510 operates independently of container "A" 3506. Such segregation between the operations of container "A" 3506 and container "B" 3510 may minimize the risk of cross-container contamination, ensuring that container "B" 3510 can securely execute the analytics backend service and process analytical requests without interruption or degradation in performance, even in the event of a security threat affecting container "A" 3506.

Shared Storage Volume Mounting

In one or more embodiments, method 3400 may include process 3440. Process 3440, which may include mounting shared storage volume 3508, may function to mount shared storage volume 3508 within the second container. Mounting a subject storage volume within a subject container, as generally referred to herein, may refer to a process of incorporating the subject storage volume into a file system of the subject container. At least one technical benefit of mounting the subject shared storage volume within the subject container may enable the resources stored within the subject shared storage volume to be accessible and used by the subject container.

In one or more embodiments, process 3440 may function to mount, within container "B" 3510, the shared storage volume 3508 that includes the set of runtime components for the target programming language and the predetermined set of algorithms written in the target programming language. For instance, in a non-limiting example, shared storage volume 3508 may be mounted to a directory path within a file system of container "B" 3510. Stated another way, in one or more embodiments, the shared storage volume 3508 may be mounted into the file system of container "B" 3510 in a manner that allows container "B" 3510 to access and use the set of runtime components for the target programming language and the predetermined set of algorithms written in the target programming language.

Accordingly, in response to mounting shared storage volume 3508 within container "B" 3510, container "B" 3510 may access one or more resources or items stored within the mounted shared storage volume to perform various computational tasks, such as executing analytical operations and analytical functions as described in more detail in method 1400, method 2100, and method 3000. It shall be recognized that mounting, as generally referred to herein, may refer to the process of making a storage resource, such as a storage volume or the like, available for access within a container's filesystem by associating or mapping the storage resource to a specified directory path.

Invoking an Analytics Function

In one or more embodiments, method 3400 may include process 3450. Process 3450, which may include invoking an analytics function, may function to invoke an analytics function provided by the analytics backend service. It shall be recognized that the phrase "analytics function" may be interchangeably referred to herein as an "analytical function" or the like.

In one or more embodiments, analytics service 1530 or analytics backend service may provide a plurality of analytics functions (e.g., plurality of predefined analytical functions, etc.) that are executable by the analytics service 1530. In such an embodiment, each analytics function or at least a subset of the plurality of analytics functions may be encoded or configured to use at least one algorithm written in a programming language, different from the programming language in which the analytics backend service or analytics service 1530 operates (e.g., the analytics backend service or analytics service 1530 operates in C++, while one or more of the analytics functions utilize algorithms written in Python to perform their respective computational tasks). This enables the system or service implementing method 3400 to leverage the strengths of multiple programming languages, using a first programming language (e.g., C++) to handle data-intensive backend processing tasks with high performance and efficiency, while utilizing Python's extensive analytical software libraries (e.g., open-source libraries, third-party libraries, etc.) for specialized operations and computational tasks. For instance, in a non-limiting example, a first analytics function of the plurality of analytics functions may be configured to use a first algorithm written in Python to perform a first computational task. In another non-limiting example, a second analytics function of the plurality of analytics functions may be configured to use a second algorithm written in Python to perform a second computational task. In another non-limiting example, a third analytics function of the plurality of analytics functions may be configured to use a third algorithm written in Python to perform a third computational task.

Figure 36:
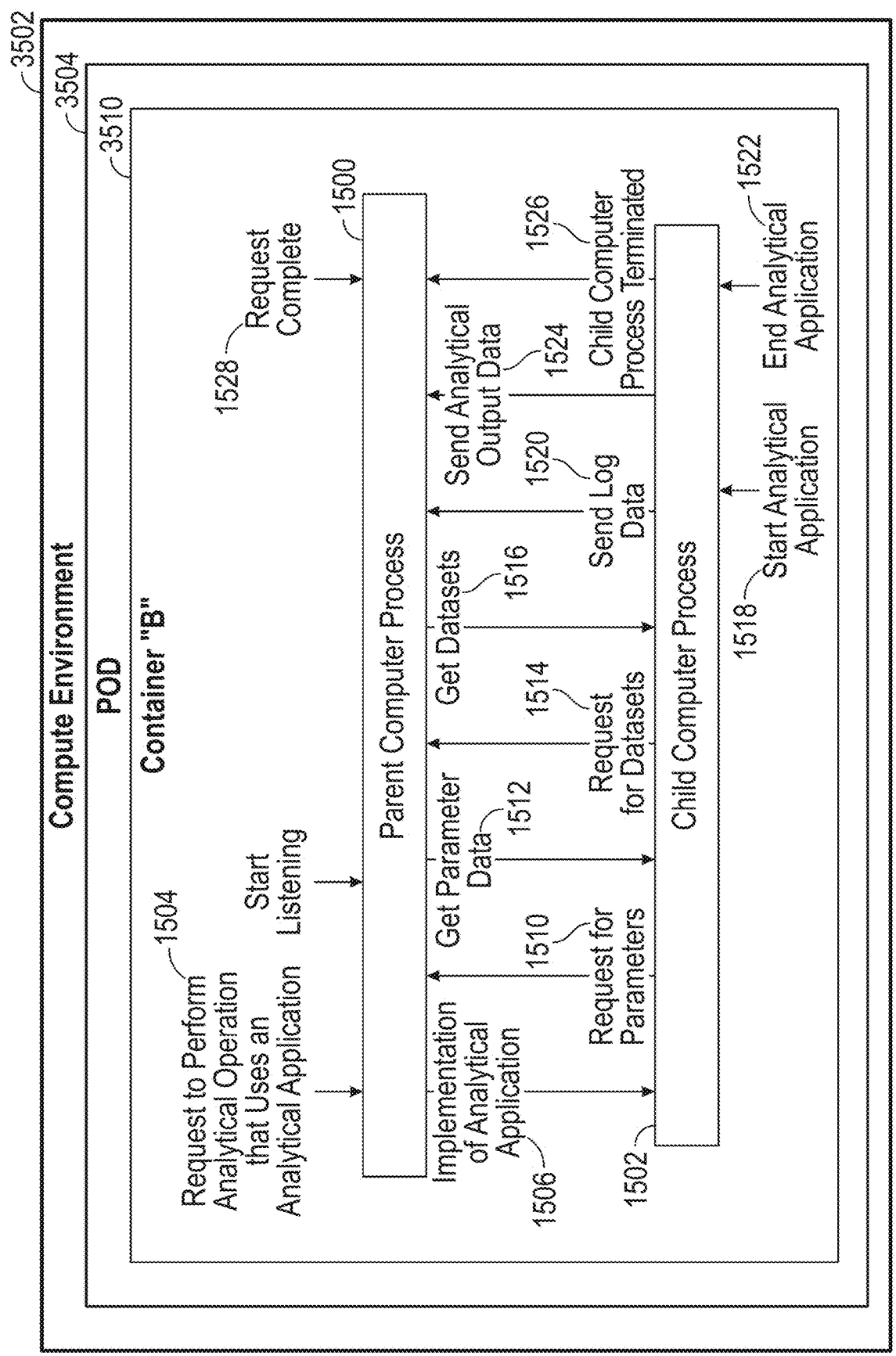
FIG. 36 illustrates an example schematic of multiple computer processes that execute instructions written in different programming languages operating within a single container, according to some embodiments of the present technology.

Turning to FIG. 36, in one or more embodiments, parent computer process 1500 (e.g., first computer process 2202 or the like) may be commenced within container "B" 3510 based on receiving a request to perform a target computational task using an analytics function provided by analytics service 1530. The analytics function, in such an embodiment, may be encoded or configured to use algorithm 2218 or any other suitable algorithm written in a target programming language (e.g., Python) to perform the target computational task. It shall be recognized that, in such an embodiment, parent computer process 1500 may execute instructions in a programming language (e.g., C++) different than the target programming language of the algorithm (e.g., Python).

Accordingly, in such an embodiment, parent computer process 1500 cannot directly execute or run algorithm 2218 because algorithm 2218 is encoded in a programming language (e.g., Python) that requires execution through a different runtime environment than that of parent computer process 1500.

Launching an Auxiliary Computer Process

In one or more embodiments, method 3400 may include process 3460. Process 3460, which may include launching an auxiliary computer process, may function to launch an auxiliary computer process within container "B" 3510 to execute algorithm 2218 to perform the requested computational task. The auxiliary computer process, in such an embodiment, may operate alongside parent computer process 1500 within container "B" 3510.

In one or more embodiments, container "B" 3510 may be configured to run computer processes that execute code or instructions written in different programming languages by including the runtime environments, interpreters, and software libraries necessary for each distinct programming language. For instance, in a non-limiting example, a single container (e.g., container "B" 3510) may be configured to execute parent computer process 1500 that executes instructions in the first programming language (e.g., C++) while concurrently executing the auxiliary computer process that executes instructions in the target programming language (e.g., Python). It shall be recognized that, in one or more embodiments, to enable such operation, container "B" 3510 may include a distinct runtime environment for each programming language (e.g., a Python runtime environment with a Python interpreter and associated Python libraries, and a C++ runtime environment with a C++ compiler and associated C++ libraries).

In one or more embodiments, based on or in response to parent computer process 1500 invoking the analytics function associated with the request to perform the target computational task, parent computer process 1500 may launch child computer process 1502 (e.g., second computer process 2214), which is operably configured to execute algorithm 2218. That is, in such an embodiment, child computer process 1502 may provide the execution context for running algorithm 2218 within the runtime environment configured for the target programming language (e.g., Python).

For instance, in a non-limiting example, based on or in response to launching child computer process 1502, child computer process 1502 may function to access the set of runtime components for the target programming language from the shared storage volume 3508 mounted within container "B" 3510 and, in turn, initialize the runtime environment for the target programming language within memory allocated to child computer process 1502. In such a non-limiting example, after initializing the runtime environment for the target programming language, child computer process 1502 may function to access algorithm 2218 from the shared storage volume 3508 mounted within container "B" 3510 and, in turn, load algorithm 2218 into the initialized runtime environment for execution. Accordingly, in such a non-limiting example, once algorithm 2218 is loaded into the initialized runtime environment, child computer process 1502 may execute algorithm 2218 to perform the requested computational task.

It shall be recognized that, in one or more embodiments, initializing the runtime environment for the target programming language may include loading the code interpreter for the target programming language (e.g., Python interpreter) into the memory allocated to child computer process 1502, along with any required software libraries, software dependencies, or configurations required by the algorithm 2218 for execution.

In another non-limiting example, based on or in response to launching child computer process 1502, child computer process 1502 may function to access the code interpreter (e.g., Python interpreter) from the set of runtime components stored within the shared storage volume 3508 mounted within container "B" 3510 and, in turn, child computer process 1502 may initialize the code interpreter (e.g., Python interpreter) within memory of child computer process 1502. Accordingly, in such a non-limiting example, child computer process 1502 may function to access or retrieve algorithm 2218 from the shared storage volume 3508 mounted within container "B" 3510 and execute algorithm 2218 using the code interpreter (e.g., Python interpreter).

In another non-limiting example, based on or in response to launching child computer process 1502, child computer process 1502 may function to access the code interpreter for the target programming language (e.g., Python interpreter) and algorithm 2218 written in the target programming language from the shared storage volume 3508 mounted within container "B" 3510. In one or more embodiments, upon accessing the code interpreter and algorithm 2218, the code interpreter and algorithm 2218 may be initialized within memory of child computer process 1502. Accordingly, in such an embodiment, the code interpreter, once initialized, may enable child computer process 1502 to execute algorithm 2218 to perform the requested computational task. In other words, the code interpreter, once initialized, may enable child computer process 1502 to read and execute the instructions of algorithm 2218 in the target programming language.

It shall be recognized that, in one or more embodiments, before executing algorithm 2218, child computer process 1502 may request one or more pieces of data, such as parameters and datasets, from parent computer process 1500 and receive the one or more pieces of data to provide as input to algorithm 2218 in analogous ways described above.

It shall be further recognized that, in one or more embodiments, container "A" 3506 may be initialized within compute environment 3502 before child computer process 1502 is commenced and invokes the analytics function.

It shall be further recognized that, in one or more embodiments, command cross-process queue 1602 and data transfer cross-process queue 1712 may be implemented, configured or located within shared memory of container "B" 3510. Stated another way, in some embodiments, command cross-process queue 1602 and data transfer cross-process queue 1712 may reside in the memory (e.g., memory space) allocated to container "B" 3510.

Transferring Analytical Output

In one or more embodiments, method 3400 may include process 3470. Process 3470, which may include transferring an analytical output, may function to transfer, using a cross-process queue, an analytical output computed by algorithm 2218 that performed the requested computational task from child computer process 1502 to parent computer process 1500. It shall be recognized that process 3470 may function to transfer the analytical output computed by algorithm 2218 in analogous ways described above.

For instance, in a non-limiting example, the analytical output computed by algorithm 2218 may be serialized into a binary data format and written to the cross-process queue (e.g., command cross-process queue 1602, data transfer cross-process queue 1712) by child computer process 1502. In such a non-limiting example, parent computer process 1500 may function to read the serialized analytical output from the cross-process queue and deserialize the serialized analytical output into one or more representations of the first programming language. Accordingly, in such a non-limiting example, parent computer process 1500 may function to write the deserialized analytical output to a computer database of the analytics backend service.

Stated another way, in one or more embodiments, process 3470 may function to transfer the analytical output computed by algorithm 2218 from second computer process 2214 to first computer process 2202. In such an embodiment, in response to the first computer process 2202 obtaining the analytical output, first computer process 2202 may function to write the analytical output to a computer database of the analytics backend service. It shall be recognized that, in such an embodiment, second computer process 2214 may not have permissions to write the analytical output to the computer database and first computer process 2202 may have the permissions to write the analytical output to the computer database.

In one or more embodiments, transferring the analytical output computed by algorithm 2218 from second computer process 2214 to first computer process 2202 may include using a cross-process queue (e.g., command cross-process queue 1602, data transfer cross-process queue 1712, etc.) that is located within and/or configured using memory, shared memory, or the like allocated or assigned to container "B" 3510. In other words, the analytical output may be transferred using the cross-process queue configured within container "B" 3510. It shall be recognized that the cross-process queue configured within container "B" 3510 may not be accessible by container "A" 3506.

Additionally, or alternatively, in one or more embodiments, transferring the analytical output computed by the at least one algorithm that performed the computational task may include using shared memory of a computer that is executing the second computer process and the first computer process.

Figure 37:
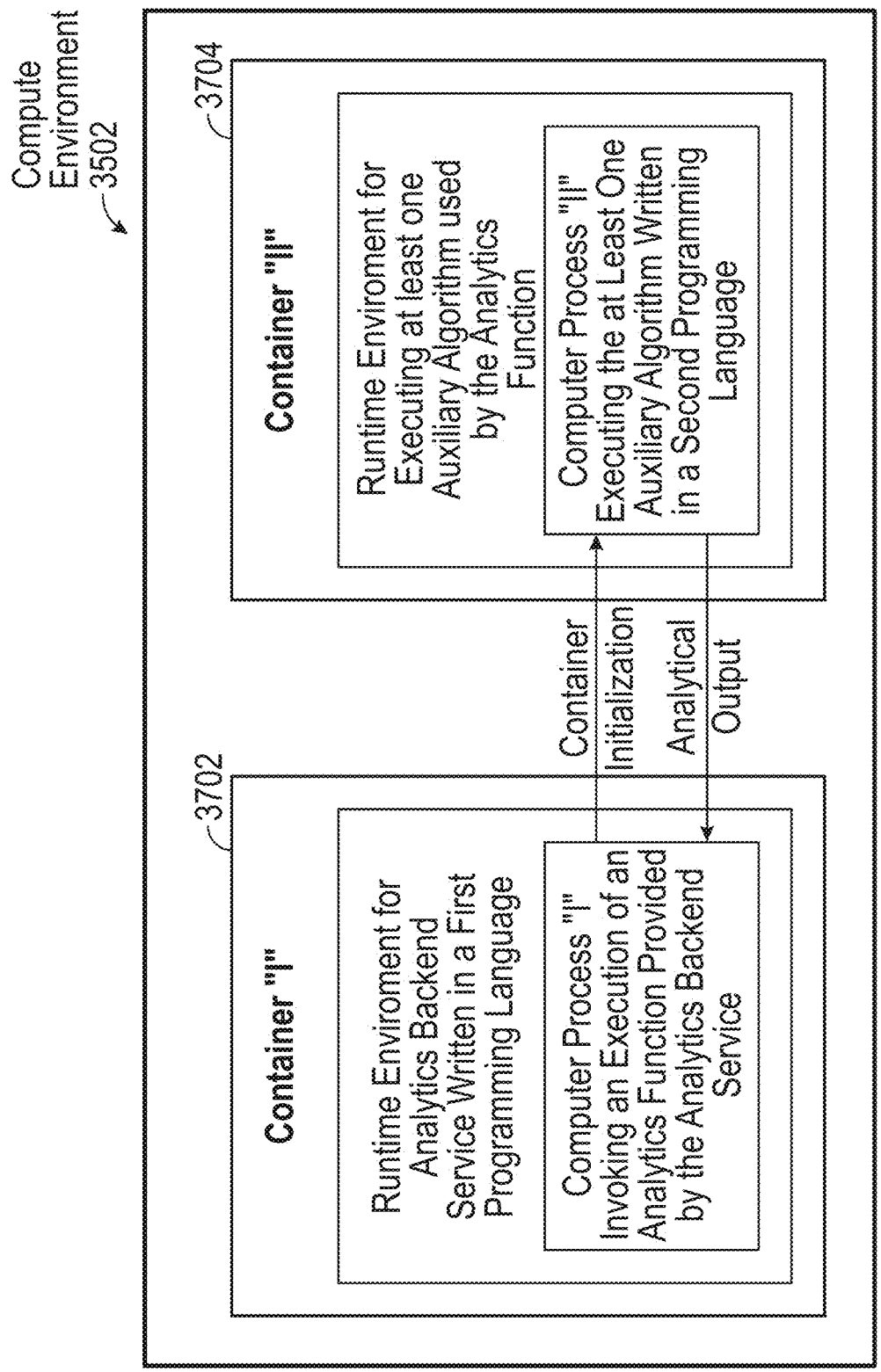
FIG. 37 illustrates an example schematic of initializing a plurality of containers to execute a computational task, according to some embodiments of the present technology.

Turning to FIG. 37, in one or more embodiments, container "I" 3702 may be initialized within compute environment 3502. Container "I" 3702, in one or more embodiments, may provide a first runtime environment for executing computer instructions of the analytics backend service written in a first programming language (e.g., C++). Accordingly, in such an embodiment, computer process "I" (e.g., first computer process 2202, parent computer process 1500, etc.) may function to invoke an analytics function provided by the analytics backend service that is configured to use at least one algorithm written in a second programming language (e.g., Python) to perform a computational task. Stated another way, in one or more embodiments, a system or service implementing method 3400 may function to invoke, by computer process "I" operating with container "I" 3702, the analytics function that is configured to use the at least one algorithm written in the second programming language.

Accordingly, in one or more embodiments, in response to computer process "I" invoking the analytics function, the system or service implementing method 3400 may function to initialize container "II" 3704 that may provide a second runtime environment for executing the at least one algorithm used by the analytics function (e.g., analytical function or the like). In one or more embodiments, a system or service implementing method 3400 may function to commence computer process "II" within container "II" 3704. Computer process "II", in one or more embodiments, may execute the at least one algorithm to perform the computational task specified by the analytics function. Furthermore, in such an embodiment, an analytical output may be computed by the at least algorithm (e.g., auxiliary algorithm or the like) in response to executing the at least one algorithm.

In one or more embodiments, in response to the at least algorithm computing the analytical output, the analytical output may be transferred from computer process "II" to computer process "I" using a cross-process queue (e.g., command cross-process queue 1602, data transfer cross-process queue 1712, etc.). Additionally, or alternatively, in one or more embodiments, transferring the analytical output computed by the at least algorithm 2218 from computer process "II" to computer process "I" may include using a socket that may provide a communication channel between computer process "II" and computer process "I". In other words, the socket provides a bidirectional communication for exchanging data between computer process "II" and computer process "I".

It shall be recognized that, in one or more embodiments, container "I" 3702 is a different container than container "II" 3704.

Figure 38:
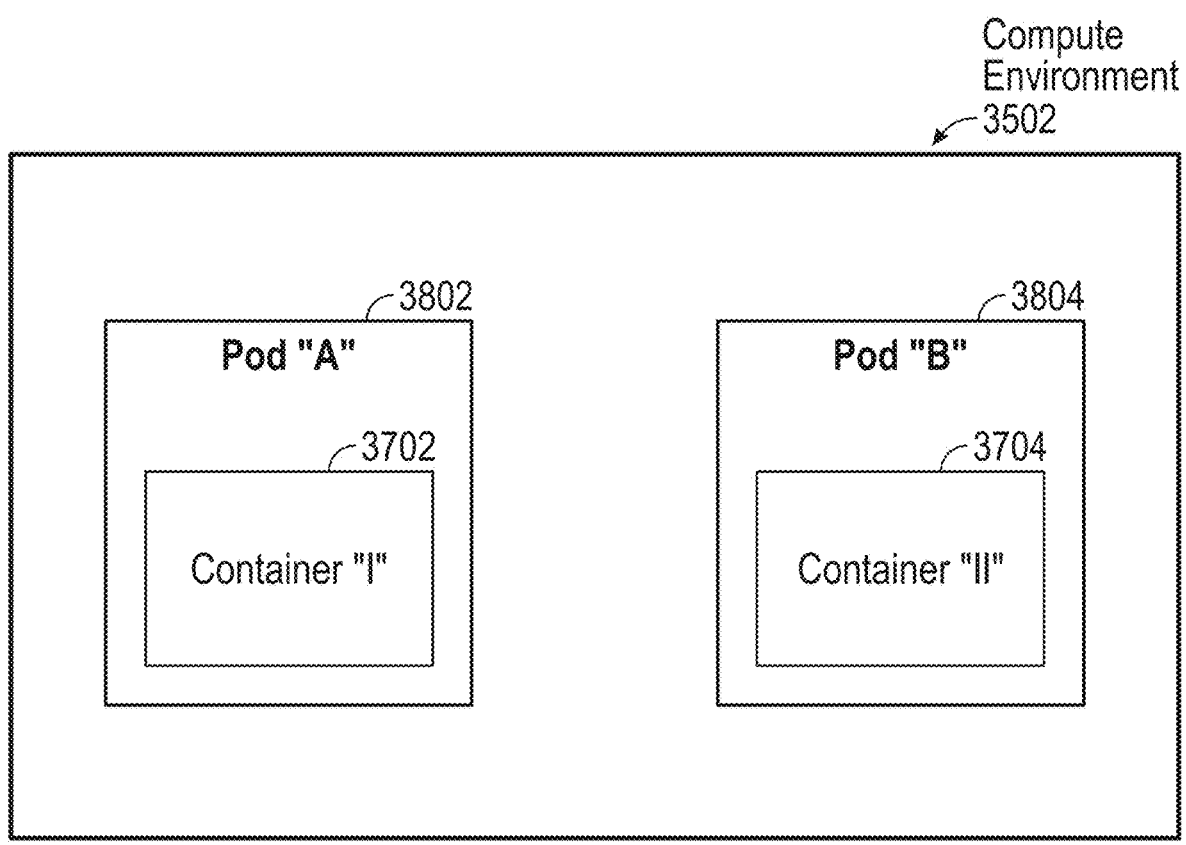
FIG. 38 illustrates an example schematic of initializing a plurality of containers using a plurality of pods, according to some embodiments of the present technology.

Turning to FIG. 38, in one or more embodiments, the system or service implementing method 3400 may function to deploy one or more pods within compute environment 3502 based on one or more pod configuration files, respectively. In such an embodiment, the one or more pod configuration files may include a container image of the analytics backend service and a container image of an auxiliary compute service that includes the at least one algorithm written in the second programming language. Accordingly, in such an embodiment, in response to deploying the one or more pods within compute environment 3502, the one or more pods may function to initialize container "I" 3702 based on the container image of the analytics backend service and initialize container "II" 3704 based on the container image of the auxiliary compute service. For instance, in a non-limiting example, a system or service implementing method 3400 may function to deploy pod "A" 3802 that initializes container "I" 3702, and deploy pod "B" 3804 that initializes container "II" 3704. It shall be recognized that, in such an embodiment, container "II" 3704 may be initialized after container "I" 3702.

It shall be recognized that, in such an embodiment, pod "A" 3802 and pod "B" 3804 may use a socket for transferring data between pod "A" 3802 and "B" 3804. A socket, as generally referred to herein, may be an application programming interface (API) that may provide a bidirectional communication endpoint for inter-process or network communication, allowing for data transfers between at least two devices or processes using a specific transport protocol, such as a Transmission Control Protocol (TCP) or a User Datagram Protocol (UDP).

It shall also be further noted that the system and methods of the embodiment and variations described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as that are offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments. For example, aspects/operations of methods 1400, 2100, 3000, and 3400 may be interchanged, substituted, and/or added between these methods.

What is claimed is:

1. A computer-program product comprising a non-transitory machine-readable storage medium storing computer instructions that, when executed by one or more processors, perform operations comprising:
   receiving, by a first computer process operating in a first programming language, a request to perform an analytical function of a plurality of predefined analytical functions executable by an analytics service, wherein:
      the analytical function includes a set of instructions for implementing an algorithm that is (i) configured to perform the analytical function and (ii) written in a second programming language, and
      the first computer process provides a first set of application programming interface (API) functions for responding to data requests;
   launching, by the first computer process, a second computer process operating in the second programming language that implements the algorithm in response to the first computer process commencing an execution of the analytical function, wherein:
      the second computer process provides a second set of application programming interface (API) functions for creating and transmitting the data requests;
   in response to pairing the second computer process with the first computer process:
      invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process;
      writing, to a command cross-process queue, one or more requests for the one or more analytical function parameters and the one or more datasets in response to invoking, by the second computer process, the one or more API functions of the second set of API functions;
      writing, to a data transfer cross-process queue different from the command cross-process queue, one or more response messages that includes the one or more analytical function parameters and the one or more datasets in response to invoking, by the first computer process, the one or more API functions of the first set of API functions; and
      obtaining, by the second computer process, the one or more analytical function parameters and the one or more datasets specified within the request to perform the analytical function in response to reading the one or more response messages from the data transfer cross-process queue;
   computing, by the second computer process executing the algorithm, an analytical result for the analytical function based on providing the one or more analytical function parameters and the one or more datasets to the algorithm; and
   transferring the analytical result from the second computer process to the first computer process.

2. The computer-program product according to claim 1, further comprising:
   during the launch of the second computer process:
      sending, by the first computer process, a process identifier of the first computer process to the second computer process, wherein the second computer process is paired with the first computer process based on the process identifier of the first computer process.

3. The computer-program product according to claim 1, wherein:
   the command cross-process queue corresponds to a first cross-process queue type, and
   the data transfer cross-process queue corresponds to a second cross-process queue type.

4. The computer-program product according to claim 1, wherein:
   invoking, by the second computer process, the one or more API functions of the second set of API functions includes invoking a parameters-request API function, and
   the computer-program product further comprises computer instructions for performing operations including:
      in response to the second computer process invoking the parameters-request API function:
         creating, by the parameters-request API function, a request message encoded in the second programming language that includes a request to obtain parameter data associated with the analytical function from the first computer process;
         serializing, using a serialization protocol of the parameters-request API function, the request message encoded in the second programming language into a serialized request message encoded in a binary data format; and
         writing the serialized request message to the command cross-process queue.

5. The computer-program product according to claim 4, further comprising:
   detecting, by the first computer process, the serialized request message within the command cross-process queue;
   invoking, by the first computer process, a parameters-response API function of the first set of API functions in response to detecting the serialized request message within the command cross-process queue;
   in response to invoking the parameters-response API function:
      reading, by the first computer process, the serialized request message from the command cross-process queue; and
      deserializing, by the first computer process, the serialized request message into a deserialized request message encoded in the first programming language based on a deserialization protocol of the parameters-response API function.

6. The computer-program product according to claim 5, further comprising:
   retrieving the one or more analytical function parameters specified within the request to perform the analytical function in response to deserializing the serialized request message;
   creating, by the first computer process, a parameters response message to the request for parameter data that includes the one or more analytical function parameters encoded in the first programming language;
   serializing, by the first computer process, the parameters response message into a serialized response message that includes the one or more analytical function parameters encoded in the binary data format based on a serialization protocol of the parameters-response API function; and writing, by the first computer process, the serialized response message to the data transfer cross-process queue.

7. The computer-program product according to claim 6, further comprising:
detecting, by the second computer process, the serialized response message within the data transfer cross-process queue;
invoking, by the second computer process, a parameters response handler API function of the second set of API functions in response to detecting the serialized response message within the data transfer cross-process queue;
in response to invoking the parameters response handler API function:
reading, by the second computer process, the serialized response message from the data transfer cross-process queue;
deserializing, by the second computer process, the serialized response message into a deserialized response message that includes the one or more analytical function parameters encoded in the second programming language based on a deserialization protocol of the parameters response handler API function; and
extracting, by the second computer process, the one or more analytical function parameters encoded in the second programming language from the deserialized response message.

8. The computer-program product according to claim 1, wherein:
invoking, by the second computer process, the one or more API functions of the second set of API functions includes invoking a tabular data-request API function, and
the computer-program product further comprises computer instructions for performing operations including:
in response to the second computer process invoking the tabular data-request API function:
creating a request message encoded in the second programming language that includes a request to obtain tabular data associated with the analytical function from the first computer process;
serializing, using a serialization protocol of the tabular data-request API function, the request message encoded in the second programming language into a serialized request message encoded in a binary data format; and
writing the serialized request message to the command cross-process queue.

9. The computer-program product according to claim 8, further comprising:
detecting, by the first computer process, the serialized request message within the command cross-process queue;
invoking, by the first computer process, a tabular data-response API function of the first set of API functions in response to detecting the serialized request message within the command cross-process queue;
in response to invoking the tabular data-response API function:
reading, by the first computer process, the serialized request message from the command cross-process queue; and deserializing, by the first computer process, the serialized request message into a deserialized request message encoded in the first programming language based on a deserialization protocol of the tabular data-response API function.

10. The computer-program product according to claim 9, further comprising:
retrieving the one or more datasets specified within the request to perform the analytical function in response to deserializing the serialized request message;
creating, by the first computer process, a tabular data response message to the request for tabular data that includes the one or more datasets encoded in the first programming language;
serializing, by the first computer process, the tabular data response message into a serialized response message that includes the one or more datasets encoded in the binary data format based on a serialization protocol of the tabular data-response API function; and
writing, by the first computer process, the serialized response message to the data transfer cross-process queue.

11. The computer-program product according to claim 10, further comprising:
detecting, by the second computer process, the serialized response message within the data transfer cross-process queue;
invoking, by the second computer process, a tabular data response handler API function of the second set of API functions in response to detecting the serialized response message within the data transfer cross-process queue;
in response to invoking the tabular data response handler API function:
reading, by the second computer process, the serialized response message from the data transfer cross-process queue;
deserializing, by the second computer process, the serialized response message into a deserialized response message that includes the one or more datasets encoded in the second programming language based on a deserialization protocol of the tabular data response handler API function; and
extracting, by the second computer process, the one or more datasets encoded in the second programming language from the deserialized response message.

12. The computer-program product according to claim 1, wherein:
invoking, by the second computer process, the one or more API functions of the second set of API functions includes invoking a tabular data-request API function, and
the computer-program product further comprises computer instructions for performing operations including:
in response to the second computer process invoking the tabular data-request API function:
transmitting, via the command cross-process queue, a serialized request message to the first computer process, wherein the serialized request message includes a request for the one or more datasets;
writing, using a tabular data-response API function invoked by the first computer process, a serialized response message that includes the one or more datasets encoded in a binary data format to the data transfer cross-process queue; and
reading, using a tabular data response handler API function invoked by the second computer process, the serialized response message from the data transfer cross-process queue, wherein reading the serialized response message from the data transfer cross-process queue includes:
reading, using a data reader, the one or more datasets encoded in the binary data format from the data transfer cross-process queue, and
converting the one or more datasets encoded in the binary data format to one or more representations of the one or more datasets in the second programming language.

13. The computer-program product according to claim 12, wherein:
the second programming language corresponds to a python-based programming language,
converting the one or more datasets encoded in the binary data format to the one or more representations of the one or more datasets in the second programming language includes:
converting each dataset of the one or more datasets to a corresponding pandas dataframe object.

14. The computer-program product according to claim 1, further comprising:
invoking, by the second computer process, a log writer API function to transfer one or more log messages generated during the execution of the algorithm, and
writing a serialized message that includes the one or more log messages encoded in a binary data format to a target cross-process queue.

15. The computer-program product according to claim 14, further comprising:
detecting, by the first computer process, the serialized message within the target cross-process queue;
invoking, by the first computer process, a log reader API function in response to detecting the serialized message within the target cross-process queue;
in response to invoking the log reader API function:
reading, by the first computer process, the serialized message from the target cross-process queue using the log reader API function, wherein reading the serialized message from the target cross-process queue includes:
reading, using a data reader, the one or more log messages encoded in the binary data format from the target cross-process queue, and
deserializing the one or more log messages encoded in the binary data format into one or more deserialized log messages encoded in the first programming language.

16. The computer-program product according to claim 15, further comprising:
surfacing, by the first computer process, a set of log messages that includes one or more error events or one or more informational events that occurred in the first computer process and the second computer process, wherein the set of log messages includes:
a first subset of log messages generated by the first computer process, and
a second subset of log messages generated by the second computer process, wherein the second subset of log messages includes the one or more deserialized log messages.

17. The computer-program product according to claim 1, wherein:
the analytical result includes one or more data tables outputted by the algorithm, and the computer-program product further comprises computer instructions for performing operations including:
invoking, by the second computer process, an output data writer API function,
in response to the second computer process invoking the output data writer API function:
writing, by the second computer process, a serialized message that includes the one or more data tables in a binary data format to a target cross-process queue using a data writer of the output data writer API function; and
reading, using an output data reader API function invoked by the first computer process, the serialized message from the target cross-process queue, wherein reading the serialized message from the target cross-process queue includes:
reading, using a data reader of the output data reader API function, the one or more data tables in the binary data format from the target cross-process queue, and
deserializing, using the data reader of the output data reader API function, the one or more data tables in the binary data format into one or more deserialized data tables encoded in the first programming language; and
writing, by the first computer process, the one or more deserialized data tables encoded in the first programming language to a computer database of the analytics service.

18. The computer-program product according to claim 1, further comprising:
obtaining, by the second computer process, metadata related to the execution of the algorithm;
invoking, by the second computer process, an algorithm metadata writer API function; and
in response to the second computer process invoking the algorithm metadata writer API function:
writing, to a target cross-process queue, a serialized message that includes the metadata in a binary data format using a data writer of the algorithm metadata writer API function; and
reading, by the first computer process, the serialized message from the target cross-process queue in response to the first computer process invoking an algorithm metadata reader API function, wherein reading the serialized message from the target cross-process queue includes:
reading, using a data reader, the metadata in the binary data format from the target cross-process queue, and
deserializing the metadata in the binary data format into deserialized metadata encoded in the first programming language; and
surfacing, by the first computer process, a metadata summary artifact that includes the deserialized metadata.

19. The computer-program product according to claim 1, further comprising:
augmenting the plurality of predefined analytical functions executable by the analytics service to include a third-party analytical function created by a user of the analytics service, wherein:
the third-party analytical function is configured to perform a target analytical computation using a user-created algorithm written in the second programming language, and the analytical function of the plurality of predefined analytical functions corresponds to the third-party analytical function.

20. The computer-program product according to claim 1, wherein:
invoking, by the second computer process, the one or more API functions of the second set of API functions includes:
invoking, by the second computer process, a first API function to request the one or more analytical function parameters from the first computer process, and
after the second computer process receives the one or more analytical function parameters, invoking, by the second computer process, a second API function to request the one or more datasets.

21. The computer-program product according to claim 1, wherein:
invoking, by the second computer process, the one or more API functions of the second set of API functions includes sequentially invoking a plurality of API functions.

22. The computer-program product according to claim 1, wherein:
invoking, by the second computer process, the one or more API functions of the second set of API functions includes simultaneously invoking a plurality of API functions.

23. The computer-program product according to claim 1, wherein:
the command cross-process queue corresponds to a single-producer, single-consumer cross-process queue, and
the data transfer cross-process queue corresponds to a multiple-producer, multiple-consumer cross-process queue.

24. A computer-implemented method comprising:
augmenting a plurality of predefined analytical functions executable by an analytics service to include a third-party analytical function created by a user of the analytics service;
receiving, by a first computer process operating in a first programming language, a request to perform a target analytical function of the plurality of predefined analytical functions executable by the analytics service, wherein:
the target analytical function includes a set of instructions for implementing an algorithm that is (i) configured to perform the target analytical function and (ii) written in a second programming language,
the third-party analytical function is configured to perform a target analytical computation using a user-created algorithm written in the second programming language,
the target analytical function of the plurality of predefined analytical functions corresponds to the third-party analytical function, and
the first computer process provides a first set of application programming interface (API) functions for responding to data requests;
launching, by the first computer process, a second computer process operating in the second programming language that implements the user-created algorithm in response to the first computer process commencing an execution of the target analytical function, wherein:
the second computer process provides a second set of application programming interface (API) functions for creating and transmitting the data requests;
invoking one or more API functions of the first set of API functions by the first computer process and one or more API functions of the second set of API functions by the second computer process to transfer one or more analytical function parameters and one or more datasets specified within the request to perform the target analytical function from the first computer process to the second computer process;
computing, by the second computer process executing the user-created algorithm, an analytical result for the target analytical function based on providing the one or more analytical function parameters and the one or more datasets to the user-created algorithm; and
transferring the analytical result from the second computer process to the first computer process.

25. The computer-implemented method according to claim 24, further comprising:
during the launch of the second computer process:
sending, by the first computer process, a process identifier of the first computer process to the second computer process, and
pairing the second computer process with the first computer process based on the process identifier of the first computer process.

26. The computer-implemented method according to claim 25, further comprising:
in response to pairing the second computer process with the first computer process:
writing, to a first cross-process queue, one or more requests for the one or more analytical function parameters and the one or more datasets in response to invoking, by the second computer process, the one or more API functions of the second set of API functions,
writing, to a second cross-process queue different from the first cross-process queue, one or more response messages that includes the one or more analytical function parameters and the one or more datasets in response to invoking, by the first computer process, the one or more API functions of the first set of API functions, and
obtaining, by the second computer process, the one or more analytical function parameters and the one or more datasets specified within the request in response to reading the one or more response messages from the second cross-process queue.

27. The computer-implemented method according to claim 24, further comprising:
in response to pairing the second computer process with the first computer process:
writing, to a command cross-process queue, one or more requests for the one or more analytical function parameters and the one or more datasets in response to invoking, by the second computer process, the one or more API functions of the second set of API functions,
writing, to a data transfer cross-process queue different from the command cross-process queue, one or more response messages that includes the one or more analytical function parameters and the one or more datasets in response to invoking, by the first computer process, the one or more API functions of the first set of API functions, and
obtaining, by the second computer process, the one or more analytical function parameters and the one or more datasets specified within the request in response to reading the one or more response messages from the data transfer cross-process queue.

28. The computer-implemented method according to claim 27, wherein:
the command cross-process queue is a single-producer, single-consumer cross-process queue, and
the data transfer cross-process queue is a multiple-producer, multiple-consumer cross-process queue.

29. A computer-implemented system comprising:
one or more processors;
a memory;
a computer-readable medium operably coupled to the one or more processors, the computer-readable medium having computer-readable instructions stored thereon that, when executed by the one or more processors, cause a computing device to perform operations comprising:
receiving, by a first computer process operating in a first programming language, a request to perform an analytical function of a plurality of predefined analytical functions executable by an analytics service, wherein:
the analytical function includes a set of instructions for implementing an algorithm that is (i) configured to perform the analytical function and (ii) written in a second programming language, and
the first computer process provides a first set of application programming interface (API) functions for responding to data requests;
launching, by the first computer process, a second computer process operating in the second programming language that implements the algorithm in response to the first computer process commencing an execution of the analytical function, wherein:
the second computer process provides a second set of application programming interface (API) functions for creating and transmitting the data requests;
during the launch of the second computer process:
sending, by the first computer process, a process identifier of the first computer process to the second computer process, and
pairing the second computer process with the first computer process based on the process identifier of the first computer process;
in response to pairing the second computer process with the first computer process:
invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process;
writing, to a first cross-process queue, one or more requests for the one or more analytical function parameters and the one or more datasets in response to invoking, by the second computer process, the one or more API functions of the second set of API functions;
writing, to a second cross-process queue different from the first cross-process queue, one or more response messages that includes the one or more analytical function parameters and the one or more datasets in response to invoking, by the first computer process, the one or more API functions of the first set of API functions; and
obtaining, by the second computer process, the one or more analytical function parameters and the one or more datasets specified within the request in response to reading the one or more response messages from the second cross-process queue;
computing, by the second computer process executing the algorithm, an analytical result for the analytical function based on providing the one or more analytical function parameters and the one or more datasets to the algorithm; and
transferring the analytical result from the second computer process to the first computer process.

30. A computer-program product comprising a non-transitory machine-readable storage medium storing computer instructions that, when executed by one or more processors, perform operations comprising:
receiving, by a first computer process operating in a first programming language, a request to perform an analytical function of a plurality of predefined analytical functions executable by an analytics service, wherein:
the analytical function includes a set of instructions for implementing an algorithm that is (i) configured to perform the analytical function and (ii) written in a second programming language, and
the first computer process provides a first set of application programming interface (API) functions for responding to data requests;
launching, by the first computer process, a second computer process operating in the second programming language that implements the algorithm in response to the first computer process commencing an execution of the analytical function, wherein:
the second computer process provides a second set of application programming interface (API) functions for creating and transmitting the data requests;
invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process, wherein invoking, by the second computer process, the one or more API functions of the second set of API functions includes invoking a parameters-request API function;
in response to the second computer process invoking the parameters-request API function:
creating, by the parameters-request API function, a request message encoded in the second programming language that includes a request to obtain parameter data associated with the analytical function from the first computer process;
serializing, using a serialization protocol of the parameters-request API function, the request message encoded in the second programming language into a serialized request message encoded in a binary data format; and
writing, by a data writer of the parameters-request API function, the serialized request message to a first cross-process queue;
computing, by the second computer process executing the algorithm, an analytical result for the analytical function based on providing the one or more analytical function parameters and the one or more datasets to the algorithm; and transferring the analytical result from the second computer process to the first computer process.

31. A computer-program product comprising a non-transitory machine-readable storage medium storing computer instructions that, when executed by one or more processors, perform operations comprising:

receiving, by a first computer process operating in a first programming language, a request to perform an analytical function of a plurality of predefined analytical functions executable by an analytics service, wherein:
the analytical function includes a set of instructions for implementing an algorithm that is (i) configured to perform the analytical function and (ii) written in a second programming language, and
the first computer process provides a first set of application programming interface (API) functions for responding to data requests;

launching, by the first computer process, a second computer process operating in the second programming language that implements the algorithm in response to the first computer process commencing an execution of the analytical function, wherein:
the second computer process provides a second set of application programming interface (API) functions for creating and transmitting the data requests;

invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process, wherein invoking, by the second computer process, the one or more API functions of the second set of API functions includes invoking a tabular data-request API function;

in response to the second computer process invoking the tabular data-request API function:
creating, by the tabular data-request API function, a request message encoded in the second programming language that includes a request to obtain tabular data associated with the analytical function from the first computer process;
serializing, using a serialization protocol of the tabular data-request API function, the request message encoded in the second programming language into a serialized request message encoded in a binary data format; and
writing, by a data writer of the tabular data-request API function, the serialized request message to a first cross-process queue;

computing, by the second computer process executing the algorithm, an analytical result for the analytical function based on providing the one or more analytical function parameters and the one or more datasets to the algorithm; and transferring the analytical result from the second computer process to the first computer process.

32. A computer-program product comprising a non-transitory machine-readable storage medium storing computer instructions that, when executed by one or more processors, perform operations comprising:

receiving, by a first computer process operating in a first programming language, a request to perform an analytical function of a plurality of predefined analytical functions executable by an analytics service, wherein:
the analytical function includes a set of instructions for implementing an algorithm that is (i) configured to perform the analytical function and (ii) written in a second programming language, and
the first computer process provides a first set of application programming interface (API) functions for responding to data requests;

launching, by the first computer process, a second computer process operating in the second programming language that implements the algorithm in response to the first computer process commencing an execution of the analytical function, wherein:
the second computer process provides a second set of application programming interface (API) functions for creating and transmitting the data requests;

invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process, wherein invoking, by the second computer process, the one or more API functions of the second set of API functions includes invoking a tabular data-request API function;

in response to the second computer process invoking the tabular data-request API function:
transmitting, via a first cross-process queue, a serialized request message to the first computer process, wherein the serialized request message includes a request for the one or more datasets;
writing, using a tabular data-response API function invoked by the first computer process, a serialized response message that includes the one or more datasets encoded in a binary data format to a second cross-process queue different from the first cross-process queue; and
reading, using a tabular data response handler API function invoked by the second computer process, the serialized response message from the second cross-process queue, wherein reading the serialized response message from the second cross-process queue includes:
reading, using a data reader of the tabular data response handler API function, the one or more datasets encoded in the binary data format from the second cross-process queue, and
converting, using the data reader of the tabular data response handler API function, the one or more datasets encoded in the binary data format to one or more representations of the one or more datasets in the second programming language;

computing, by the second computer process executing the algorithm, an analytical result for the analytical function based on providing the one or more analytical function parameters and the one or more datasets to the algorithm; and transferring the analytical result from the second computer process to the first computer process.

33. A computer-program product comprising a non-transitory machine-readable storage medium storing computer instructions that, when executed by one or more processors, perform operations comprising:

receiving, by a first computer process operating in a first programming language, a request to perform an analytical function of a plurality of predefined analytical functions executable by an analytics service, wherein:
    the analytical function includes a set of instructions for implementing an algorithm that is (i) configured to perform the analytical function and (ii) written in a second programming language, and
    the first computer process provides a first set of application programming interface (API) functions for responding to data requests;
launching, by the first computer process, a second computer process operating in the second programming language that implements the algorithm in response to the first computer process commencing an execution of the analytical function, wherein:
    the second computer process provides a second set of application programming interface (API) functions for creating and transmitting the data requests;
invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process;
computing, by the second computer process executing the algorithm, an analytical result for the analytical function based on providing the one or more analytical function parameters and the one or more datasets to the algorithm, wherein the analytical result includes one or more data tables outputted by the algorithm; and
transferring the analytical result from the second computer process to the first computer process, wherein transferring the analytical result from the second computer process to the first computer process includes:
    invoking, by the second computer process, an output data writer API function,
    in response to the second computer process invoking the output data writer API function:
        writing, by the second computer process, a serialized message that includes the one or more data tables in a binary data format to a cross-process queue using a data writer of the output data writer API function;
        reading, using an output data reader API function invoked by the first computer process, the serialized message from the cross-process queue, wherein reading the serialized message from the cross-process queue includes:
            reading, using a data reader of the output data reader API function, the one or more data tables in the binary data format from the cross-process queue, and
            deserializing, using the data reader of the output data reader API function, the one or more data tables in the binary data format into one or more deserialized data tables encoded in the first programming language; and
        writing, by the first computer process, the one or more deserialized data tables encoded in the first programming language to a computer database of the analytics service.

34. A computer-program product comprising a non-transitory machine-readable storage medium storing computer instructions that, when executed by one or more processors, perform operations comprising:
    receiving, by a first computer process operating in a first programming language, a request to perform an analytical function of a plurality of predefined analytical functions executable by an analytics service, wherein:
        the analytical function includes a set of instructions for implementing an algorithm that is (i) configured to perform the analytical function and (ii) written in a second programming language, and
        the first computer process provides a first set of application programming interface (API) functions for responding to data requests;
    launching, by the first computer process, a second computer process operating in the second programming language that implements the algorithm in response to the first computer process commencing an execution of the analytical function, wherein:
        the second computer process provides a second set of application programming interface (API) functions for creating and transmitting the data requests;
    invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process;
    computing, by the second computer process executing the algorithm, an analytical result for the analytical function based on providing the one or more analytical function parameters and the one or more datasets to the algorithm;
    obtaining, by the second computer process, metadata related to the execution of the algorithm;
    invoking, by the second computer process, an algorithm metadata writer API function;
    in response to the second computer process invoking the algorithm metadata writer API function:
        writing, to a cross-process queue, a serialized message that includes the metadata in a binary data format using a data writer of the algorithm metadata writer API function;
        reading, by the first computer process, the serialized message from the cross-process queue in response to the first computer process invoking an algorithm metadata reader API function, wherein reading the serialized message from the cross-process queue includes:
            reading, using a data reader of the algorithm metadata reader API function, the metadata in the binary data format from the cross-process queue, and
            deserializing, using the data reader of the algorithm metadata reader API function, the metadata in the binary data format into deserialized metadata encoded in the first programming language; and
        surfacing, by the first computer process, a metadata summary artifact that includes the deserialized metadata; and
    transferring the analytical result from the second computer process to the first computer process.

35. A computer-program product comprising a non-transitory machine-readable storage medium storing computer instructions that, when executed by one or more processors, perform operations comprising:

receiving, by a first computer process operating in a first programming language, a request to perform an analytical function of a plurality of predefined analytical functions executable by an analytics service, wherein:
- the analytical function includes a set of instructions for implementing an algorithm that is (i) configured to perform the analytical function and (ii) written in a second programming language, and
- the first computer process provides a first set of application programming interface (API) functions for responding to data requests;

launching, by the first computer process, a second computer process operating in the second programming language that implements the algorithm in response to the first computer process commencing an execution of the analytical function, wherein:
- the second computer process provides a second set of application programming interface (API) functions for creating and transmitting the data requests;

invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process;

writing, to a single-producer single-consumer cross-process queue, one or more requests for the one or more analytical function parameters and the one or more datasets in response to invoking, by the second computer process, the one or more API functions of the second set of API functions;

writing, to a multiple-producer multiple-consumer cross-process queue, one or more response messages that includes the one or more analytical function parameters and the one or more datasets in response to invoking, by the first computer process, the one or more API functions of the first set of API functions;

obtaining, by the second computer process, the one or more analytical function parameters and the one or more datasets specified within the request in response to reading the one or more response messages from the multiple-producer multiple-consumer cross-process queue;

computing, by the second computer process executing the algorithm, an analytical result for the analytical function based on providing the one or more analytical function parameters and the one or more datasets to the algorithm; and transferring the analytical result from the second computer process to the first computer process.

36. The computer-program product according to claim 35, wherein the analytical result includes one or more data tables.

* * * * *